US005737246A

United States Patent [19]

Furukawa et al.

[11] Patent Number: 5,737,246

[45] Date of Patent: Apr. 7, 1998

[54] WATER DEPTH MEASURING DEVICE

[75] Inventors: Tsuneaki Furukawa; Naoshi Furuta, both of Suwa; Yumi Sakamoto, Nagano-ken; Kazuko Yoshida, Suwa, all of Japan

[73] Assignee: Seiko Epson Corporation, Tokyo, Japan

[21] Appl. No.: 437,741

[22] Filed: May 9, 1995

[30] Foreign Application Priority Data

| | | | |
|---|---|---|---|
| May 10, 1994 | [JP] | Japan | 6-096700 |
| Jun. 14, 1994 | [JP] | Japan | 6-132238 |
| Jun. 22, 1994 | [JP] | Japan | 6-140470 |
| Jun. 22, 1994 | [JP] | Japan | 6-140471 |
| Jun. 22, 1994 | [JP] | Japan | 6-140472 |
| Apr. 17, 1995 | [JP] | Japan | 7-091149 |

[51] Int. Cl.[6] ..... G01B 07/26

[52] U.S. Cl. ..... 364/562; 73/714; 73/717; 73/753

[58] Field of Search ..... 73/290 R, 714, 73/717, 753; 340/500, 591; 364/558, 561, 562

[56] References Cited

U.S. PATENT DOCUMENTS

| | | | |
|---|---|---|---|
| 4,192,001 | 3/1980 | Villa | 364/413.31 |
| 4,779,461 | 10/1988 | Gilman et al. | 73/714 X |
| 4,835,716 | 5/1989 | Tamaki et al. | 364/558 |
| 5,031,160 | 7/1991 | Koizumi et al. | 73/290 R |
| 5,189,646 | 2/1993 | Sako et al. | 73/290 R |
| 5,224,059 | 6/1993 | Nitta et al. | 364/558 |
| 5,570,688 | 11/1996 | Cochran et al. | 128/205.23 |

FOREIGN PATENT DOCUMENTS

| | | |
|---|---|---|
| 52-10776 | 1/1977 | Japan . |
| 63-62715 | 6/1982 | Japan . |
| 62-215889 | 9/1987 | Japan . |
| 62-203090 | 1/1988 | Japan . |
| 5-11455 | 6/1988 | Japan . |
| 1-89309 | 6/1989 | Japan . |
| 1-245114 | 12/1989 | Japan . |
| 3-264813 | 2/1992 | Japan . |

*Primary Examiner*—Edward R. Cosimano
*Attorney, Agent, or Firm*—Stroock & Stroock & Lavan LLP

[57] ABSTRACT

A depth measuring device suitable for use in a dive watch is provided. A water depth measuring device comprising a pressure sensor, an A/D converter that converts the sensed signal of the pressure sensor into a digital value, the digital value corresponding to the start of water depth measuring being the initial digital value, a comparator that compares the initial digital value output by the A/D converter with a range of values defined by a first predetermined comparative value and a second predetermined comparative value, and determines whether the initial digital value falls within the range and produces a comparison result based thereon, an initial value setting circuit that, in response to the comparison result of the comparator, adopts the first digital value as an initial value corresponding to a zero meter depth when the initial digital value falls within the range defined by the first and second comparative values, and a water depth computer that computes a water depth value based on the initial value and the digital value derived from the A/D converter.

31 Claims, 51 Drawing Sheets

F/G.13

WATER DEPTH MEASURING DEVICE

BACKGROUND OF THE INVENTION

1. Field of the Invention

The present invention relates to a water depth measuring device which sounds water depth using a pressure sensor. In particular, the present invention relates to a depth measuring device adapted for use in a multi-function electronic watch for diving applications; a dive watch.

2. Description of the Related Art

Dive watches are multi-function electronic watches which are provided with additional functions such as water depth measuring function, in addition to the function of a watch. Conventional dive watches include a pressure sensor and an A/D converter circuit which converts the output of the pressure sensor into a digital signal. Typically available as a pressure sensor is a so-called diffusion-type semiconductor sensor, in which a diaphragm and a resistor are formed on a silicon chip.

Since water depth measuring using such a pressure sensor is based on underwater pressure, under the pressure acting on the water surface, namely, under the atmospheric pressure, the effect of the atmospheric pressure must be always considered. In view of this, it is known from Japanese Patent Application Laid-open No. Sho-62-215889 to determine water depth with the atmospheric pressure considered. In the arrangement of this disclosed patent application, a first initial pressure value is stored by pressing a switch that selects depth measuring function as a surface level operation. Next, a start switch is pressed to initiate depth measuring function to measure pressure and to compare the measured pressure value with the first initial pressure value. Either the first initial pressure or the second pressure is used as an initial surface level pressure value. In this arrangement, if the start switch is pressed with a long delay after the selection of the depth measuring function, or if the start switch is pressed underwater, a pressure that approximates the actual atmospheric pressure is used as the surface level pressure, and no substantial error is introduced in subsequent depth measuring.

Some depth measuring devices built in dive watches are provided with functions that not only display a measured depth on an LCD but also trigger an alarm at the moment a diver reaches a predetermined depth. For example, it is known from Japanese Patent Application Laid-open No. Sho-52-10776 and Japanese Patent Application Published No. Sho-63-62715 to provide an alarm to be triggered at the moment a depth deeper than a predetermined depth is sensed.

Some dive watches have on their screen a graphic display that presents a water depth in rectangular coordinates. Typically, the vertical axis represents depth scale, and the horizontal axis represents time scale; thus, the graphic display presents depth versus elapsed time. In some dive watches, the horizontal time axis is scaled so that the overall depth plot over the entire elapsed time on each session is presented in a single display even if the elapsed time exceeds the scale range on the horizontal time axis.

Some depth measuring devices are arranged so that their water depth measuring interval is varied.

It is known from Japanese Utility Model Published No. Hei-5-11455 to vary the operation frequency for depth measuring in response to operating conditions (depth, altitude). It is known from Japanese Utility Model Laid-open No. 1-89309 to vary the operation frequency for depth measuring according to predetermined time as disclosed. It is also known in the art that offset measurement of an A/D converter is performed in addition to pressure sensing. It is also known to perform other measurements such as temperature sensing. It is also known to perform reference sensing at the start of pressure sensing (for example, 0 m sensing in the case of depth measuring).

The above prior art depth measuring devices, however, suffer the following problems. To perform depth measuring, depth measuring function is selected, followed by the pressing of the start switch. Depth measuring thus needs a plurality of operations. If a diver forgot pressing for the selection of depth measuring function that is an essential operation to be performed on the surface of water, both the first initial pressure and the pressure at the operation of the start switch would be greatly different from the atmospheric pressure on the water surface. In such a case, a resulting water depth is quite different from the real depth. Also, there is a potentially dangerous situation that the presence of such a large error escapes the diver's attention.

In the prior art depth measuring devices of a type that triggers an alarm at the moment a predetermined depth is reached, the determination of whether the alarm is triggered or not is solely dependent on the relationship of whether the predetermined depth is smaller or greater than the measured depth. If the diver stays underwater in the vicinity of the alarm depth, the alarm may be continuously or intermittently triggered as the predetermined depth is crossed. When the alarm is triggered, it also disables the depth measuring function. Such a situation, leaving depth measuring function disabled for a long time, is not only inconvenient but potentially dangerous to the diver. The reason: the size of the battery that is accommodated in a compact portable depth measuring device such as a dive watch is limited because of space availability, and the battery cannot simultaneously support both heavy-duty functions of depth measuring and alarm triggering; thus, while the alarm is operative, depth measuring is designed to be disabled. Furthermore, a long time of alarm activation is not only distracting to the diver, but shortens the life of the battery.

In the prior art diver watches of a type that offers rectangular coordinates graphic display in which the water-depth-versus-elapsed-time plot is given, depth data are continuously maintained within the coverage of the display area if one axis, for example, the vertical axis is scalable. In this case, the horizontal axis as the time axis is fixed rather than scalable. To cover dive time in excess of the display area, the graph needs scrolling horizontally. Thus, presented is part of the graph rather than the entire graph from a starting point to an end point. To present a depth graph for a dive session, the entire graph from a starting point to an end point is required. The prior art fails to meet this requirement.

The prior art depth measuring device digitally presents depth on its display. With a glance at the depth reading, a diver is unable to recognize whether he is ascending or descending and how fast he or she is ascending or descending. This allows a diver to ascend too fast, exposing the diver to the risk of decompression sickness.

The measuring interval varying technique in the prior art depth measuring device suffers the following problems.

In the methods known from Japanese applications 5-11455 and 1-89309, where the operation frequency for depth measuring is switched, the timing for switching is not correctly picked up and thus distortion takes place before and after the switching. Therefore, there is a possibility that no accurate depth measuring is performed.

When the A/D converter circuit is employed utilizing offset measurement as described above, offsetting is performed to compensate for variations in the characteristics of the A/D converter circuit (for example, variations due to temperature) in order to keep accuracy. Offsetting needs no frequent updating because the characteristics do not change so frequently. Offsetting, if made along with each depth measuring, draws a larger current drain, thereby shortening the battery life. This is inconvenient to the diver who uses it. If the above offsetting is controlled by software, a resulting increased task makes otherwise executable process go unprocessed. This is also true in temperature sensing. Ambient air temperature and water temperature are not a physical quantity that changes quickly or frequently. To perform pressure sensing, offsetting and temperature sensing at a time increases the load on software and other necessary processes are left unprocessed.

Third, if depth scale is changed along with the change of measuring interval, scaling is not consistently presented on the time axis. Such a presentation possibly disorients the diver and presents a difficulty for the diver's quick grips with the diving situation. If the operation frequency that measures a variation per unit time of a physical quantity such as water depth changes along with the change of measuring interval, the unit time of the variation changes, as well. There is a possibility that no correct variation is picked up.

SUMMARY OF THE INVENTION

A water depth measuring device includes a pressure sensor. An A/D converter circuit converts the sensed signal of the pressure sensor into a digital value. A comparator circuit compares the initial digital value given by the A/D converter circuit at the start of water depth measuring with a range of values defined by predetermined first and second comparative values in order to determine whether the initial digital value falls within the range. An initial value setting circuit receives the comparison result of the comparator circuit and adopts the first digital value as an initial value corresponding to zero meter depth when the initial digital value falls within the range defined by the first and second comparative values. A water depth computing circuit computes a water depth value in response to the initial value and the digital value derived from the A/D converter circuit. When the second comparative value is greater than the first comparative value, the initial value setting circuit, preferably, adopts a first predetermined value as its initial value when the initial digital value given at the start of water depth measuring is equal to or smaller than the first comparative value, or adopts a second predetermined value as its initial value when the initial digital value is equal to or greater than the second comparative value. When the first predetermined value is set as the initial value, the water depth computing circuit, preferably, outputs its depth value as zero while the digital value from the A/D converter circuit is smaller than the initial value. When the comparator circuit has determined that the digital value provided by the A/D converter circuit at the start of water depth measuring does not fall within the range defined by the first and second comparative values, the digital value is read again to determine the initial value, and based on the read digital value, the initial value is determined.

The water depth measuring device also includes a counter circuit which counts the occurrence of error signals indicative of abnormal conditions provided by the A/D converter circuit and which disables water depth measuring when the error count by the counter exceeds a predetermined value.

The water depth measuring device preferably also includes a display unit for displaying the water depth value computed by the water depth computing circuit and a display control circuit for controlling display of the display unit, whereby the display control circuit controls the display unit so that, when either the first predetermined value or the second predetermined value is selected as the initial value, the display unit presents the information indicative of the selected initial value along with the resulting water depth value.

The water depth measuring device further may also include an alarm and a first water depth determining circuit for determining whether or not the water depth value computed by the water depth computing circuit is deeper than a first predetermined water depth value, a second water depth determining circuit for determining whether or not the water depth value computed by the water depth computing circuit is shallower than a second predetermined water depth value that is shallower than the first predetermined water depth value, an alarm generation command circuit which is set indicating an alarm-complete condition in response to an affirmative determination given by the first water depth determining circuit, the set state being released and put into a reset state by an affirmative determination by the second water depth determining circuit, and an alarm generator circuit for generating an alarm when the alarm generation command circuit is in the reset state and when the affirmative determination is made by the first water depth determining circuit.

The water depth measuring device preferably further includes a first water depth value instructor for instructing or modifying the first predetermined water depth value, and second water depth value instructor for instructing or modifying a second water depth value that is shallower by a fixed depth than the first predetermined water depth value instructed.

The water depth measuring device preferably further includes a third water depth determining circuit for determining whether the water depth value computed by the water depth computing circuit is deeper than a third water depth value that is predetermined to be deeper than the first predetermined water depth value, whereby the alarm generation command circuit is also switched from the set state to the reset state in response to the affirmative determination of the third water depth determining circuit.

The water depth measuring device preferably further includes a display unit for displaying the water depth value computed by the water depth computing circuit and a display control circuit for controlling display of the display unit, whereby the display control circuit controls the display unit to indicate the alarm is on while the alarm is activated by the alarm generator circuit.

The water depth measuring device includes a water depth value memory circuit for storing the water depth value computed by the water depth computing circuit at predetermined intervals, a depth difference computing circuit for computing a difference between the water depth value computed by the water depth computing circuit and the water depth value a predetermined time before stored in the water depth value memory circuit, a display unit having a plurality of independently driven display segments, and a display control circuit for selectively driving the display segments in response to the difference given by the depth difference computing circuit.

The water depth measuring device also may include a coordinates display unit having one axis representing time and the other axis representing depth, a time-axis scaling circuit for modifying the display area along the time axis, a depth-axis scaling circuit for modifying the display area along the depth axis, and a scale control circuit for performing independent scaling operations for the time-axis scaling circuit and the depth-axis scaling circuit.

The water depth measuring device may also include a measuring timing pulse generator for generating measuring timing pulses that serve as a reference in determining a measuring interval, a measuring timing pulse counter for counting the measuring timing pulses generated by the measuring timing pulse generator, measuring interval determinor for determining the measuring interval synchronized with the count provided by the measuring timing pulse counter, and measuring interval control for allowing depth measuring to be performed for a duration determined by the measuring interval provided by the measuring interval determinor.

The water depth measuring device preferably further includes measuring time counter for measuring the elapsed time from the start of water depth measuring, whereby the measuring interval determinor updates its measuring interval in response to the count provided by the measuring time counter. The measuring interval determinor preferably updates its measuring interval in response to the computed water depth.

The water depth measuring device preferably further includes a water depth change calculator for computing a variation in the computed water depth, whereby the measuring interval determinor updates its measuring interval in response to the variation in the computed water depth. The water depth change calculator preferably computes the water depth variation in synchronism with a predetermined count provided by the measuring timing pulse counter.

The water depth measuring device preferably also includes a second measuring circuit that measures at least one physical quantity, other than water depth and a second measuring control for controlling the second measuring circuit, whereby the measuring timing control allows the second measuring control to operate in synchronism with the count provided by the measuring timing pulse counter.

Accordingly, an object of the invention is to provide an improved water depth measuring device.

Another object of the present invention is to provide a water depth measuring device which indicates a water depth having a substantially small error even with an erratic operation and the like.

A further object of the present invention to provide an alarm-built-in water depth measuring device which gives in a proper manner an alarm at a set depth, avoiding activating a useless alarm that disables depth measuring function and shortening the life of the battery.

Yet another object of the present invention is to provide a water depth measuring device which presents the change of depth recording versus elapsed time, constantly within the display area of the device, by presenting the change of depth recording versus elapsed time graph with a time axis and a depth axis independently scalable.

Still another object of the present invention is to provide a water depth measuring device which presents information such as an ascending speed, a descending speed or the like in addition to water depth.

Still a further object of the present invention is to provide a water depth measuring device in which depth measuring process is performed in an easy and accurate manner even with water depth measuring interval changed, software for control operation is simplified, power consumption is reduced, and is easy to observe and use in an intuitive manner.

By providing a dive watch as described above, a determination is made of whether or not the digital value measured is adopted as an initial value corresponding to the pressure on the water surface if the measured digital value falls within the range defined by the first and second comparative values. The measured value is used as the initial value. Unlike the conventional device, the measured value first read which could be greatly different from the real atmospheric pressure will not be automatically used as indicative of an initial zero meter value. This arrangement assures that the error the depth measuring device suffers is substantially reduced.

By utilizing an initial value setting circuit which selects a first predetermined value as its initial value when the initial digital value is less than or equal to a first comparative value, or adopts a second predetermined value as the initial value when the initial digital value is greater than or equal to the second comparative value in accordance with the invention when an initial value measured falls out of the range defined by the first and second comparative values, the measured value is neglected and the first or second predetermined value is adopted as the initial value. This arrangement permits a proper setting, for example, even if a diver dives in a lake high above sea level, and the error the depth measuring device suffers is substantially reduced.

By the depth computing circuit outputting a depth value of 0 in accordance with the invention, if the measured water depth is smaller than the initial value indicative of zero meter, the measured value is forced to zero, the abnormal display such as a negative depth reading is thus avoided.

By utilizing a comparator circuit which repeats the operation to determine an initial value if the A/D converter circuit output is not within a range, measurement at the start of depth measuring is repeated if the measured value is not normal. Thus, the determination of the initial value is performed in a reliable manner. By utilizing a counter circuit to count errors, the frequency of occurrence of error signals provided by the A/D converter circuit is counted. When the count exceeds a predetermined value, measuring operation is suspended. This arrangement allows any one-time transient fault and permanent fault of the A/D converter circuit to be detected. A rarely happening fault may be neglected, but abnormal measuring due to a permanent fault such as a circuit hardware fault should properly detected for any corrective action.

By utilizing a display unit in accordance with the invention, the corrected value rather than the actually measured value is adopted as the initial value. The display unit notifies the diver of this fact, for example, by flashing the display, and thus the display unit allows the diver to visibly recognize the fact that the corrected value has been adopted.

By utilizing two water depth determining circuits in conjunction with an alarm control circuit in accordance with the invention, once the alarm is activated with the diver having reached the depth set, no further alarming is repeated even if the diver dives in the vicinity of the depth set. By utilizing a third water depth measuring circuit to control the alarm in accordance with the invention, no-alarm zone is set up in the band of depth range centered onto the depth set. Once the diver is alarmed, no further alarm is triggered except that the diver ascends or descends out of the no-alarm zone. Unnecessary alarm is thus prevented. By utilizing a display unit with the alarm in accordance with the invention, the alarm is provided not only audibly but also visibly through the display unit. The diver thus can recognize the alarm both audibly and visible when he or she arrives at the depth set.

By calculating differences in depth over time with a water depth value memory circuit and depth difference computing circuit in accordance with the invention, an ascending speed or a descending speed in diving operation is recognized through the selected state of the plurality of display segments. The diver thus can perform his diving operation properly, monitoring the display segments.

By providing an axis scaling circuit in accordance with the invention, the time axis and depth axis are independently scaled, and thus the display unit gives the entire depth change recording from the start of diving to the current depth in a graphic presentation. No scroll operation along the time axis is required, and the presentation is easy to see for the diver.

By utilizing a measuring timing pulse generator for providing a reference for measuring intervals in accordance with the present invention, the measuring interval for water depth measurement is synchronized with the count provided by the measuring timing pulse counter. Thus, timing for the transition of the measuring interval is perfectly timed to result in accurate measurement. By utilizing a measuring time counter for measuring the elapsed time in accordance with the invention, the measuring interval is changed according to the elapsed from the start of measurement. For example, where depth changes rapidly for some time in succession to the start of measurement, depth measurement is immediately performed, and where depth change is slow, the measuring interval may be set to be longer to avoid useless depth measurement. This conserves battery power, as well. By updating the measurements in accordance with the invention, the measuring interval is changed according to depth. Where measured depth is large, the measuring interval may be set to be longer because A/D conversion takes time. Thus, optimum measurement adapted for the configuration of the device is performed. By utilizing a water depth change calculator in accordance with the invention, the measuring interval is changed according to the variation in the measured depth. When the variation is small, the measuring interval is set to be short, and vice versa. As a result, battery power is conserved. By utilizing the water depth change calculator to measure water depth change rate, frequency or repetition rate for calculating water depth change remains unchanged when the measuring interval is switched. Unit time used to calculate depth change rate also remains unchanged. Thus, water depth change rate is correctly recognized. The system offers measurement data in a fashion that agrees with ease of use. By utilizing a second measuring circuit in accordance with the invention, when the depth measuring interval is changed, other physical quantities (temperature, in particular) are measured in synchronism with the count provided by the measuring timing pulse counter means in a timing different from that for depth (pressure) measuring. Thus, software processing is greatly simplified. There is no need for the constant measurement of physical quantities of secondary importance (temperature, in particular), current requirement is reduced, prolonging the life of a battery.

Still other objects and advantages of the invention will in part be obvious and will in part be apparent from the specification.

The invention accordingly comprises the features of construction, combinations of elements, and arrangements of parts which will be exemplified in the construction hereinafter set forth and the scope of the invention will be indicated in the claims.

BRIEF DESCRIPTION OF THE DRAWINGS

For fuller understanding of the invention, reference is had to the following description taken in connection with the accompanying drawings, in which.

DETAILED DESCRIPTION OF THE PREFERRED EMBODIMENTS

Figure 1:
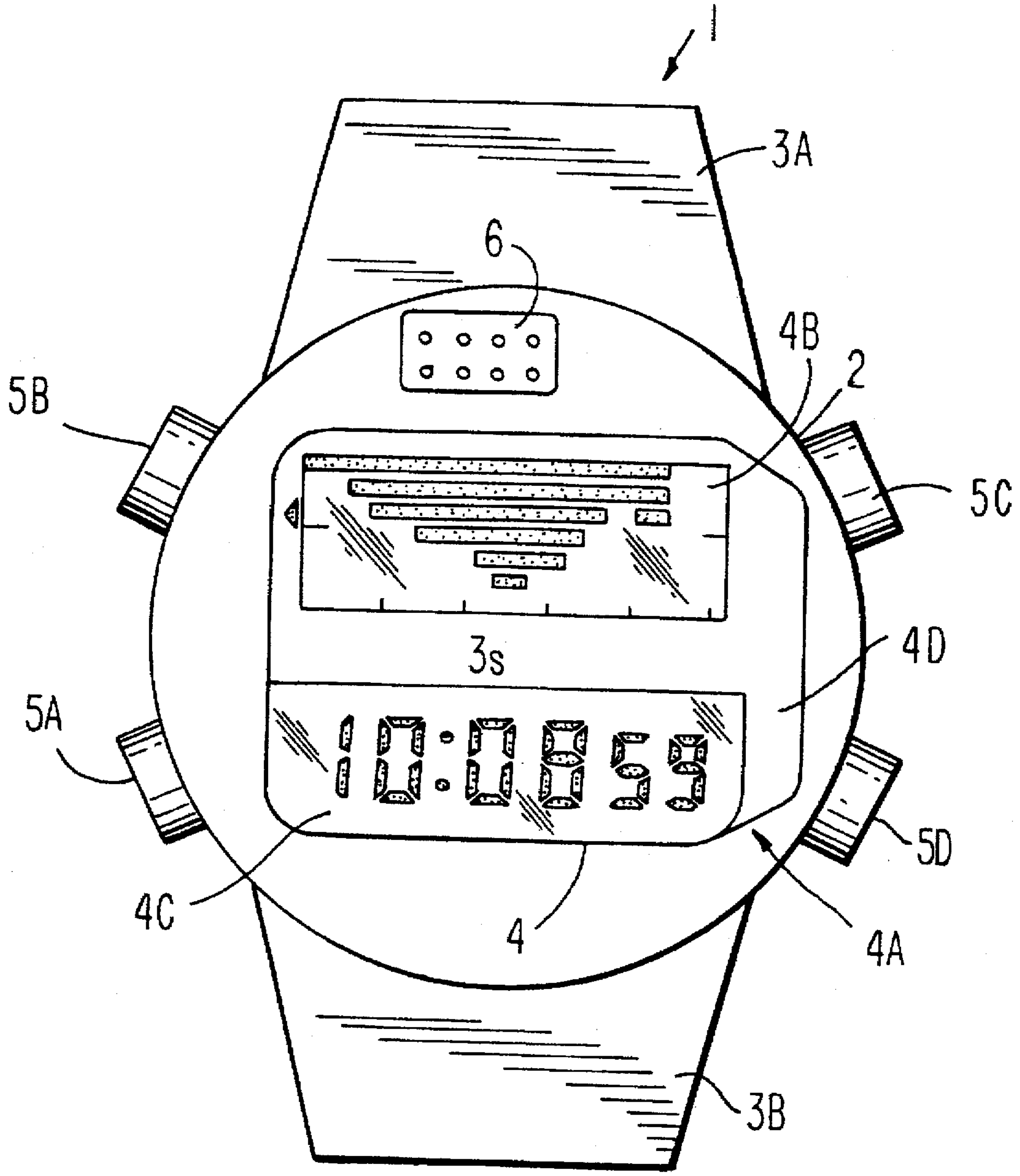
FIG. 1 is a top plan view of a dive watch incorporating the water depth measuring device of the present invention.

Referring now to the drawings, the embodiments of the present invention are discussed.

Each embodiment of the present invention may be incorporated as a dive watch which is an electronic wrist watch with water depth measuring capability provided and the descriptions below incorporate the embodiments of the invention into a dive watch by way of example. Reference is first made to FIG. 1, herein. As shown in FIG. 1, a dive watch 1 as constructed in accordance with the invention includes an electronic watch body 2, and a pair of bands 3A, 3B attached to the watch body 2 at its 12 o'clock and 6 o'clock positions. Disposed on the front of the watch body is a display screen 4A made of an LCD panel 4. A number of operation switches are arranged around the watch body 2, though four switches 5A, 5B, 5C and 5D only are shown in FIG. 1. The display screen 4A is divided into a graphic display area 4B on its upper half for presenting depth change recording as a function of elapsed time, a display area 4C on its lower half for presenting alternately time and water depth, and a display area 4D on its right-hand side. The display area 4D indicates a depth variation along with the direction of variation.

The watch body 2 houses an electrical circuit that is arranged around a one-chip microcomputer 10 (FIG. 2), and the electrical circuit has at least a water depth measuring capability in addition to a wrist watch function. Also disposed on the watch body 2 is a pressure sensor 6 to provide the depth measuring function. The sensed signal produced by the pressure sensor 6 is digitized by an analog to digital A/D converter 17 and then processed to compute a depth. Typically available as a pressure sensor is a so-called diffusion-type semiconductor sensor, in which a diaphragm and a resistor are formed on a silicon chip.

Figure 2:
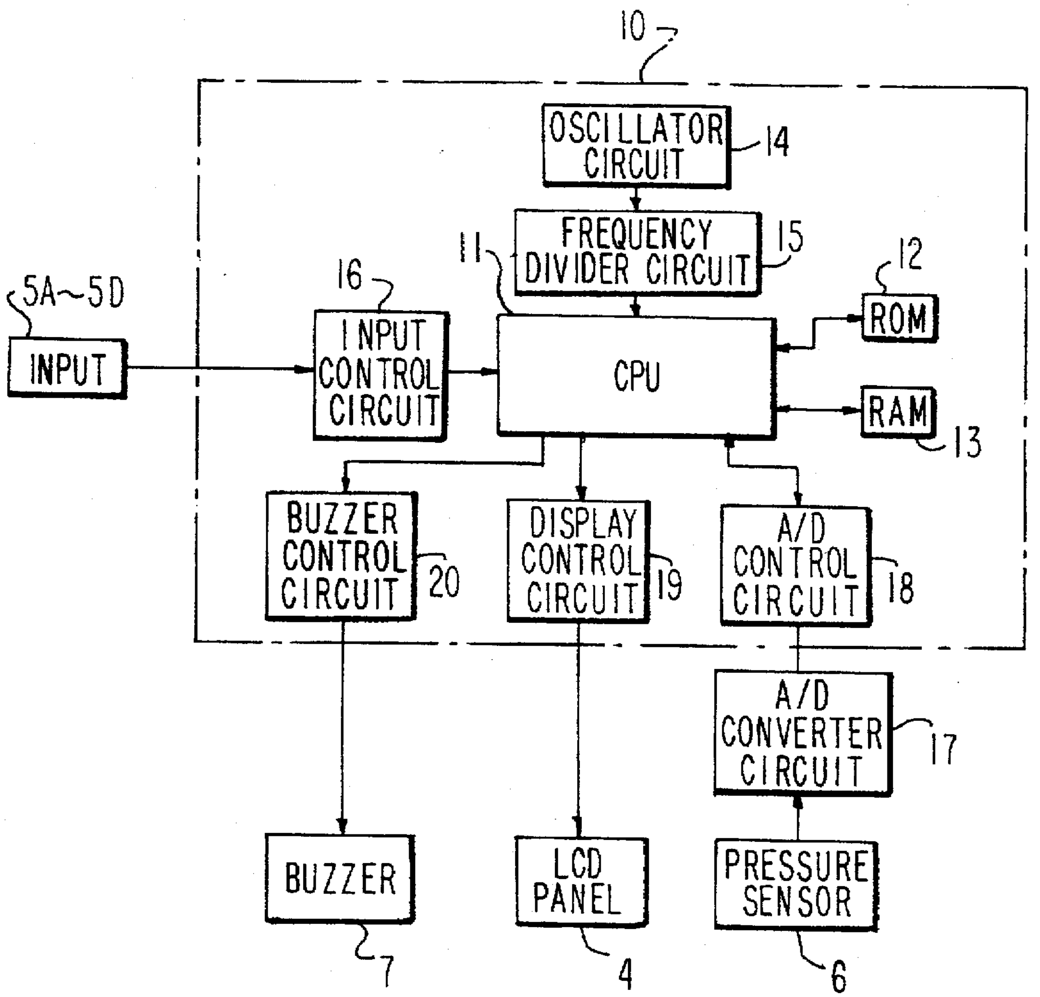
FIG. 2 is a block diagram showing the electric circuit built in the watch of FIG. 1 in accordance with the invention.

FIG. 2 is a block diagram showing diagrammatically the electrical circuit in the watch body 2. As shown, the electrical circuit is arranged around the microcomputer 10. The microcomputer 10 has a central processing unit (CPU) 11 as its core for controlling function, ROM 12 for storing a control program and the like is coupled to CPU 11 RAM 13 having a working memory area and a diversity of registers is also coupled to CPU 11 to provide a memory. Through a frequency divider circuit 15, the CPU 11 receives the reference pulse generated by an oscillator circuit 14 constructed of a crystal oscillator. The CPU 11 operates based on this timing pulse. Specifically, the output of the oscillator circuit 14 is used as the system clock, and is divided to 1 Hz, for example, for use as an interrupt control clock of the microcomputer 10. CPU 11 controls the stop and start of the microcomputer 10 and the entire system of the diver's watch. CPU 11 also has interrupt control over interruptions by signals internal and external to the microcomputer 10.

Input signals generated by the operations of operation switches 5A and 5D, as external interrupt signals, are sent to CPU 11 via an input control circuit 16. The sensed signal of the pressure sensor 6 is analog-to-digital converted into a digital signal by an A/D converter circuit 17, and then fed to CPU 11 via an A/D control circuit 18. CPU 11 drives an LCD panel 4 via a display control circuit 19 to display depth value and the like. Also, CPU 11 controls via a buzzer control circuit 20 a buzzer or built-in loudspeaker 7 to give an audible alarm when a depth set is reached. Each of the following block diagrams represents a mode of operation for microcomputer 10 in accordance with different embodiments of the invention.

Reference is now made to FIGS. 3–6 in which the operation of microcomputer 10 is demonstrated in greater detail.

Figure 3:
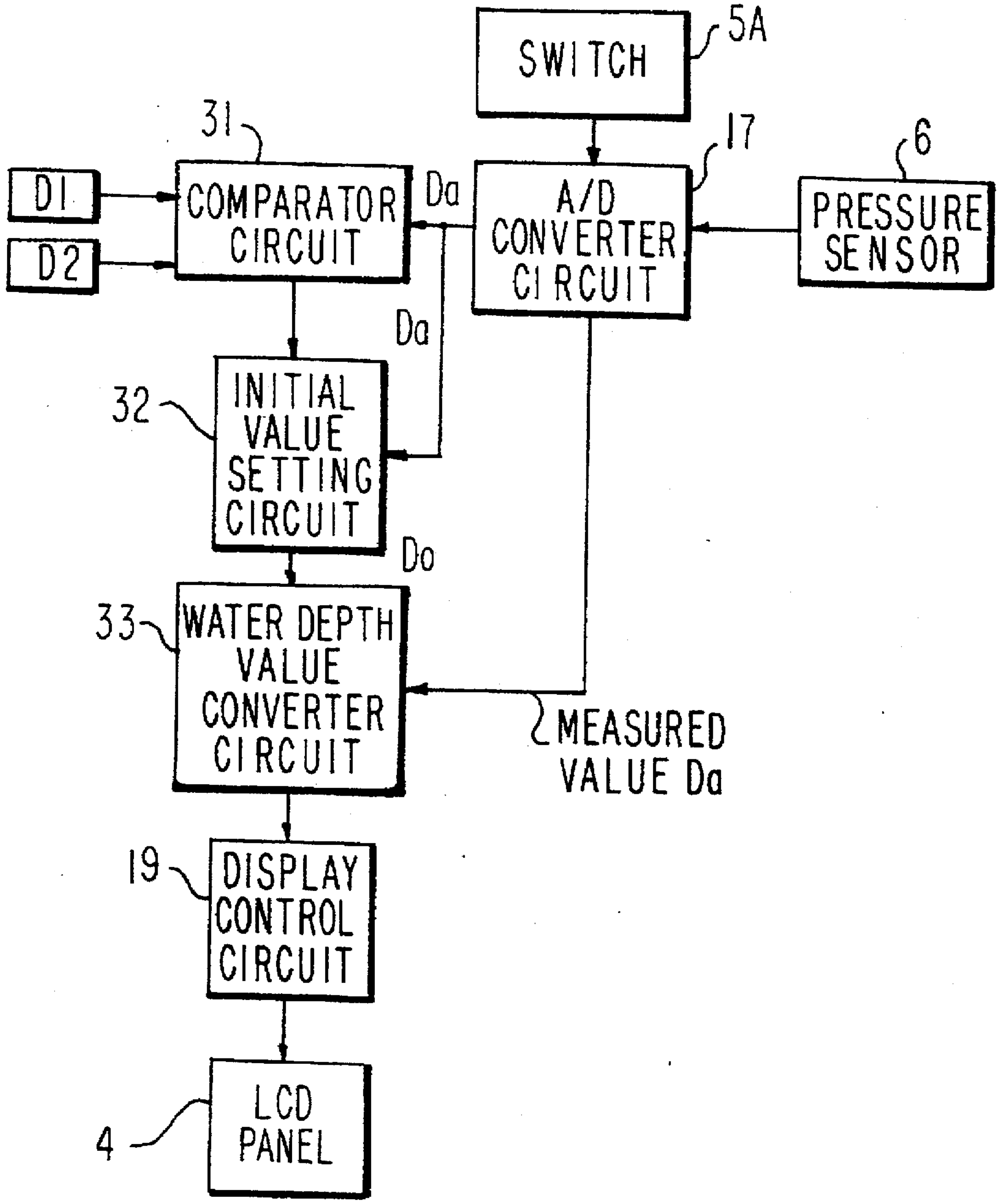
FIG. 3 is a block diagram of a water depth measuring device constructed in accordance with the invention.
Figure 4:
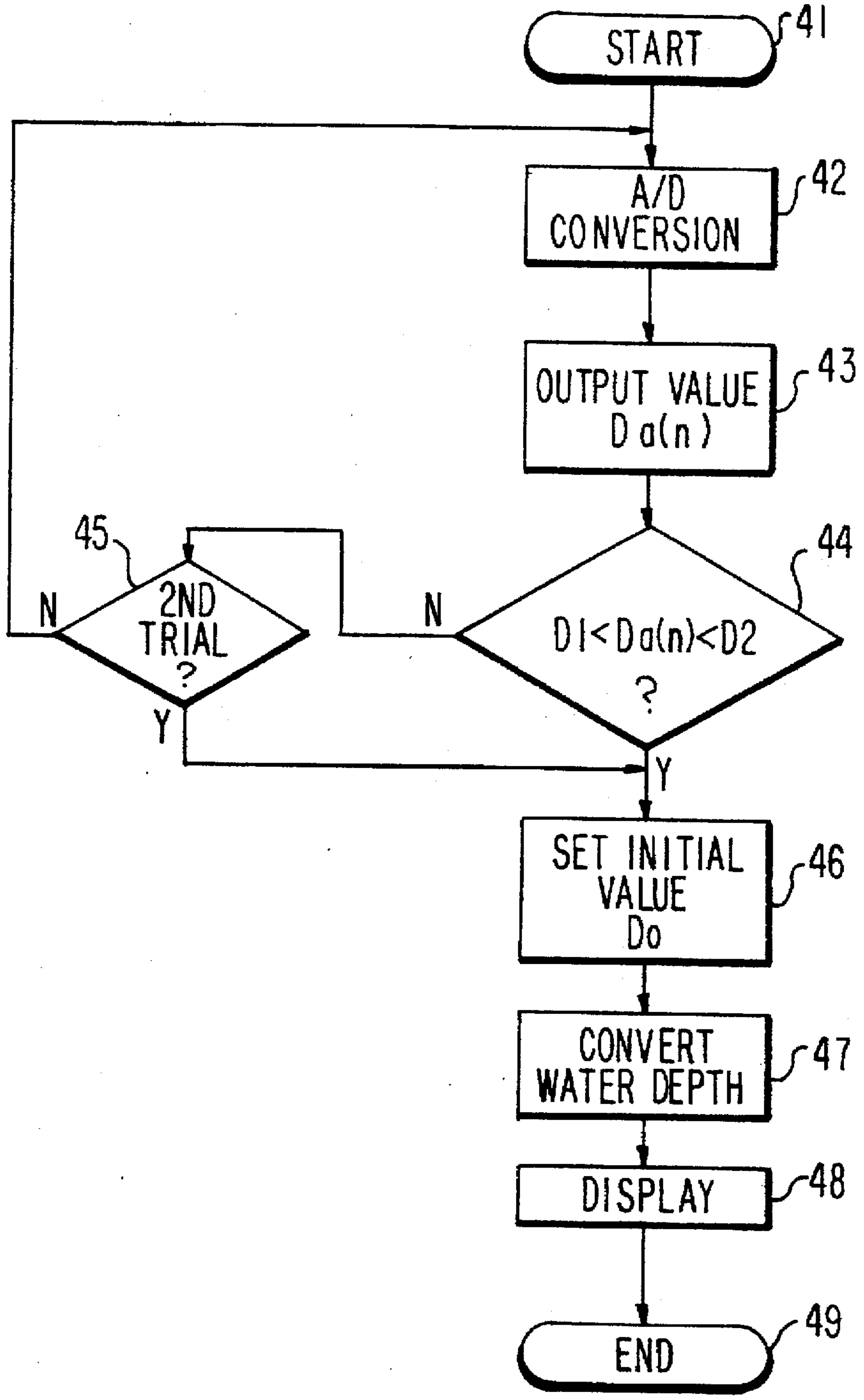
FIG. 4 is a flow diagram showing the operation of the embodiment of the invention shown in FIG. 3.

FIG. 3 is a block diagram of the dive watch having the water depth measuring and displaying capability. FIG. 4 is a flow diagram showing the operation of the dive watch of FIG. 3. In FIG. 3, the pressure sensor 6 senses a pressure change in gas or fluid in the form of analog signal, which is then fed to the A/D converter circuit 17. The A/D converter circuit 17 converts the input analog signal into a digital signal. The switch 5A works as a depth measuring start switch that switches the dive watch from a watch function during which there is no depth measuring function, to a depth measuring function. Once the switch 5A is pressed, the A/D converter circuit 17 operates at a predetermined frequency.

A comparator circuit 31 receives the output of A/D converter 17 and compares the A/D converted digital output signal Da with a first comparative value D1 and a second comparative value D2 stored in RAM 13. An initial value setting circuit 32 receives the output Da from A/D converter circuit 17 and the output of comparator circuit 31, and selects as an initial value Do a value from among a first initial value, a second initial value and the output value of the A/D converter circuit 17, in response to the determination result of the comparator circuit 31, and stores the selected value as Do. In this embodiment, the first comparative value D1 is set to be smaller than the second comparative value D2. A water depth value converter circuit 33 receives Do and Da and computes a depth value based on the initial value Do stored in the initial value setting circuit 32 and the output value Da of the A/D converter circuit 17 and provides an output to display circuit 1*a*. Display control circuit 19 allows the computed depth value output by water depth value converter circuit 33 to be output on the display area 4B of the LCD panel 4.

Referring to the flow diagram in FIG. 4, a series of steps from the operation of the switch 5A to the display of the depth value are discussed. When the switch 5A is pressed at step 41, the mode of the dive watch is shifted from no water depth measuring mode such as normal watch function, to the water depth measuring mode. At step 42, the A/D converter circuit 17 operates giving the initial output value Da at step 43. At step 44, the output value Da is compared by the Comparator circuit with the first and second comparative values D1, D2. When the output value is greater than the first comparative value D1, but smaller than the second comparative value D2, the program goes to step 46.

When the output value Da is smaller than the first comparative value D1 or greater than the second comparative value D2, the A/D conversion is repeated at step 42 to give a second output Da(2) at step 43. These steps are incorporated because when the switch is pressed even under normal conditions a diversity of factors such as an occasional application of pressure to the dive watch possibly works to put the output value out of the range defined by the first and second comparative values. By allowing step 44 to be repeated twice, an erroneous output value is rejected, and correct output is obtained. Repeated step 44 definitely indicates that the switch operation is not normal.

When the output value is smaller than the first comparative value D1 or greater than the second comparative value D2 for the second trial of step 44, the program goes from step 45 to step 46.

The first and second comparative values D1, D2 are set to be too extraordinary for a diver to encounter in normal use. Specifically, the first comparative value D1 is determined on the assumption that the diver's watch is used at a high altitude level high above sea level, and, in this embodiment, as high as 4800 m from sea level, namely under a pressure of 550 hPa. The second comparative value D2 is determined on the assumption that the switch 5A is pressed underwater, in this embodiment, under a pressure of 1200 hPa.

At step 46, the initial value Do, to be used as the measured water depth, is selected from among the first initial value Do(1), the second initial value Do(2), both predetermined according to the conditions below, and the offset value Da(n) obtained at step 43. The first initial value Do(1) is the output value of the A/D converter circuit 17 under a pressure of 550 hPa and the second initial value Do(2) is the output value of the A/D converter 17 under a pressure of 1013 hPa. In this embodiment, initial values Do are determined as follows:

(a) If first comparative value≧output value, then, initial value=first initial value (b) If second comparative value≦output value, then, initial value=second initial value (c) If first comparative value<output value<second comparative value, then, initial value=output value.

Case (a) condition prevents the depth value measured from being affected by a large meteorological or barometric change for a short period of time that frequently takes place on highland areas. Case (b) condition is intended for preventing an erratic measurement due to an underwater switching operation, and the initial value corresponding to a pressure of 1013 hPa, known as the pressure at sea level, is adopted. In case of a missing switching operation or an underwater switching operation, the system is automatically set to the initial value of the water surface. Assuming that the sea surface pressure is 1013 hPa, a pressure of 1200 hPa corresponds to a water depth of about 2 m. Thus, no automatic setting works if the underwater switching operation is performed within a depth shallower than 2 m. In such a case, however, the depth is shallow enough for the diver to quickly ascend for initial setting again on the sea surface. If case (c) condition is met, that switching operation is judged to be normal, and the output value is as the initial value.

Based on the initial value Do set at step 46, a water depth is computed at step 47. Specifically, the initial value Do is used as representing a water depth of 0 m. Based on this, the depth value corresponding to Da is computed. When the first initial value Do(1) is set as the initial value Do, all the values of the A/D converted output smaller than the initial value are converted to 0 m. For example, if the switching operation is made under a pressure of 450 hPa, a water depth of 0 m results down to the depth under a pressure of 550 hPa (namely, no negative presentation is made).

A pressure of 450 hPa is equivalent to an altitude of 6000 m above sea level. Considering the probability of occurrence of diving in such a high altitude area and a difference 100 hPa corresponding to a depth difference of about 1 m, the above setting practically presents no problem at all.

At step 48, the measured depth is presented on the display area 4B of the LCD panel 4.

As described above, a single switching operation switches the dive watch for water depth measuring, from non-water depth measuring mode to water depth measuring mode. The switching operation may be performed practically in any location under any conditions, and the system remains free from a substantial error that is attributed to a large barometric change or other factors.

Figure 5:
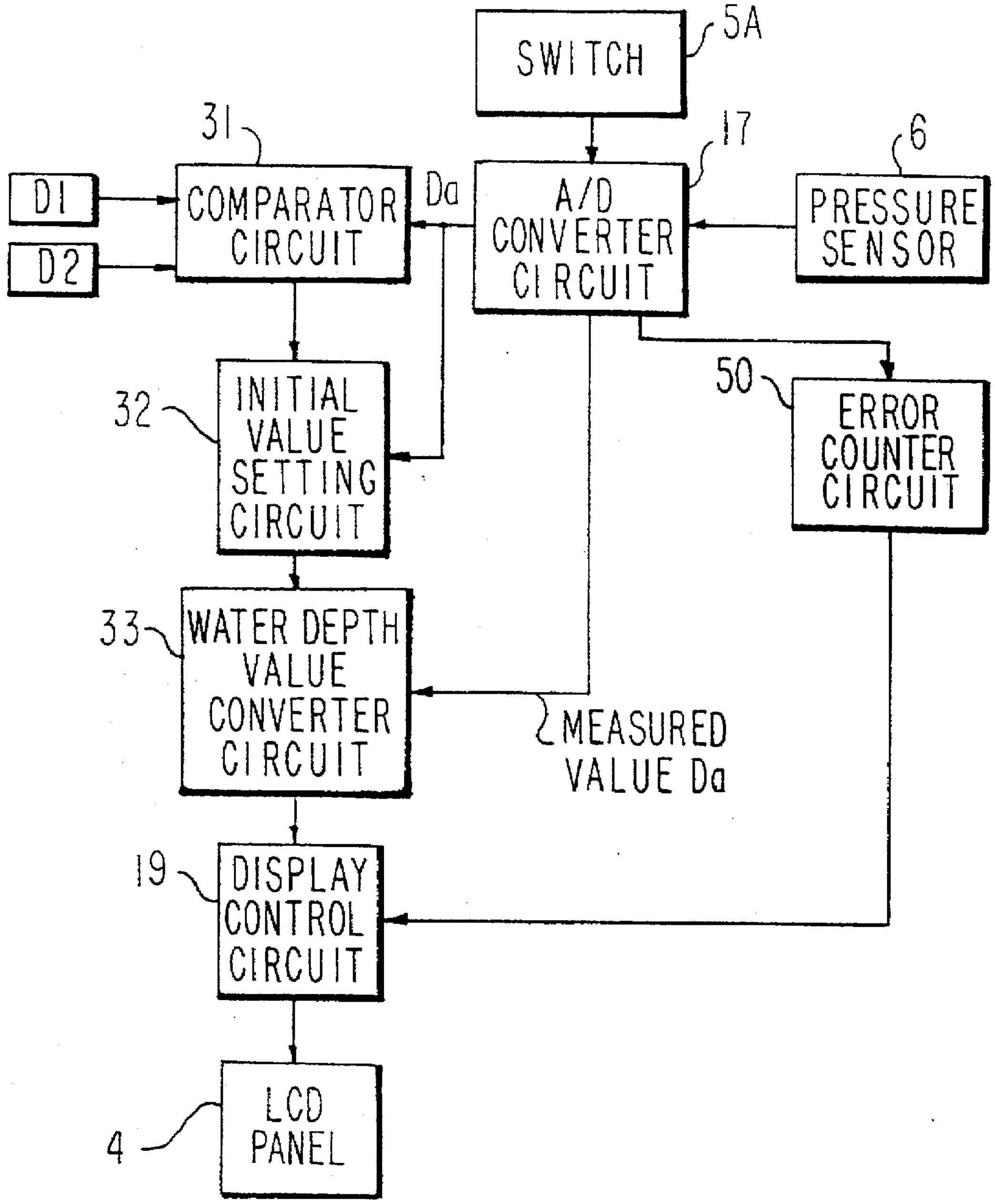
FIG. 5 is a block diagram of a second embodiment of a water depth measuring device constructed in accordance with the invention.
Figure 6:
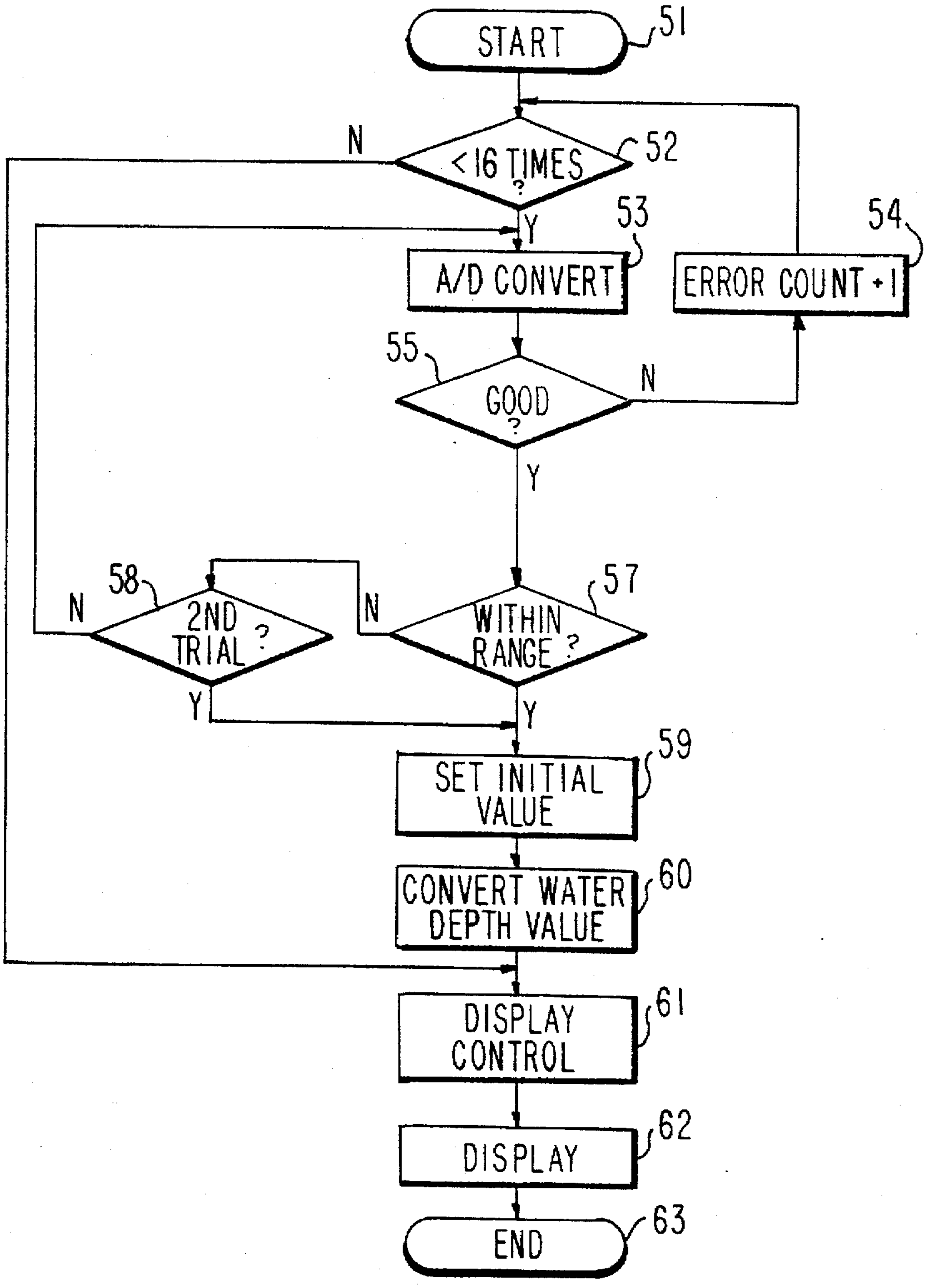
FIG. 6 is a flow diagram showing the operation of the embodiment of the invention of FIG. 5.

Reference is now made to FIGS. 5 and 6 wherein a second embodiment of a water depth measuring device is shown.

FIG. 5 is the block diagram of second embodiment. FIG. 6 is a flow diagram showing the second embodiment. Like numerals are used to indicate like structures. The difference in the second embodiment being that an error counter is added to receive output of A/D converter 17.

An error counter circuit 50 receives the output from A/D converter circuit 17 and counts the occurrences of unsuccessful conversion operation by the A/D converter circuit 17. Error counter circuit 50 provides a signal to display control circuit 19.

Referring to the flow diagram in FIG. 6, when the switch 5A is pressed at step 51, the non-water-depth measuring mode such as a watch function is switched to the water depth measuring mode. At step 52, the error counter circuit 50 in FIG. 5 counts the occurrences of unsuccessful operation by the A/D converter circuit 17. If the error count exceeds a predetermined count, the program jumps to step 61 and error count circuit 50 outputs a signal to display control circuit 19 so that display is controlled so that no water depth is presented. In one embodiment, the predetermined count, namely the error count threshold, is set to 16.

The unsuccessful operations of the A/D converter circuit 17 include an overflow of a counter that is one of the components that constitute the A/D converter circuit 17. Such an overflow signal may be picked up for counting. An overflow may be caused by unpredictably strong mechanical shocks, but the probability of the occurrence of such an overflow is quite low. Mechanical shocks, however, lead to a poor electrical contact, which is potentially serious in the application of water depth measurement. When the frequency of unsuccessful operations of the A/D converter circuit 17 is increased, the operation of the A/D converter circuit 17 itself must be suspended.

If the error count in step 52 does not exceed a predetermined count the program moves to step 53. At step 53, the A/D conversion operation is performed. At step 55, a determination is made whether the operation of the A/D converter circuit 17 is successful or unsuccessful. If an unsuccessful operation is detected, the error count of error counter circuit 50 is incremented by 1 at step 54, and the program returns to step 52. When no error is detected, the program goes to step 57. Water depth value, converted based on the initial value, should be as accurate as possible. The A/D conversion operation is performed by A/D converter 17 as long as an error count threshold of 16 is not exceeded, when the A/D conversion operation is unsuccessful. The output is compared with the first and second comparative values in step 57 by comparator circuit 31, and then the program branches off into steps 58 if not within the range of comparative values, where it is determined whether this is a first or second trial, and 59 if it is within the range where initial value setting circuit 32 selects an initial value. At step 60, the output of initial value setting circuit 32 is converted into a water depth value by water depth value converter circuit 33.

At step 61, water depth display is controlled by display control circuit 19 in response to the outputs of water depth control circuit 33 and A/D Converter 17. When the output of value described above is stored as the initial value, in the initial value setting circuit 32, the water depth value is displayed on the display area. When the first initial value or the second initial value is set, the resulting water depth value is displayed with flashing at 2 Hz, for example, 62 and the process ends in step 63. When the count of unsuccessful A/D conversion operations is in excess of 16 times, the water depth presentation is disabled. With a glance at a flashing water depth display, the diver can know it is corrected depth value possibly due to an underwater switching operation. If no depth value is presented, the diver may understand that there is something wrong with the A/D converter circuit and can take a corrective action to avoid a danger.

In the above modified embodiment, the erratic depth water measurement due to an erratic operation of the A/D converter circuit at the initial value setting is prevented. Even if a diver performs an incorrect switching operation, the resulting setting is automatically corrected. Furthermore, the display visibly notifies the diver that the resulting water depth value is a corrected one with a possibility of slight degree of error.

As described above a simple operation switches the mode of the system from non-water depth measuring mode to the water depth measuring mode. Even if the system is switched at a high altitude area or underwater, it presents a corrected water depth with substantially small error.

The corrected water depth value is displayed in a different fashion from the normal water depth value to notify the diver that the currently displayed value is the corrected one. Safe and reliable water depth measuring is thus achieved.

The dive watch system is free from erratic depth measurement due to abnormal operation of the A/D converter circuit in the initial value setting operation. Counting unsuccessful operations of the A/D conversion offers the diver a chance of detection of a failure at its early stage. Each of the above embodiments may be implemented into not only a dive watch but also a dive computer as well.

Figure 7:
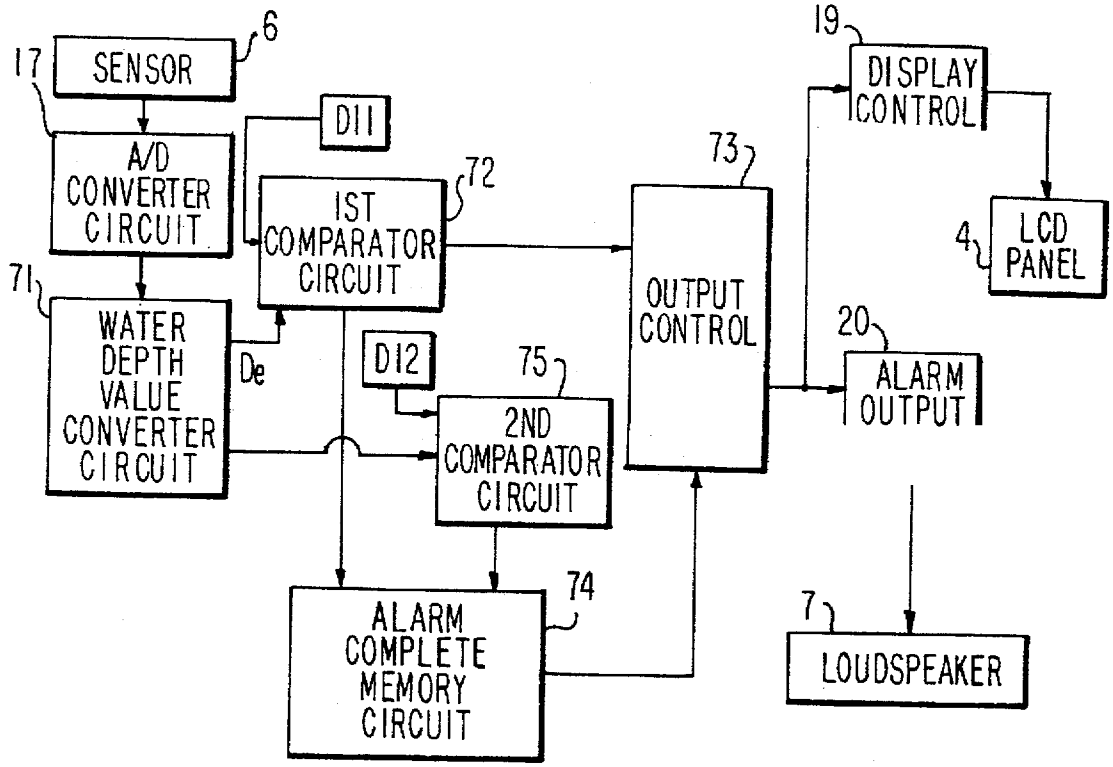
FIG. 7 is a block diagram of a third embodiment of a water depth measuring device constructed in accordance with the invention.
Figure 8:
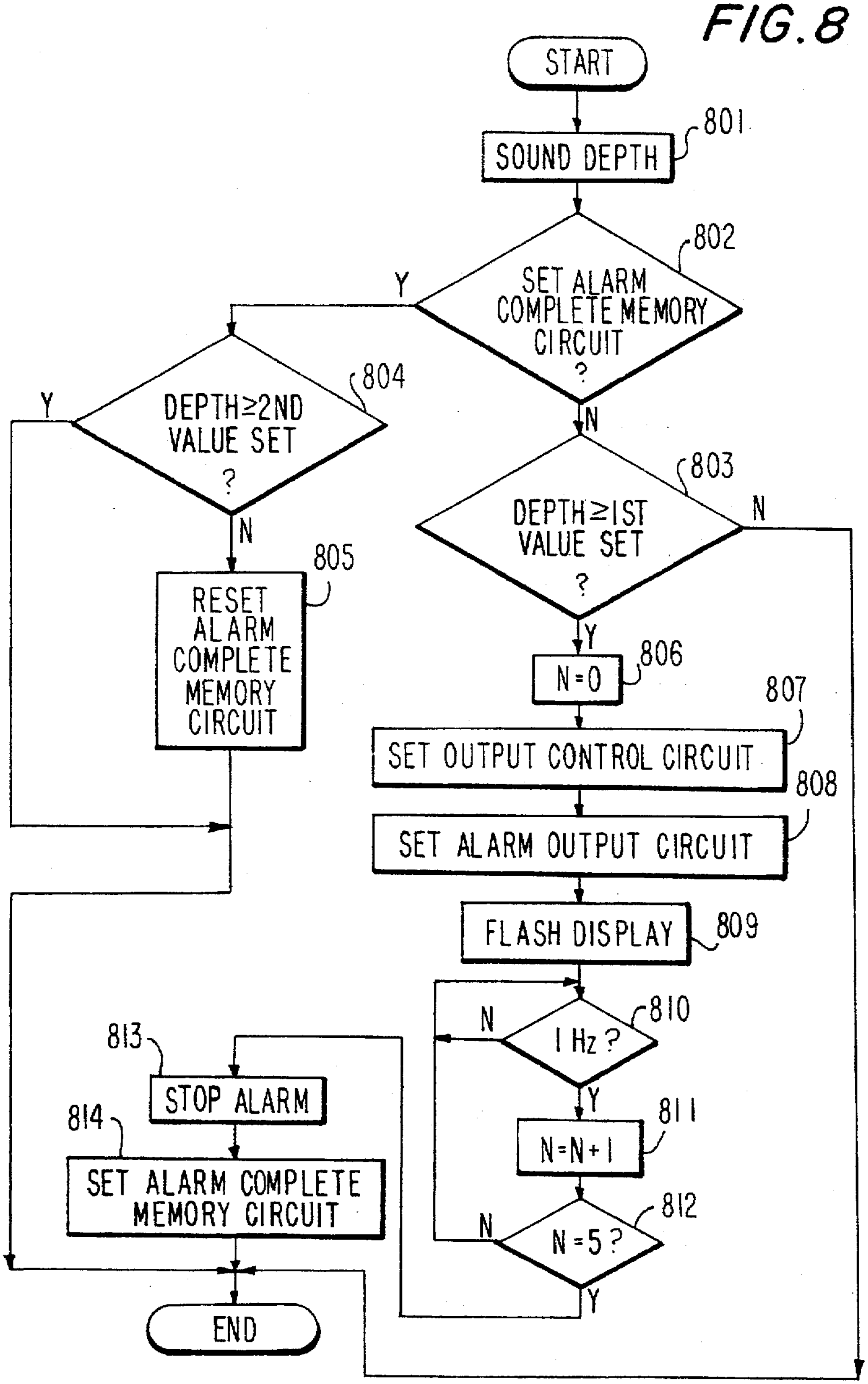
FIG. 8 is a flow diagram showing the operation of the embodiment of FIG. 7.
Figure 9:
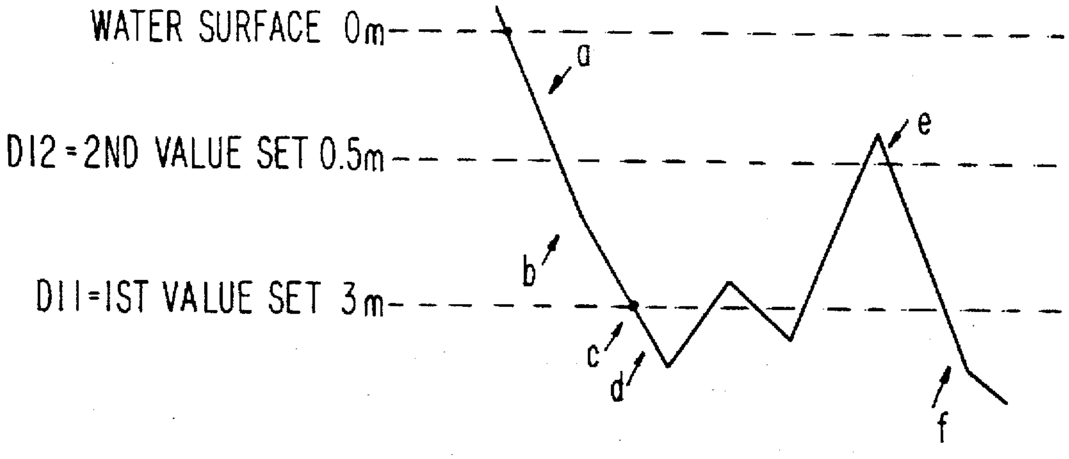
FIG. 9 is a schematic diagram of a dive profile.

Referring to FIGS. 7, 8, and 9, a third embodiment of the invention that is discussed.

FIG. 7 is a block diagram of the third embodiment showing the dive watch with alarm function. Like numbers are utilized to indicate like parts, the primary difference being the inclusion of an alarm and a second comparator. As shown, the pressure sensor 6 is connected to water depth value converter 71 via the A/D converter circuit 17. The water depth value converter 71 computes the water depth value in response to the output of the A/D converter circuit 17. The water depth measuring process remains unchanged from that of the above embodiment, and the discussion about that is omitted here.

The water depth computing circuit 71 is connected to a first comparator circuit 72 to which it outputs a depth signal De. A first water depth value D11 is input to comparator circuit 72. The first comparator circuit 72 compares the water depth value D11 with the measured water depth value De which is the output of the water depth value computing circuit 71. First comparator circuit 72 outputs a signal to an alarm complete memory 74. An output control circuit 73 receives a signal from comparator circuit 72 and alarm complete memory 74. If the first comparator circuit 72 determines that the computed or measured water depth De is greater than the water depth value D11, an output control circuit 73 is made operative by the output of comparator circuit 72 to give an alarm. The output control circuit 73 sends an alarm generation command signal to an alarm output circuit (speaker control circuit) 20. Upon receiving the alarm generation command signal, the alarm output circuit 20 operates, giving an alarm sound from a loudspeaker 7.

A display control circuit 19 connected to the output control circuit 73 is operative to allow the water depth value display to flash in synchronism with the generation of alarm on LCD panel 4. The first comparator circuit 72 is also connected to an alarm generation complete memory circuit 74. The alarm complete memory circuit 74 stores whether the first comparator circuit 72 issues an alarm generation command signal. Upon receiving the alarm generation command signal, the memory circuit 74 is set indicating that the alarm has already been generated. When the alarm complete memory circuit 74 is set, the output control circuit 73 is disabled to stop the alarm generation.

The alarm complete memory circuit 74 is connected to a second comparator circuit 75. The second comparator circuit 75 determines whether the measured water depth De, which is the output of the water depth value converter 71, is smaller than a second water depth value D12. If the second comparator circuit 75 determines that the output De of the water depth computing circuit 71 is smaller than the second water depth value D12, the second comparator circuit 75 resets the memory circuit 74. When reset, the memory circuit 74 enables the output control circuit 73.

Referring to FIGS. 8 and 9, the alarm generation control operation in this embodiment is discussed.

Reference is made to, first, the flow diagram in FIG. 8. After a water depth measurement in step 801, a determination is made of whether the memory circuit is set or not in step 802. When the memory circuit is not set, the measured water depth value De and the first water depth value set D11 are compared by comparator circuit 72 in step 803. Unless the measured water depth value De has reached the first water depth set D11, the program ends.

When the measured water depth value De is equal to or greater than the first water depth value D11 at step 803, an alarm time counter N in alarm complete memory circuit 74 is reset to 0 in step 806, the output control circuit 73 is set in step 807, the alarm generation command signal is sent to the alarm output circuit 20 by output control circuit 73 in step 808 and the display is flashed on LCD panel 4 by display control 19 in step 809. The counter N is set to be operative in step 811 if a 1 Hz signal from frequency divider circuit 15 exists as determined in step 810. Step 810 is repeated if no 1 Hz signal exists. The alarm is stopped in step 813 if it is determined that the counter N reaches a value (for example, 5). Step 810 is repeated if the value is not reached. The complete alarm memory circuit 74 is set in step 814, and the program ends. Therefore, in this case, the alarm is activated for 5 seconds.

When the memory circuit 74 remains set as determined in step 802, the measured water depth value De is compared with the second water depth value D12 by second comparator circuit 75 in step 804. When the measured water depth value De is greater or deeper than the second depth value D12, the program ends. When the measured water depth value De is smaller or shallower than the second water depth D12, the complete alarm memory circuit 74 is reset in step 805, and the program ends.

The flow diagram in FIG. 8 is now exemplified by applying it to the simulated dive profile of FIG. 9 with a value relative to zero meter depth set as the second water depth value D12. By way of example, an assumption is made that the first water depth value D11 is 3 m and the second water depth value D12 is 0.5 m.

Depth (a) in FIG. 9 represents a measured water depth of 0.3 m. Depth 0.3 m is measured by Sensor 6, A/D Converter 17 and water depth converter 71 (step 801). Since the memory circuit 74 is not set (step 802), the program goes to step 803. The measured water depth value De (0.3 m) is compared with the first water depth value set D11 (3 m). The measured depth 0.3 m is smaller than the first water depth set 3 m, and thus no alarm is activated.

Depth (b) is 1 m deep according to measurement. Since the memory circuit 74 is not set (802), the program goes to step 803. In this case, as in depth (a), the measured depth value is smaller or shallower than the first water depth value, and no alarm is triggered.

Depth (c) is 3 m deep according to measurement. Since the memory circuit 74 is not set (802), the program goes to 803. The measured depth value De equals the first water depth value D11. The output control circuit 73 is set (step 807), the alarm output circuit 20 is set (step 808), the alarm is triggered, and the depth value display is flashed (step 809). Once the alarm is triggered, the memory circuit 74 is set (step 814).

Depth (d) is 4 m deep according to measurement. The memory circuit 74 is already set (step 802). The measured water depth of 4 m is compared with the second water depth D12 (0.5 m) (step 804). Since the measured water of 4 m is deeper, no alarm is triggered.

Depth (e) is 0.4 m deep according to measurement. Successively after water depth measurement (step 801), the memory circuit 74 is already set (step 802). The measured depth value De is compared with the second water depth value set D12 (0.5 m) (step 804). Since the measured water depth value is shallower, the memory circuit 74 is reset (step 805).

Depth (f) is 4 m deep according to measurement. In succession to water depth measurement (801), the memory circuit 74 is already reset (802). The measured depth value De is compared to the first water depth set D11 (step 803). Since the measured water depth value is deeper, the output control circuit 73 is set (step 807), and the alarm generation command signal is sent to the alarm output circuit (step 808), triggering alarm again and flashing the depth display (step 809). The memory circuit 74 is again set (step 814).

In this embodiment, a depth value relative to zero meter depth is set to the second water depth value D12. Alternatively, a depth value as D12 may be set by percentage to the first water depth value D11. For example, if 10% is set when the first water depth value D11 is 3 m, the second water depth value D12 will be 2.7 m. If D11 is 4 m, the second water depth value D12 will be 3.6 m.

The first water depth value set D11 may be set and stored by operating the operation switch 5B (FIG. 1). It is perfectly acceptable that the second water depth value D12 is designed to be entered by its own control.

Figure 10:
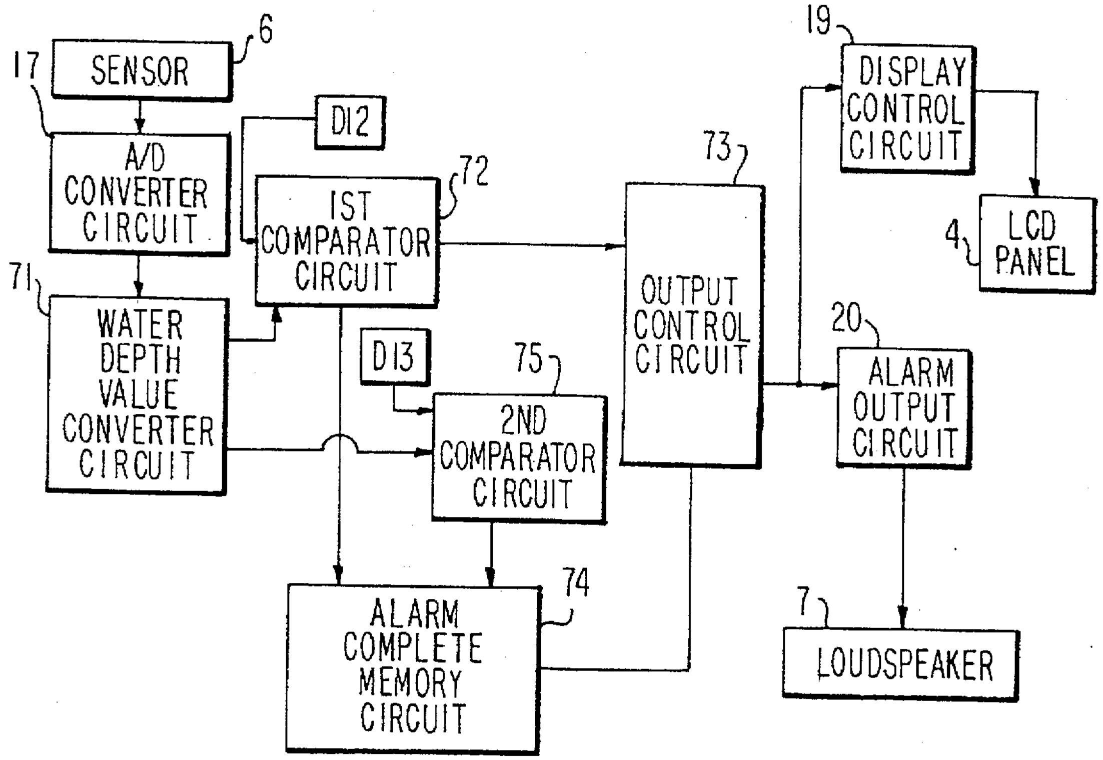
FIG. 10 is a block diagram of a fourth embodiment of the water depth measuring device constructed in accordance with the invention.

Reference is made to FIG. 10 which is the block diagram showing a fourth embodiment of the invention. Like numerals are utilized to identify like structures, the primary difference being different stored inputs for the first and second comparators. The pressure sensor 6 is connected to the water depth computing circuit 71 via the A/D converter circuit 17, which computes the water depth in response to the output of the A/D converter circuit 17. This arrangement remains unchanged from each of the previous embodiments.

The water depth value converter 71 is connected to the first comparator circuit 72, to which the second water depth value D12 is also fed. The water depth computing circuit 71 is also connected to the second comparator circuit 75, to which a third water depth value D13 is also fed. The first comparator circuit 72 compares the measured water depth value De which is the output of the water depth converter 71 with the second water depth value D12. The second comparator circuit 75 compares the measured water depth value De which is the output of the water depth computing circuit 71 with the third water depth value D13. When the first comparator circuit 72 determines that the measured water depth value De is equal to or greater than the second value D12, or when the second comparator circuit 75 determines that the measured water depth value De is equal to or smaller than the third value D13, the output control circuit 73 is activated to trigger alarm.

The output control circuit 73 issues an alarm generation command signal to the alarm output circuit 20 for a predetermined period of time. Upon receiving the alarm generation command signal, the alarm output circuit 20 operates to trigger an alarm on the buzzer 7. The display control circuit 19 connected to the output control circuit 73 allows the water depth display to flash along with audible alarm.

To perform alarm control, the memory circuit 74 stores whether or not the output control circuit 73 has operated. Once the memory circuit 74 stores the fact that the alarm has been triggered, it is set. When the memory circuit 74 is set, the output control circuit 73 is disabled.

The memory circuit 74 is connected to both the first comparator circuit 72 and the second comparator circuit 75. The first comparator circuit 72 compares the measured water depth De with the second water depth value D12 to verify that the measured water depth value De is smaller. The second comparator circuit 75 determines whether or not the measured water depth value De is greater than the third water depth value D13. When the first comparator circuit 72 determines that the measured water depth value De is smaller than the second water depth value set D12, or when the second comparator circuit 75 determines that the measured water depth value De is greater than the third water depth value D13, the memory circuit 74 is reset. When the memory circuit 74 is reset, the output control circuit 73 is enabled.

Figure 11:
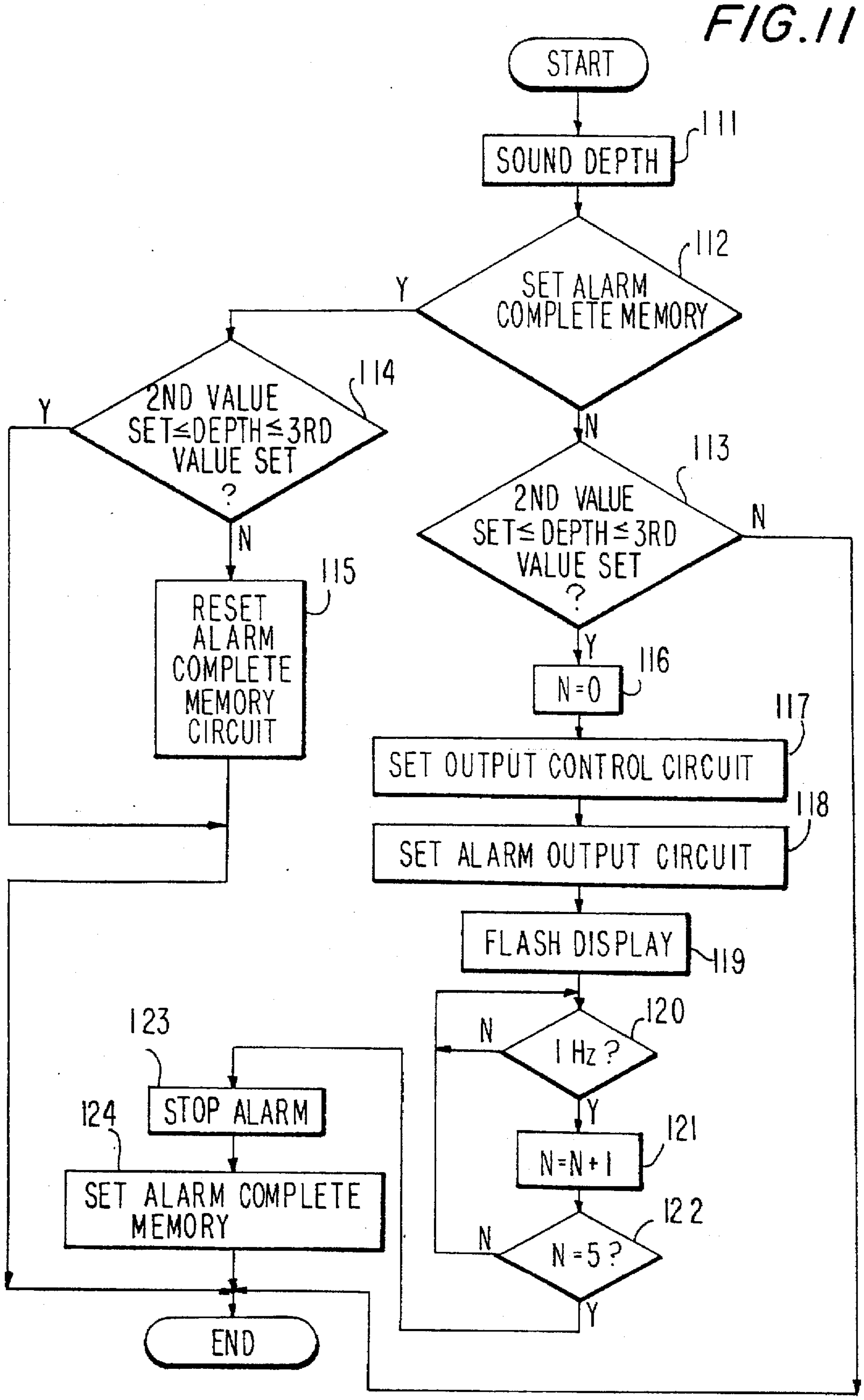
FIG. 11 is a flow diagram showing the operation of the Embodiment of FIG. 10.

Referring to the flow diagram in FIG. 11, the operation of this modified embodiment is discussed.

In succession to the water depth measurement in step 111, a determination is made of whether or not the memory circuit is set in step 112. When the memory circuit is not set, the measured value is compared with the second and third water depth values D12, D13 in step 113. When the measured value is smaller than the second value or greater than the third value, the program ends.

At step 113, when the measured value is equal to or greater than the second value set, or equal to or smaller than the third value set, the alarm time counter N is reset to 0 in step 116, the output control circuit 73 is set in step 117. The alarm generation command signal is sent to the alarm output circuit 20 in step 118 and the display is flashed in step 119. If it is determined that a 1 Hz signal exists in a step 120, the counter is increased by 1 in step 121 and the alarm is stopped in a step 123 if the counter N reaches a value (for example, 5) as determined in step 122. The memory circuit 74 is then set in step 124, and the program ends.

When the 1 Hz signal does not exist or when counter N has not reached the value then step 120 is repeated. When the memory circuit 74 is set in step 112, the measured value is compared to the second and third values in step 114. When the comparison verifies that the measured value is equal to or greater than the second value set or equal to or smaller than the third value set, the program ends.

When the measured value is smaller than the second value set or greater than the third value set, the memory circuit is reset in step 115, and the program ends.

Figure 12:
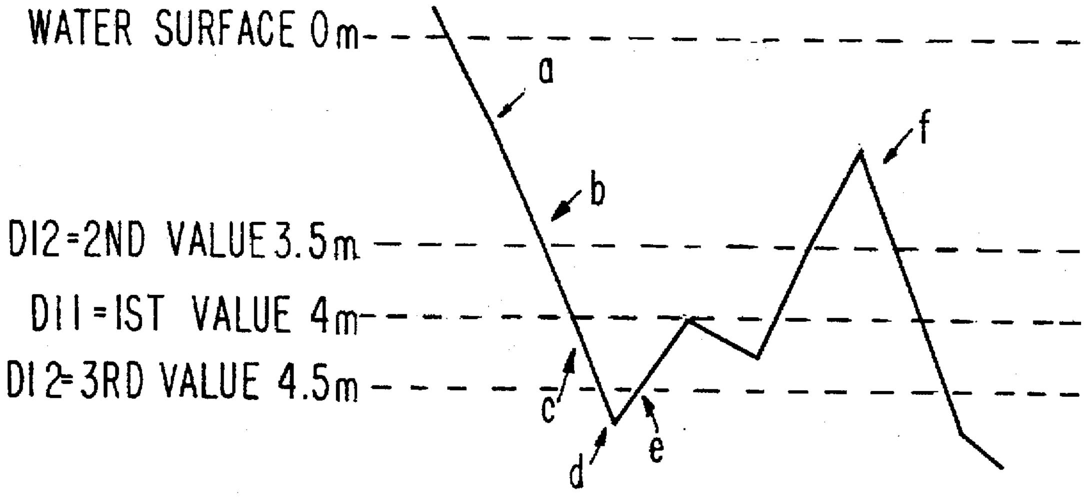
FIG. 12 is a schematic diagram of a dive profile.

The above-mentioned operation is exemplified along with a simulated dive profile in FIG. 12. In this, example an assumption is made as follows: the first water depth value D11 is 4 m, the second water depth value D12 is 3.5 m obtained by subtracting 0.5 m from D11, and the third water depth value D13 is 4.5 m obtained by adding 0.5 m to D11.

Depth (a) in FIG. 12 represents a measured water depth of 0.6 m. Depth 0.6 m is measured (step 111). Since the memory circuit 74 is not set (step 112), the program goes to step 113. The measured water depth value De (0.6 m) is smaller than the second value set, 3.5 m, and no alarm is thus activated.

Depth (b) is 3.5 m deep according to measurement. Since the memory circuit 74 is not set (112), the program goes to step 113. The measured value is compared with the second value set and third value set (step 113). The measured depth, 3.5 m, agrees with the second value set, 3.5 m. The output control circuit 73 is set (step 117), and the alarm generation command signal is sent to the alarm output circuit 20 (step 118), thereby triggering alarm and flashing the water depth display (step 119). Once the alarm is triggered, the memory circuit 74 is set (step 124), and the program ends.

Depth (c) is 4.2 m deep according to measurement. Depth measurement shows a depth of 4.2 m (step 111) and the memory circuit 74 is set (step 112). The program goes to step 114. The measured value is compared with the second and third values (step 114). Since the measured depth of 4.2 m is neither smaller than the second value nor greater than the third value, no alarm is triggered.

Depth (d) is 5 m deep according to measurement. Depth measurement shows a depth of 5 m (step 111) and the memory circuit 74 is set (step 112). The measured value is compared with the second and third values (step 114). Since the measured value exceeds the third value, the memory circuit is reset (step 115).

Depth (e) is 4.5 m deep according to measurement. Depth measurement shows a depth of 4.5 m (step 111) and the memory circuit 74 is not set (step 112). The program goes to step 113. Because the measured value and the third value are equal the output control circuit (step 117). The alarm generation command signal is sent to the alarm output circuit (step 118), thereby triggering alarm and flashing the display (step 119). Once alarm is triggered, the memory circuit is set (step 124) and the program ends. Depth (f) is 2 m deep according to measurement. Depth measurement shows a depth of 2 m (step 111) and the memory circuit 74 is set (step 112). The measured value is compared with the second and third values (step 114). Since the measured value is not greater than the second value, the memory circuit is reset (step 115).

As described above, according to these embodiments, the watch system alerts audibly and visually a diver when a set depth is reached or exceeded, and indicates to the diver that he or she is already in a dangerous depth range. The diver recognizes alarm without looking at the display on the watch.

Therefore, the diver is released from the workload of constant monitoring to the watch and can dive paying more attention to other instruments or the environment around the diver. This allows the diver to enjoy diving in a safe and pleasant manner.

Even if the diver stays in the vicinity of an alarm depth range, no further alarm is triggered once an alarm has been triggered. However, when a variation in depth exceeds a threshold, alarm is triggered again. The diver can thus recognize a reached target depth or dangerous depth, while keeping depth measurement disable time minimized. A more safe diving is thus possible. Also, repeated alarm is not preferred in that it may be distracting to the diver and that it may be a cause of a short life of a battery.

When an alarm setting is made by a depth range, alarm is triggered as long as the diver is within that range. By using the first comparator circuit, the depth display is flashed when the measured depth exceeds a depth alarm area. The watch thus alerts the diver audibly and visually that he or she has reached a target or dangerous water depth. Redundancy in alerting the diver is thus assured.

Reference is now made to FIGS. 13–19, in connection with a fifth embodiment of the invention. The arrangement of the control system in this embodiment remains unchanged from that in the first embodiment of the invention. In this embodiment, computation process for computing a water depth from a sensed pressure is performed every second, in synchronism with the 1 Hz signal the oscillator circuit 14 provides through the frequency divider circuit 15 (FIG. 2). Under control of CPU 11, a difference, DD, between the water depth De(n−1) that was stored in RAM 13 from a depth measurement performed one second earlier and the current water depth De(n) is calculated. CPU 11 drives the display area 4D of the LCD panel 4 through the display control circuit 19 in order to selectively light display segments in response to the calculated difference.

Figure 13:
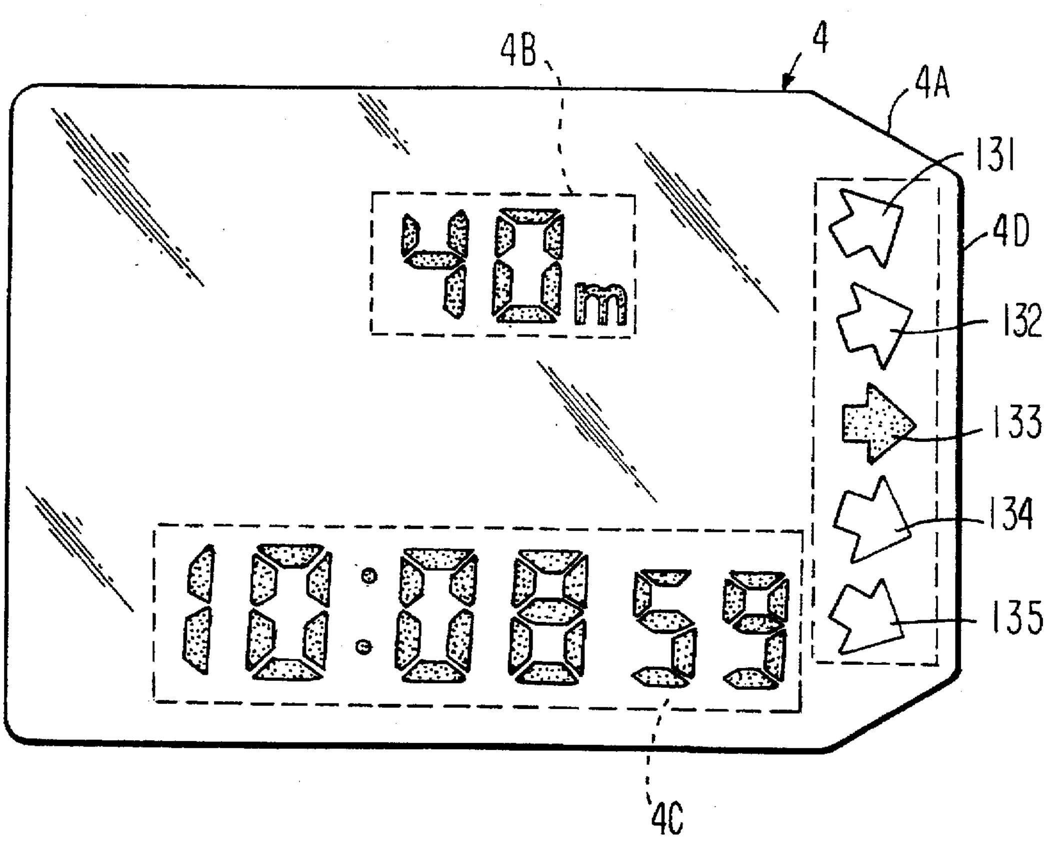
FIG. 13 is a top plan view of a watch constructed in accordance with a fifth embodiment of the invention including an ascend/descend graphic display area formed on the face of the watch.

FIG. 13 shows an example of the display area 4A of the LCD panel 4 which is applicable to this embodiment. As shown, the display area 4B presents a water depth value, the display area 4C presents time, and the display area 4D presents a display segment that is lit in response to the difference calculated as above.

The display area 4D is a descend/ascend graphic display area for presenting a variation in water depth. The display area 4D is constructed of five segments, 131 through 135, one of which is selectively driven. The depth difference between the preceding depth and the current depth is graduated at five levels. Namely, when the center segment 133 is lit, no depth variation takes place. Upper segments 132, 131 above the center segment 133 indicate an upward changing depth. The top segment 131, if lit, indicates that depth goes shallower at a high speed. The segment 132 below the top segment 131, if lit, indicates that depth goes shallower but at a low speed.

The lower segments 134, 135 indicate a downward changing depth at a high and low speeds, respectively. The bottom segment 135, if lit, indicates that depth goes deeper at a high speed. The segment 134 above the bottom segment 135 indicates that depth goes deeper at a low speed.

The calculation method of the speed of depth ΔD is now discussed. Let De(t) represent a depth computed at the current time t and De(t−1) represent a depth that was stored in RAM 1 at time (t−1), 1 second before. The depth difference ΔD between the current time t and 1 second before is expressed as follows:

$$\Delta D = De(t-1) - De(t)$$

Speed quantization for each segment is set up as follows. The top segment 131 covers a speed range of $+1\ \mathrm{m} \leqq \Delta D$. The segment 132 covers a speed range of $+0.5\mathrm{m} \leqq \Delta D < +1\ \mathrm{m}$. The center segment 133 covers a speed range of $-0.5\mathrm{m} < \Delta D < +0.5\mathrm{m}$. The segment 134 covers a speed range of $-1\mathrm{m} < \Delta D \leqq -0.5\mathrm{m}$. The bottom segment 135 covers a speed range of $\Delta D \leqq -1\mathrm{m}$.

These comparative values against ΔD are desirably determined, in view of patterns of underwater action permitted for one second, which are less mobile than on the ground.

When staying or moving around at the same depth for a long time such as deep diving using decompression technique, the diver is released from constantly monitoring the water depth, and thus can pay more attention to other things, for example, not to risk decompression sickness. In shallow diving that needs no decompression technique, for example, in a swimming pool, people can simply enjoy watching the device changing in its graphic display.

In this embodiment, the time interval for the depth difference is 1 second. Alternatively, the time interval and the difference value may be varied to be adaptable for use in a wide range of apparatus from portable to fixed installation types.

As described above, according to this embodiment, in an underwater environment where a diver suffers a substantial loss of their thinking power and freedom of physical mobility, water depth display only is not sufficient for the diver to know the present situation. The watch system according to this embodiment offers in a simple and clear manner information that clarifies whether he is ascending or descending and what depth difference the diver has moved from the previous depth. With the aid of this watch system, a safe diving is performed. In shallow diving in a few meters deep water, people can enjoy watching the device.

Figure 14:
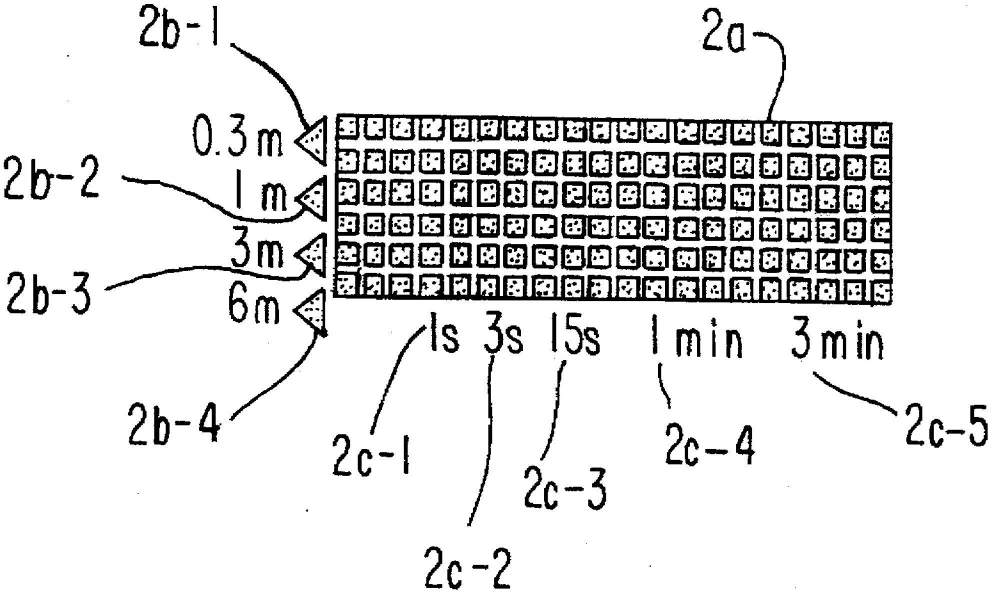
FIG. 14 is a schematic view of a watch graphic display area operated in accordance with a sixth embodiment of the invention.

Referring to FIGS. 1, 2, 14 through 23 a dive watch which operates in accordance with a sixth embodiment is now discussed. FIG. 14 shows the graphic display area 4B of the display screen 4A in the LCD panel 4. The display area 4B is constructed of 120 display segments **2*a* arranged in 20 columns and 6 rows. Disposed to the left-hand end of the display segments 2*a* are vertical scale display segments generally indicated as 2*b* and individually indicated as 2*b*-1 through 2*b*-4. Also disposed to the bottom end of the display segments 2*a* are horizontal display segments generally indicated as 2*c* and individually indicated as 2*c*-1 through 2*c*-5**.

FIG. 15 through FIG. 19 show the state in which the vertical scale and the horizontal scale are independently operative.

Figure 15:
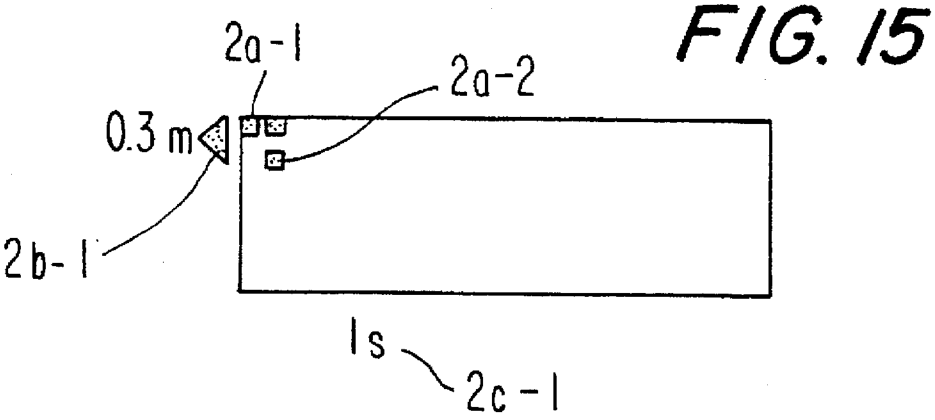
FIG. 15 is view of the display area of FIG. 14 immediately after the start of water depth measurement.

FIG. 15 shows the state immediately after depth measuring is started by the operation of the operation switch 5A. Displayed on the display area 4B are a first measured value **2*a*-1 and a second measured value 2*a*-2. Displayed now on the vertical scale display segments 2*b* is 2*b*-1, and a single segment 2*a* covers a depth range of 0.3 m. Therefore, the entire range of the vertical display area covers a depth range of 1.8 m. (6 rows×0.3 m). A minimum scale presentation 2*c*-1 is presented on the horizontal scale display segment 2*c***, and the segment interval currently in use is 1 second. The entire range of the horizontal display area covers 20 seconds (20 columns×1 second).

Figure 16:
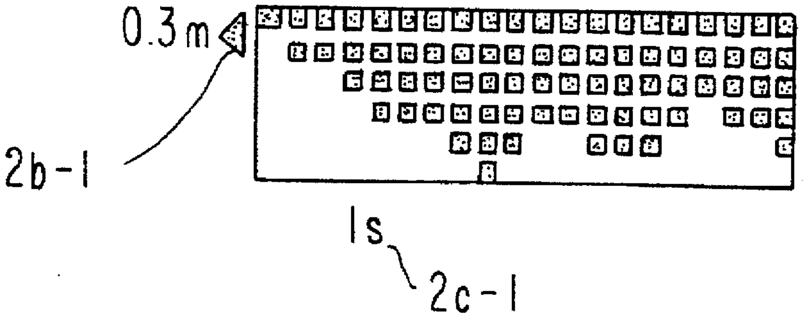
FIG. 16 is a view of the display area of FIG. 14, 19 seconds after the start of water depth measurement.

FIG. 16 shows the display example of the display area 4B, 19 seconds after the start of water depth measurement, in succession to the state of FIG. 15. The entire depth range is 1.8 m. The vertical scale display segment **2*b*-1 is displayed as in FIG. 15. All 20 display segments on the horizontal axis are fully presented, and at a next depth measurement, the display in FIG. 16 will change into the one shown in FIG. 17**.

Figure 17:
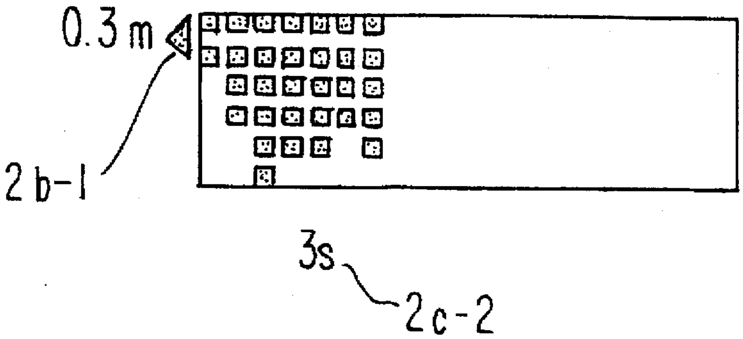
FIG. 17 is a view of the display area of FIG. 14, 21 seconds after the start of water depth measurement.

FIG. 17 shows a display example of the display area 4B, 21 seconds after the start of water depth measurement. At the elapsed time of 21 seconds, the entire depth range presented is 1.8 m. As in FIG. 15 and 16, the vertical scale display segment **2*b*-1 is presented. 2*c*-2 on the horizontal scale display segments is presented so that measured data obtained at elapsed time 20 seconds thereafter are presentable. Segment interval on the horizontal scale display segment 2*c*-2** is 3 seconds, and thus the entire range of the horizontal axis covers 60 seconds, thus 1 minute. The vertical scale remains unchanged, but the horizontal scale only is changed.

Discussed next is how the water depth data previously presented changes when the presentation in FIG. 16 is switched to that in FIG. 17.

FIG. 16 shows data at intervals of 1 second. To switch to the presentation in FIG. 17, where intervals are 3 seconds, 3 data segments must be reduced to 1 data segment. In this embodiment, the maximum one among the three data for 3 seconds is adopted by CPU 11 to be used as data for FIG. 17. Specifically, the maximum data are picked up from each of the time bands of 1 to 3 seconds, 4 to 6 seconds, 7 to 9 seconds, 10 to 12 seconds, 13 to 15 seconds, 16 to 18 seconds, and 19 to 20 seconds, and presented from the left-hand end of the display area.

Figure 18:
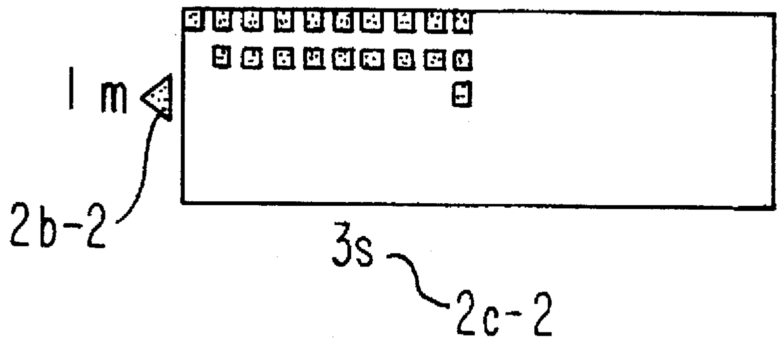
FIG. 18 is a view of the display area of FIG. 14, 30 seconds after the start of water depth measurement.

A discussion of the vertical scaling follows. FIG. 18 shows a display example of the display area 4B, 30 seconds after the start of water depth measurement. The depth measured at 30 seconds is 3 m, and this range cannot be accommodated within the scale in FIG. 17. The vertical scale is changed, presenting a vertical scale display segment 2*b*-2. In the vertical scale display segment 2*b*-2, a single display segment 2*a* covers a depth range of 1 m. The entire range of the vertical axis covers 6 m. When the vertical axis is scaled, the depth graph previously presented is contracted to match the new scale. In this case, the vertical scale only is changed while the horizontal scale remains unchanged.

When 60 seconds have passed since the start of depth measuring, the horizontal display segments are fully used. With a further depth data fed, horizontal display segments 2*c*-3 are presented with segment intervals at 15 seconds. In this scaling, as already described, the maximum one among the data for 15 seconds is selected to represent all data for 15 seconds.

Figure 19:
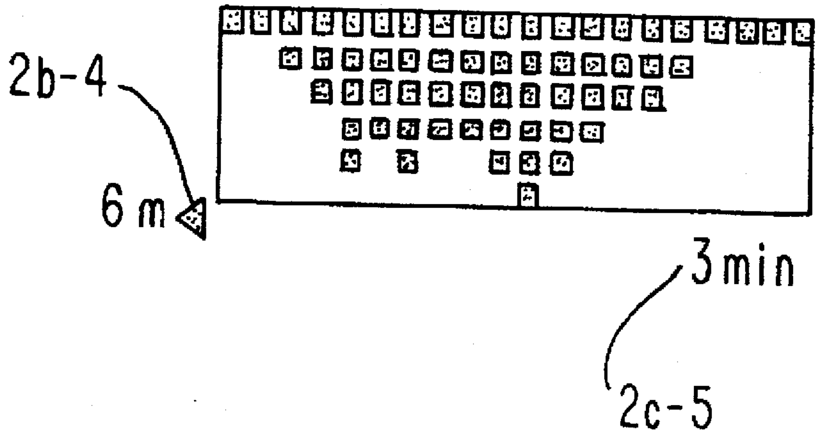
FIG. 19 is a view of display area of FIG. 14, in its largest expanded scale.

As time elapses further with the horizontal display segments fully used, horizontal display segments 2*c*-4 having segment intervals of 1 minute are presented on the horizontal scale. As time elapses further with the horizontal display segments fully used again, horizontal display segments 2*c*-5 having segment intervals of 3 minutes are presented as shown in FIG. 19. The maximum data for each interval are selected here again.

When the horizontal display segments 2*c*-5 are fully used, namely, when 60 minutes have passed since the start of water depth measuring, new data entry is stopped, updating the graph is stopped and the graph is retained.

This function allows the graph to be retained at the maximum scale setting and the obtained data not to be lost if left intact.

As for the vertical scaling, as already mentioned, when the system is fed with data that cannot be accommodated within the vertical scale in use, a vertical scaling is performed to vertical scale display segments 2*b*-3, 2*b*-4, which cover individually a depth range of 3 m and 6 m, respectively.

By allowing the vertical axis and the horizontal axis to be scaled independently, an easy-to-see graph is constantly presented. Furthermore, by presenting the graph from its starting point to ending point on the time axis, the entire depth change recording from the start of depth measuring to the current time is constantly visible.

The above independent scaling operation of the vertical and horizontal axes is software-controlled by the microcomputer 10 shown in FIG. 1. This operation is now discussed referring to the flow diagram in FIG. 20.

Figure 20:
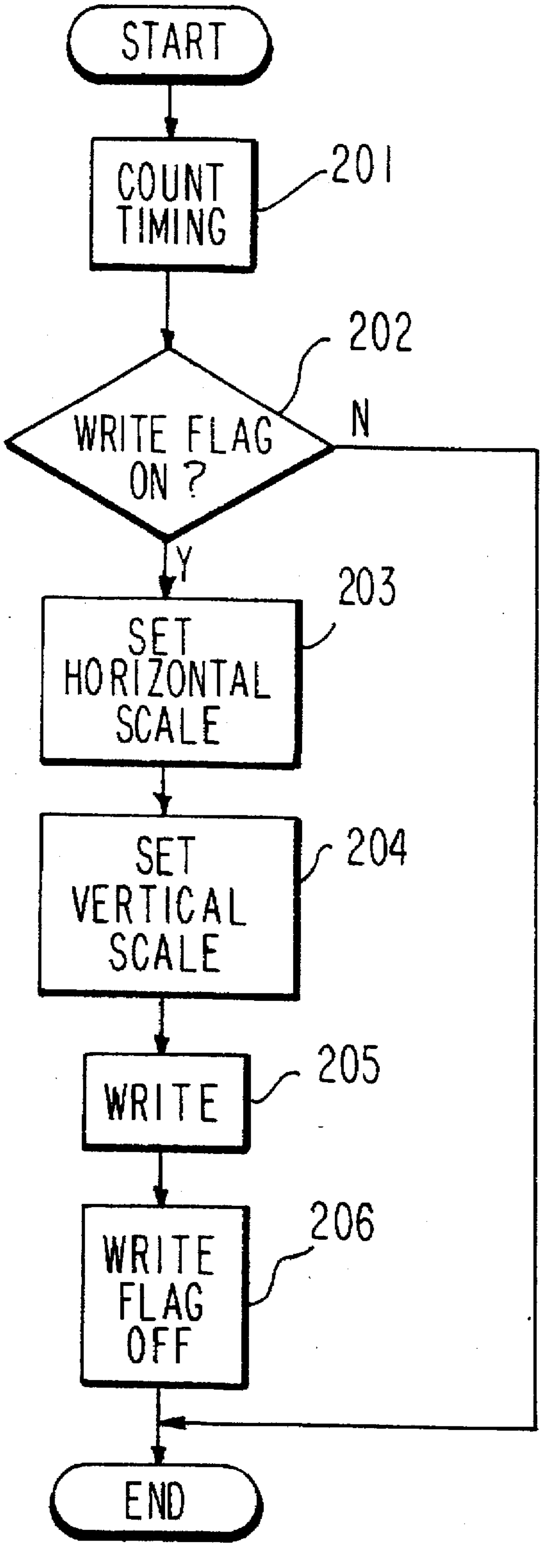
FIG. 20 is a flow diagram showing a scaling operation in accordance with the invention.

FIG. 20 shows the flow of the general operation for scaling. When water depth measuring is initiated by the operation switch 5A, the microcomputer 10 counts timing pulses at step 201, and performs water depth measurement according to the horizontal scale in use. At step 202, a determination is made of whether writing on the display area 4B is possible or not according to a write flag, namely, a determination is made of whether or not 20 dots or segments 2*a* on the horizontal axis are already displayed. When all 20 dots are not displayed, the scaling operation ends. When 20 dots of display segments 2*a* are displayed the write flag is ON, the horizontal scale is changed to a predetermined new scale at step 203. At step 204, the measured depth value is compared with the current vertical scale, the vertical scaling to be detailed later is performed as necessary.

After these series of steps, a write operation to the display area 4B is performed at step 205. At step 206, the write flag is set to OFF, and the program ends.

Figure 21:
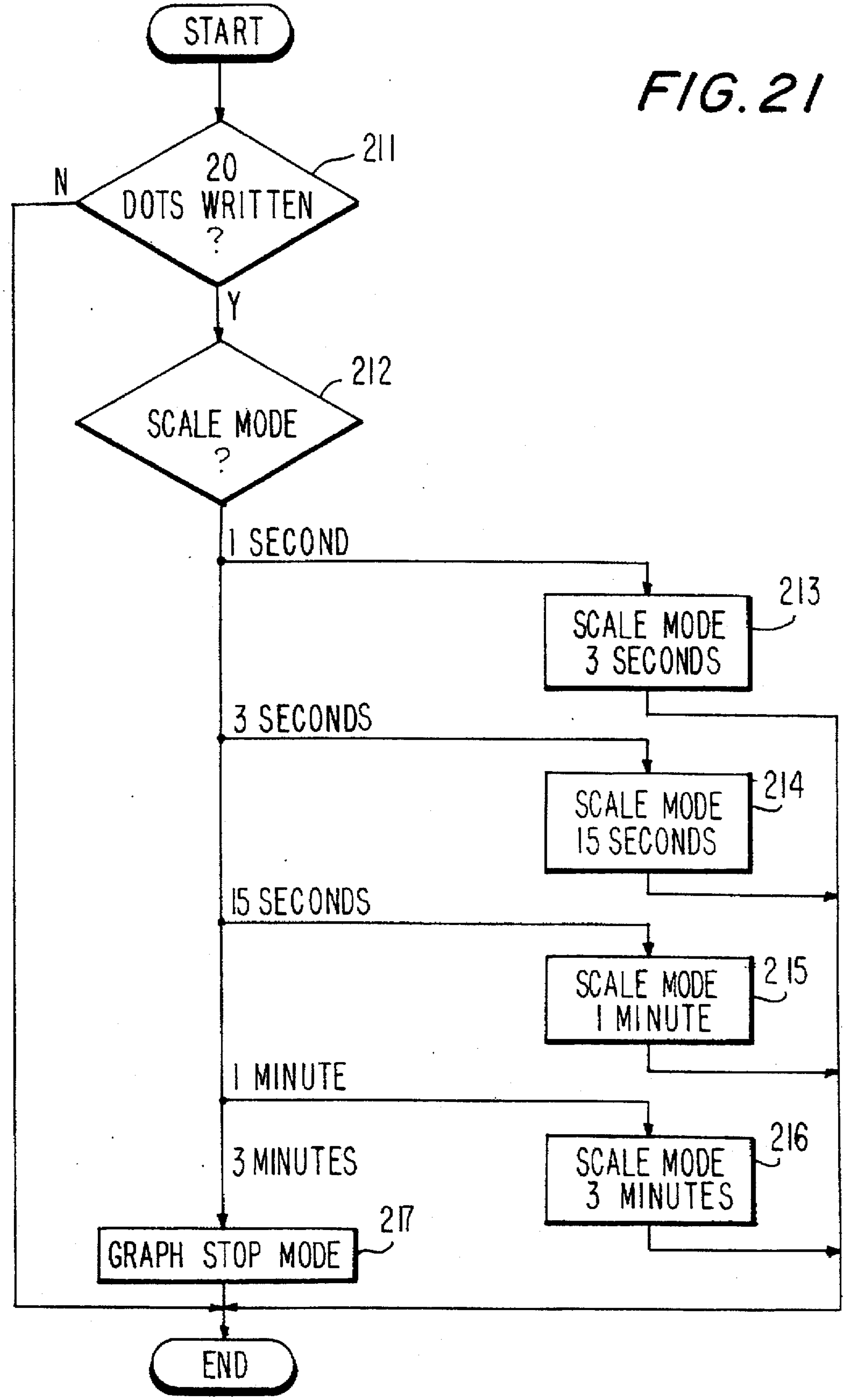
FIG. 21 is a flow diagram showing one example of a horizontal scaling operation in accordance with the invention.

The general operation has been discussed. The vertical and horizontal scalings are now individually discussed. FIG. 21 is the flow diagram showing the horizontal scaling operation. In succession to the water depth measuring, when the display segments 2*a* of the horizontal 20 dots are already written at a graph write timing at step 211, the horizontal scale mode is verified at step 212. When the dots are not written, the program ends. When the horizontal scale is 1 second segment intervals, the horizontal scale is changed to 3 second segment intervals at step 213. The horizontal graph display is contracted as already mentioned, and the writing operation to the display area 4B is completed. When the horizontal scale is 3 second, 15 second, or 1 minute intervals, the horizontal scaling is performed in the same manner at steps 214, 215, or 216.

When the horizontal scale is found to be the maximum available scale, 3 minute intervals in this embodiment, graph update mode is stopped at step 217. The graph is retained as it is, and the horizontal scaling ends.

Figure 22:
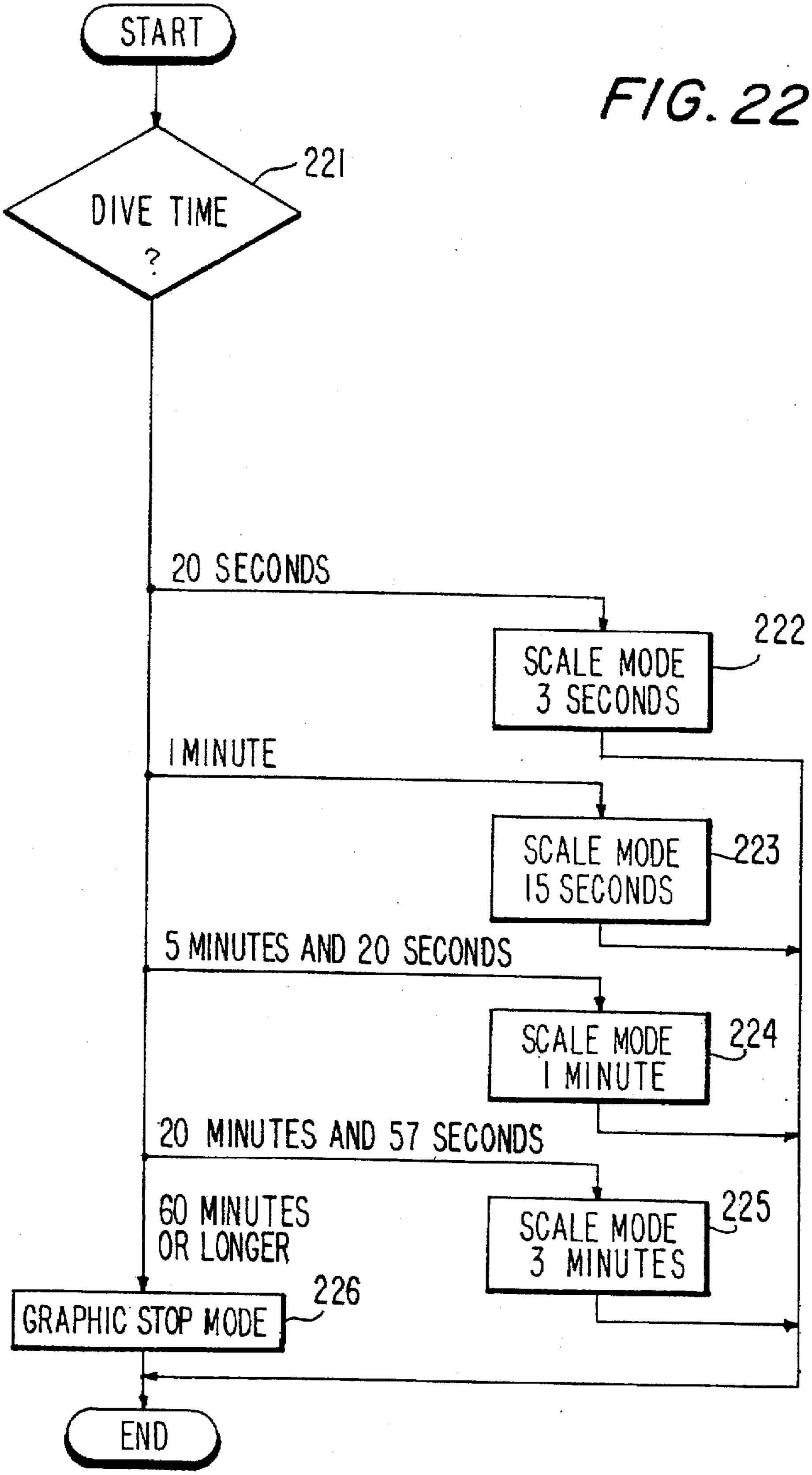
FIG. 22 is a flow diagram showing another example of a horizontal scaling operation in accordance with a seventh embodiment of the invention.

FIG. 22 shows the horizontal scaling operation in accordance with a seventh embodiment of the invention which is different in processing from that shown in FIG. 21. At step 221, a dive elapsed time is checked, and the horizontal scaling is performed according to the dive elapsed time. For example, the dive elapsed time is 20 seconds, the horizontal scale is changed to 3 second intervals at step 222. If the elapsed time is one minute the horizontal scale is changed to 15 second intervals at step 223. If the elapsed time is 5 minutes and 20 seconds the horizontal scale is changed to one minute intervals in step 224. If the elapsed time is 20 minutes and 57 seconds the scale mode is changed to 3 minutes at step 225. If the elapsed time is greater than 60 minutes then graphic corrections and horizontal scale are stopped at step 226.

Figure 23:
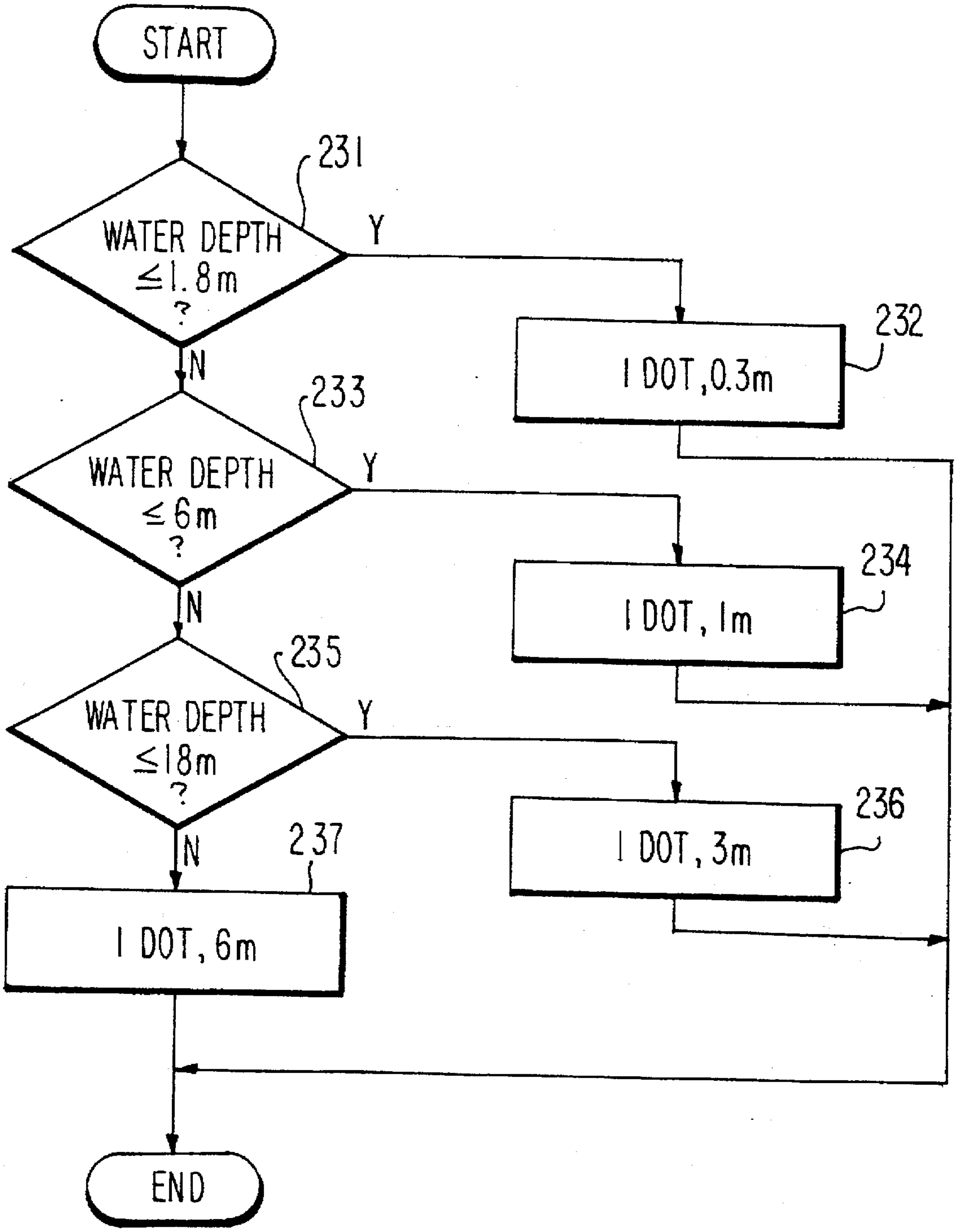
FIG. 23 is a flow diagram showing a vertical scaling operation in accordance with the invention.

FIG. 23 shows the vertical scaling operation. When the measured depth is 1.8 m or shallower as determined at step 231, display is performed with the vertical scale set to 0.3 m segment intervals, namely 1 segment corresponds to 0.3 m at step 232. When the measured depth is deeper than 1.8 m, a determination is made of whether the measured depth is equal to or smaller than 6 m at step 233. When the measured depth is equal to or smaller than 6 m, the vertical scale is changed to 1 segment per 1 m scaling at step 234, and the program ends. When the measured value is greater than 6 m, a determination is made of whether the measured value is equal to or smaller than 18 m in step 235. When the measured value is equal to or smaller than 18 m, the vertical scale is changed to 1 segment per 3 m scaling at step 236, and the program ends. When the measured value is greater than 18 m, the vertical scale is changed to 1 segment per 6 m scaling at step 237.

In the above embodiment, the present invention is applied to a dive watch. The present invention finds a wide range of applications, including barometric graph, altitude graph, and temperature graph applications.

As described above, according to this embodiment, since the vertical axis and the horizontal axis are scaled independently, the entire graph is presented in an easy-to-see fashion. The horizontal scale, namely, the time scale is scaled so that the graph from its starting point to ending point, namely from the start of water depth measuring to the current position is generally and constantly seen.

Furthermore, in this embodiment, when the horizontal scale reaches the maximum available scale, no new data are added, and the graph presentation is retained. Thus, unnecessary data outside a necessary time band are not fed any more, and the resulting graph is not contracted more than necessary. The scale values are set by way of example and may be increased or decreased dependent upon the use to which the water depth measuring device is applied.

The remaining embodiments of the invention are intended for use in measuring a physical quantity, particularly water depth and temperature in diving operation. These embodiment are related to water depth measuring as well as to water depth measuring and measuring of other physical quantities such as temperature. The last embodiment described below is related to a portable type information apparatus other than the dive watch.

Figure 24:
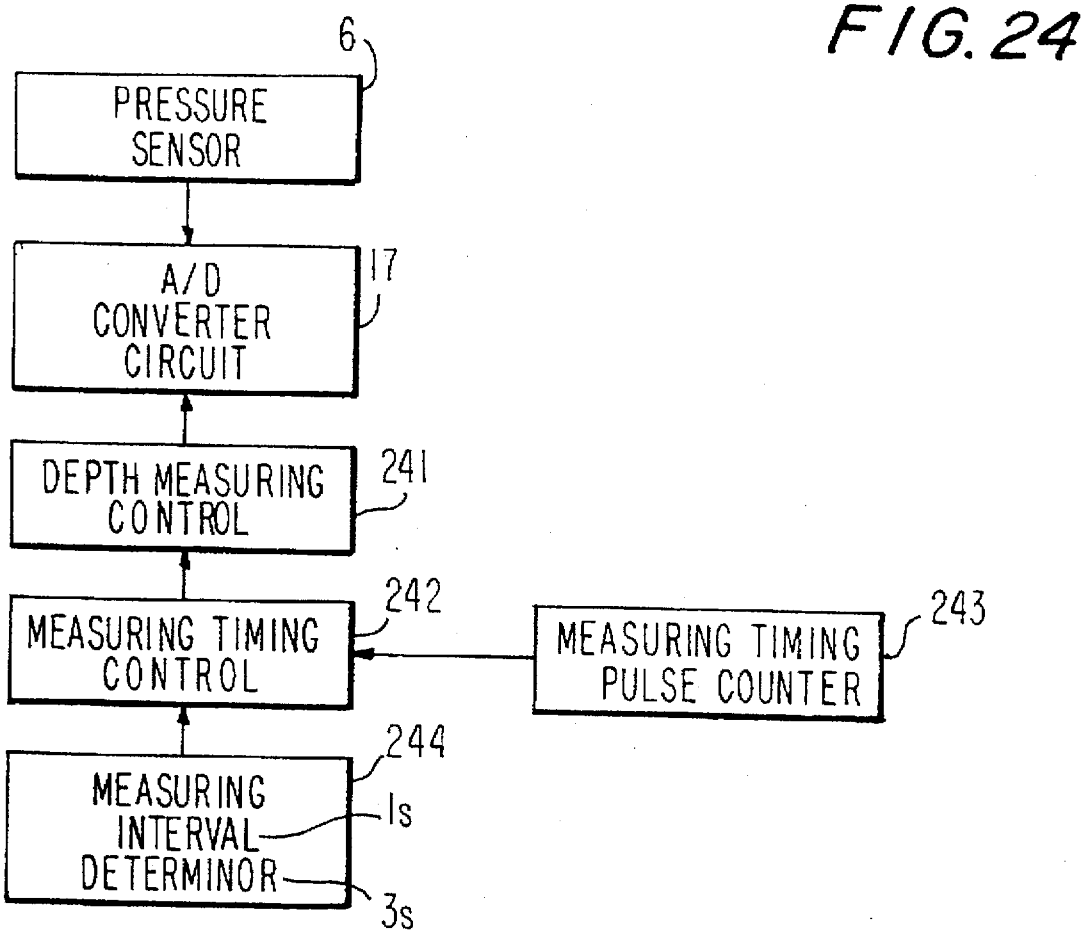
FIG. 24 is a block diagram of a water depth measuring device constructed in accordance with an eighth embodiment of the invention.

Reference is now made to FIG. 24 where the block diagram showing water depth measuring function in accordance with an eighth embodiment of the invention. (Its actual hardware arrangement being shown in FIG. 2.) As already described with reference to FIG. 2, the pressure sensor 6 for sensing pressure is connected to the A/D converter circuit 17 to convert sensed analog pressure value into a digital value. The digital value is fed to a depth measuring control 241 to be explained later, and is used as depth data. The pressure sensor 6 and the A/D converter circuit 17 constitute pressure measuring circuitry. A semiconductor pressure sensor may be employed as a pressure sensor. Employed as the A/D converter circuit 17 may be a successive conversion type or an integrating type of convertor.

The A/D converter circuit 17 is connected to depth measuring control 241. The depth measuring control 241 has control over the A/D converter circuit 17 for the pressure sensor 6 to perform depth measuring. Specifically, driven by the depth measuring control 241, the A/D converter circuit 17 outputs measured digital data. In response to the measured digital data, a water depth is computed in the same manner described in connection with the first embodiment, and is presented on the display screen 4A of the LCD panel 4 in accordance with the first embodiment of the invention.

The depth measuring control 241 is connected to measuring timing control 242 which controls the timing at which the depth measuring control 241 operates. Connected to the measuring timing control 242 are measuring timing pulse counter 243 and measuring interval determinor 244. The measuring timing pulse counter 243 counts predetermined timing pulses, and its count is sent to the measuring timing control 242. The measuring interval determinor 244 selects one from a plurality of water depth measuring intervals, and outputs the selected one to the measuring timing control 242. In response to the count and the selected measuring interval, the measuring timing control 242 issues a driving signal to the depth measuring control 241.

Also employed in addition to these components are a power supply, noise eliminator, a sensor output limiter, measuring timing pulse generator, a data input protection circuit, data error monitor and the like (not shown in FIG. 24).

This embodiment is characterized in that the measuring timing control 242 drives the depth measuring control 241 at a plurality of measuring intervals in synchronism with the count provided by the measuring timing pulse counter 243.

Figure 25:
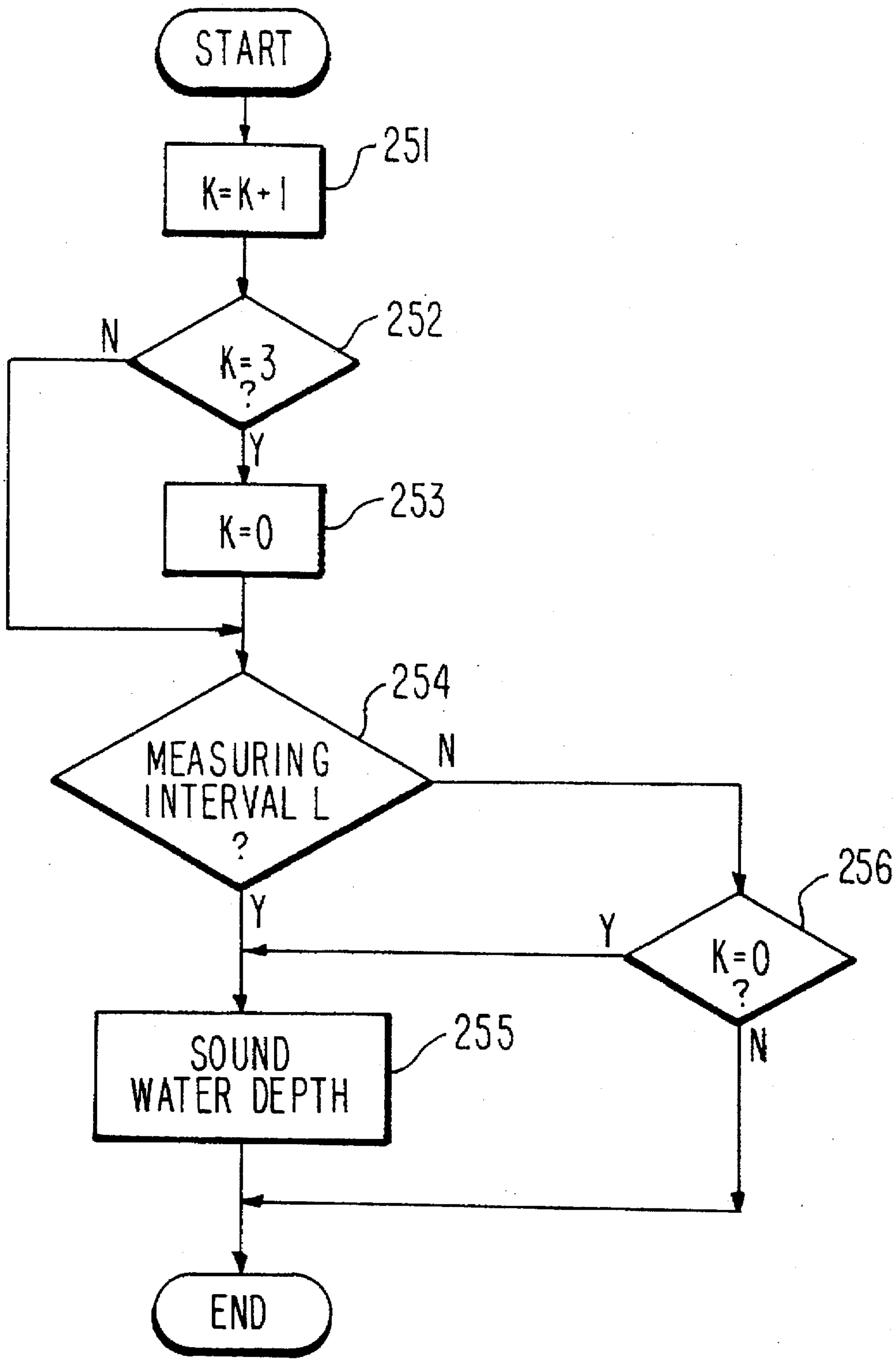
FIG. 25 is a flow diagram showing the operation of the embodiment of FIG. 24.
Figure 26:
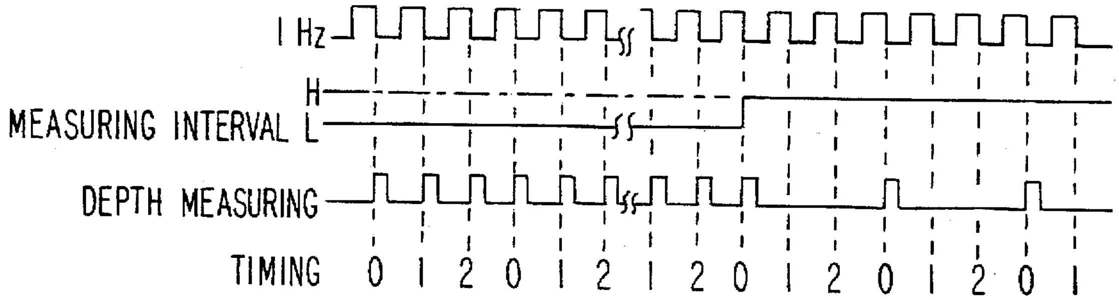
FIG. 26 is a timing diagram showing the operation of the embodiment of the invention.

The operation of the above arrangement is now discussed referring to the flow diagram in FIG. 25 and the timing diagram in FIG. 26. An assumption is made that water depth is measured at 1 second with the measuring interval is set L and at 3 second intervals when the measuring interval is set H. This setting is performed by the measuring interval determinor 244, and in practice, the program and data are beforehand set accordingly.

The 1 Hz clock signal as a reference signal is generated by the oscillator circuit 14 and the frequency divider circuit 15. This signal is the measuring timing pulse. In an interrupt control operation, when any interrupt of the 1 Hz signal takes place at its falling edge, the flow diagram in FIG. 25 is followed.

The measuring timing K is counted up in step 251. When it is determined that the value K has reached 3 at step 252, the value K is reset to 0 a step 253. If the value K does not equal 3, it is determined whether the measuring interval is set in step 254. If the measuring interval L is set as determined at step 254, water depth measuring is unconditionally performed a step 255. When the measuring interval H is not set, water depth measuring is performed at step 255, only when the value K is 0 as determined at step 256, and the program ends. Others wise if the value of K is not 0, then the program ends.

In the above operation, when the measuring interval L is set as shown in timing diagram in FIG. 26, water depth measuring is performed every second. When the measuring interval H is set, water depth measuring is performed every 3 seconds; in other words, when the measuring timing K is 0 with the measuring interval H set, water depth measuring is performed. When H and L are switched is preset in CPU 11 in accordance with desired measuring parameters.

In the above arrangement, the switching timing of pressure measuring is completely picked up even when pressure sensing interval is changed. Accurate pressure sensing is thus possible. Such an arrangement is implemented by a simple program, and no additional load is added on software.

In connection with the measuring interval, L is for 1 second setting and H for 3 second setting. Other setting is also acceptable. No particular values are specified, but it is important that L and H offer different settings. In view of operational and service convenience, the measuring interval should not be too long but should not be too short, either. The measuring interval is typically somewhere between 0.01 and 100 seconds, and preferably somewhere between 0.1 and 10 seconds.

The ratio of L to H (H/L) is not limited to 3. Because of the same reasons as above, the ratio is typically between 1.1 and 100, and preferably 2 and 20. An integer number is preferred for software simplicity.

The measuring intervals are two steps, L and H in this embodiment. More than two steps may be used. An increase in the number of steps, however, complicates the program, and imposes unnecessary load on software. Two to 10 steps are appropriate. An example of three steps of the measuring intervals will be discussed later.

The measuring timing pulse is not limited to 1 Hz. The use of a higher frequency permits a more accurate measurement. As a portable-type information apparatus equipped with pressure sensing device, a watch is considered in the field of application of the present invention. Since a digital watch typically uses 1 Hz as its reference clock, it may be shared for depth measuring purpose. A 1 Hz measuring timing pulse is thus preferred.

Figure 27:
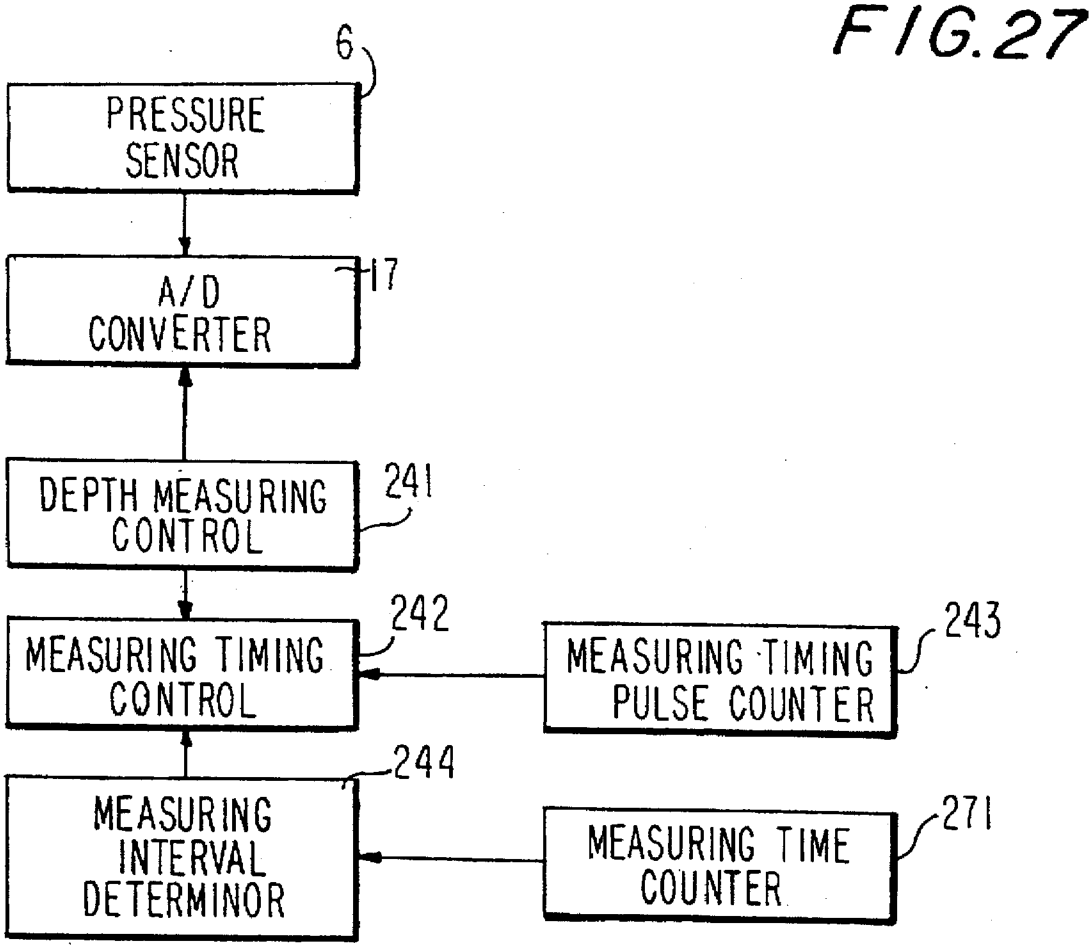
FIG. 27 is a block diagram of a water depth measuring device constructed in accordance with a ninth embodiment of the invention.

Reference is now made to FIG. 27 wherein a block diagram showing operation in accordance with a ninth embodiment of the invention is provided. Like numerals are used to identify like structures as the previous embodiments, the difference in embodiments being that this embodiment is characterized in that the measuring interval for the count is provided utilizing a measuring time counter.

The arrangement of this modified embodiment remains essentially unchanged from that in the previous embodiment, and no detailed discussion is repeated. In the present embodiment, the measuring time counter 271 is connected to the measuring interval determinor 244. The measuring interval determinor 244 determines the measuring interval in accordance with the elapsed time which the measuring time counter 271 time-counts from the start of depth measuring. Namely, the measuring interval is determined depending on the elapsed time from the start of depth measuring.

Figure 28:
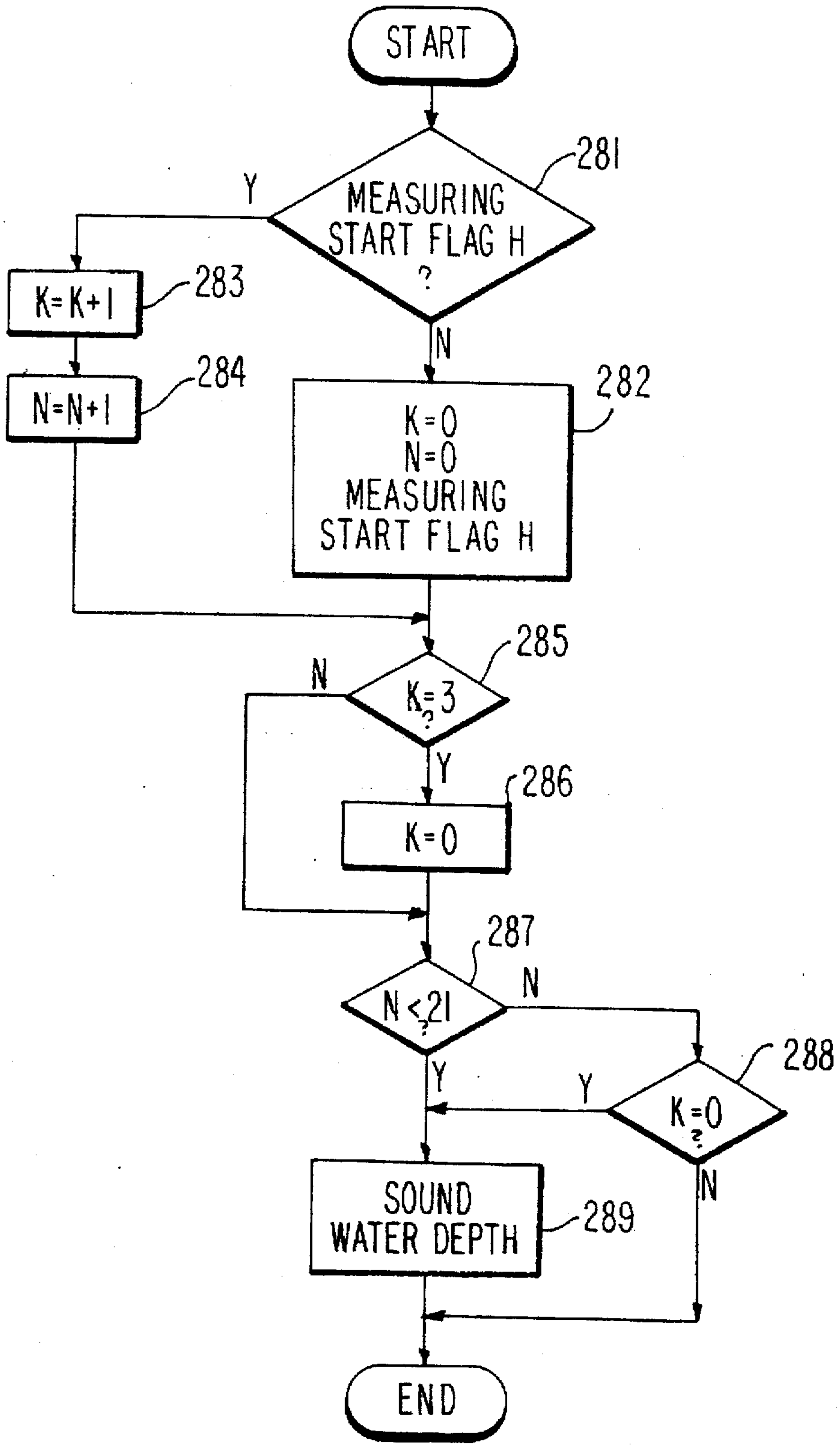
FIG. 28 is a flow diagram showing the operation of the embodiment of FIG. 27.
Figure 29:
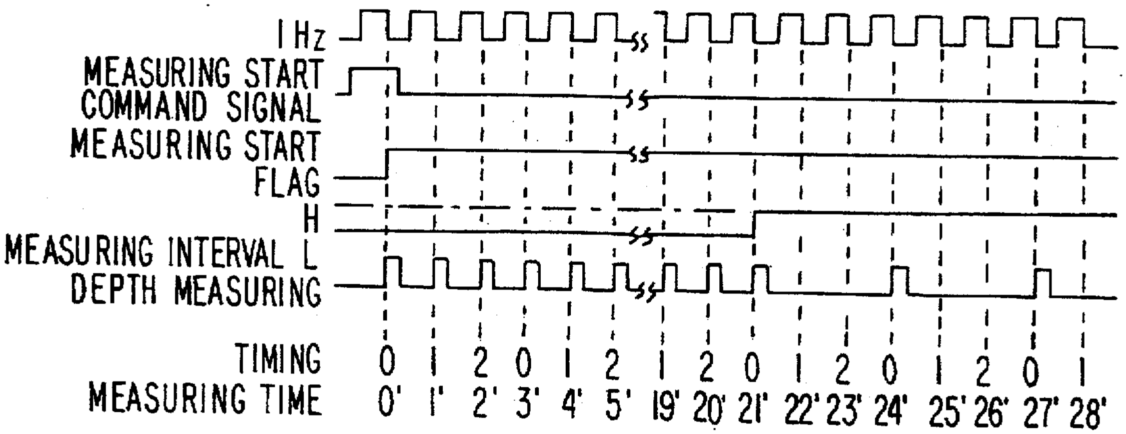
FIG. 29 is a timing diagram showing the operation of the ninth embodiment of the invention.

The operation of the above arrangement is now discussed referring to the flow diagram in FIG. 28 and the timing diagram in FIG. 29. Depth measuring is now set up so that it is performed every second for the first 20 seconds from the start and every 3 seconds from 21 seconds onward. The flow diagram in FIG. 28 is executed when a 1 Hz interrupt takes place as in the first embodiment.

First, a determination is made of whether depth measuring has started or is about to start. This determination is based on a depth measuring start flag that is set by the diver when he has initiated depth measuring. When the measuring start flag is at L and depth measuring has just started as determined in step 281, measuring timing pulse count K and measuring time count N are reset to 0, and the measuring start flag is raised to H in step 282. When the measuring start flag has already been at H, the measuring time pulse counter 243 starts counting up in step 283, and the measuring time counter starts counting up in step 284. When the count K has reached 3 as determined in step 285, K is reset to 0 in step 286. If K does not equal 3, it is determined whether count N is smaller than 21 in step 287. When the measuring time count N is smaller than 21 seconds as determined in step 287, depth measuring is unconditionally done in step 289. When the measuring time count N is equal to or greater than 21 seconds, depth measuring is performed step 289 only when the count K is 0 as determined in step 288, and the program ends. When K does not equal 0, the program ends without performing depth measuring.

In the above operation, depth measuring is performed every second for the duration from the start of depth measuring to the elapsed time of 20 seconds as shown in the timing diagram in FIG. 29. At the elapsed time of 21 seconds thereafter, depth measuring is performed every 3 seconds; in other words, when the measuring timing K is 0 with the measuring interval H set, water depth measuring is performed.

As described above, according to this modified embodiment, water depth measuring is frequently performed for some time (20 seconds herein) after the start of depth measuring, and thereafter the measuring time interval is set to be longer. Thus, power consumption is reduced. This feature serves diving purposes quite well. Depth measuring is frequently performed for some time immediately after the start of diving, because a rapidly changing depth is expected. During a mildly changing depth diving that follows the initial phase of diving, the measuring interval is set to be longer to avoid unnecessary measuring.

The measuring interval is switched from 1 second to 3 seconds at the moment 21 seconds elapses. Other switching time is quite acceptable. The appropriate switching time of the measuring interval may greatly vary depending on diving patterns, variations among individuals and depth. In this alternate version, the switching time of the measuring interval typically ranges from 3 to 300 seconds, and preferably from 6 to 60 seconds.

Figure 30:
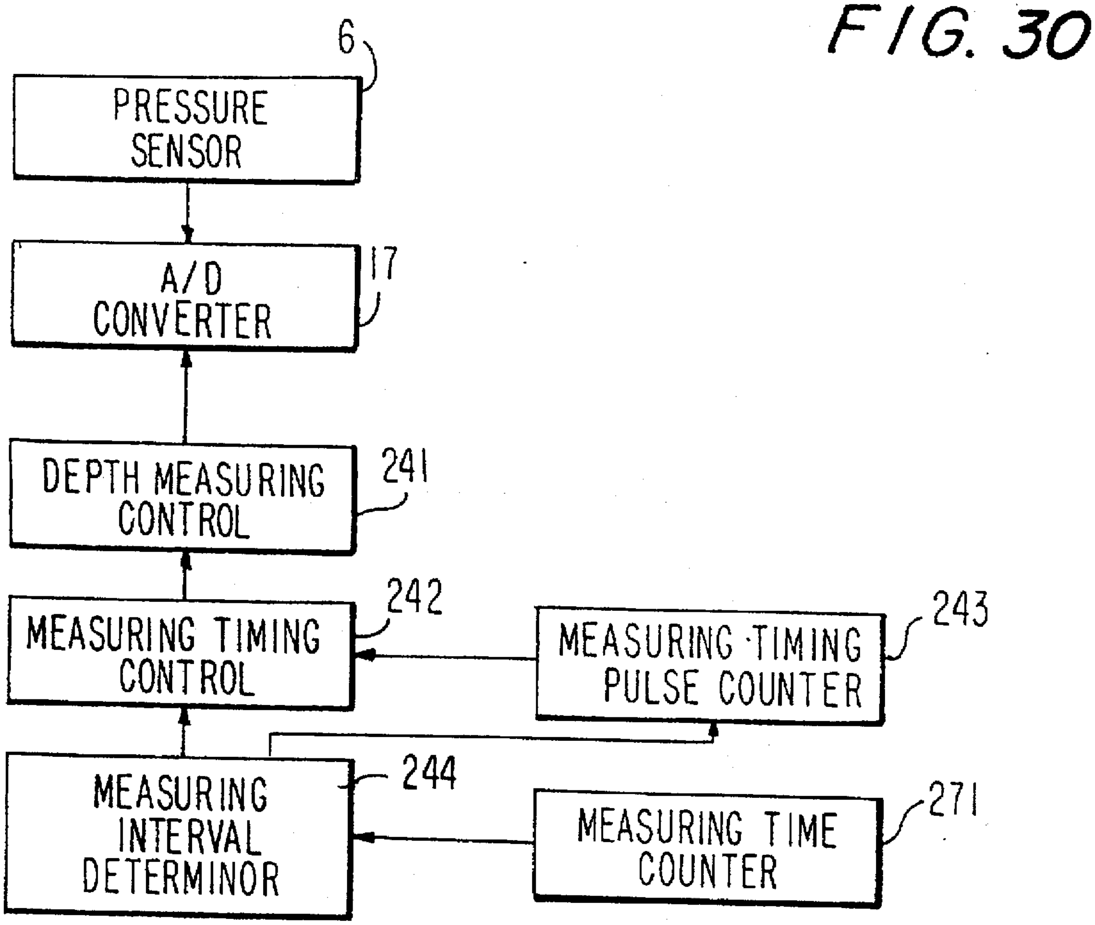
FIG. 30 is a block diagram of a water depth measuring device constructed in accordance with a tenth embodiment of the invention.

It is contemplated that the counting of the measuring timing pulses by the measuring timing pulse counter means is performed only when some time, for example, 21 seconds, elapses from the start of depth measuring. Reference is now made to FIG. 30 which shows the block diagram of the tenth embodiment of the invention characterized in that the measuring timing pulse counter in the previous embodiment is now driven by the measuring interval determined by the measuring interval determinor and in that the measuring timing control is controlled by the measuring interval and the count provided by the measuring timing pulse counter.

The arrangement in this embodiment remains essentially unchanged from that in the previous embodiments, and no detailed discussion is provided. Like numbers are utilized to indicate like structures, the difference being the measuring interval determinor providing an output to the measuring timing pulse counter. In FIG. 30, the measuring timing control 242 issues a driving signal to the depth measuring control 241 in response to the counts provided by the measuring interval determinor 244 and the measuring timing pulse counter 243. The measuring timing pulse counter 243 is connected to the measuring interval determinor 244. The measuring interval determinor 244 is designed to operate the measuring timing pulse counter 243 when the measuring time counter 271 for time-counting the elapsed time gives a time-count in excess of a predetermined value. Namely, the measuring timing pulse counter 243 is set to be inoperative for a duration after the start of depth measuring.

Figure 31:
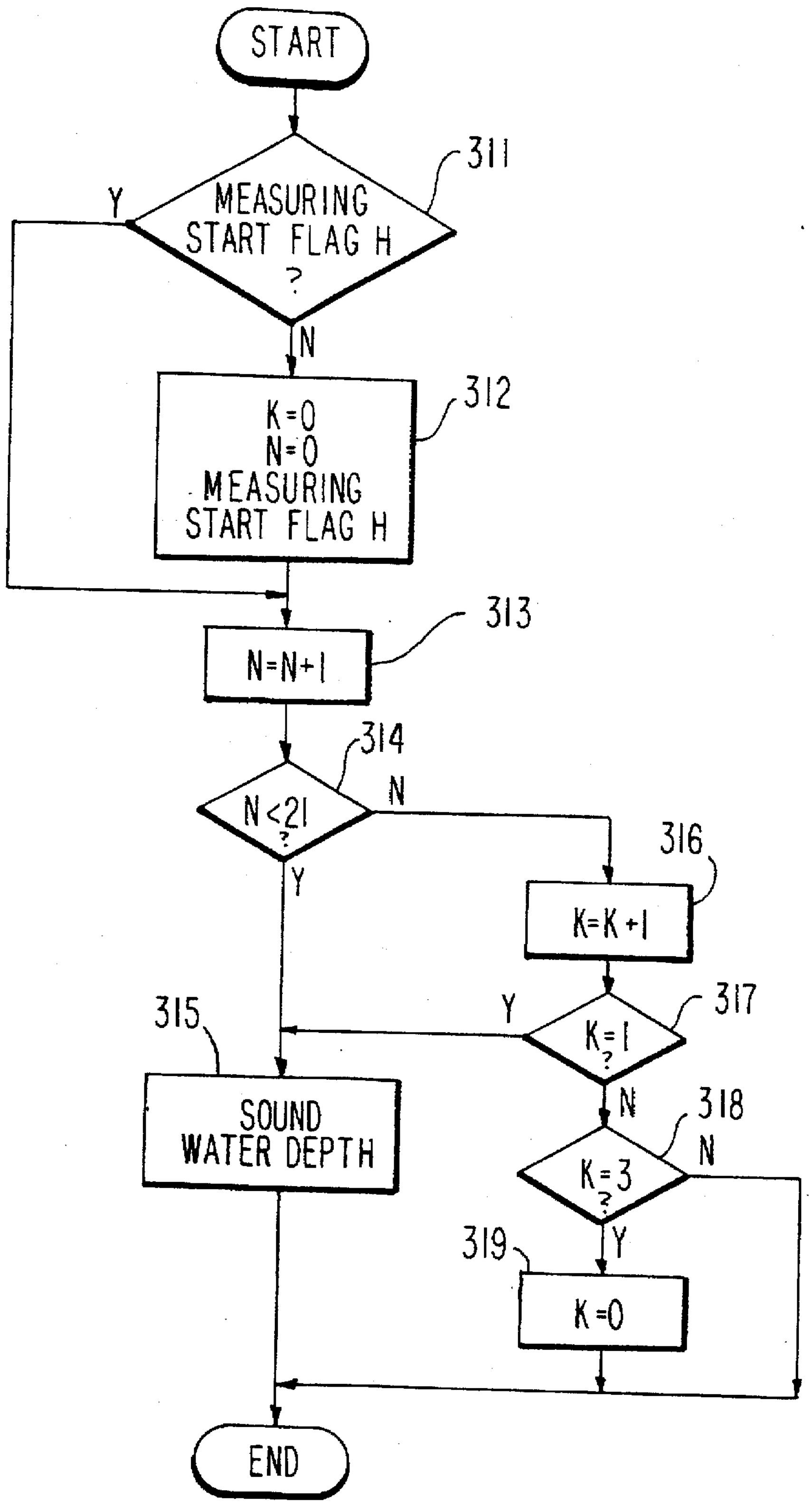
FIG. 31 is a flow diagram showing the operation of the Embodiment of FIG. 30.
Figure 32:
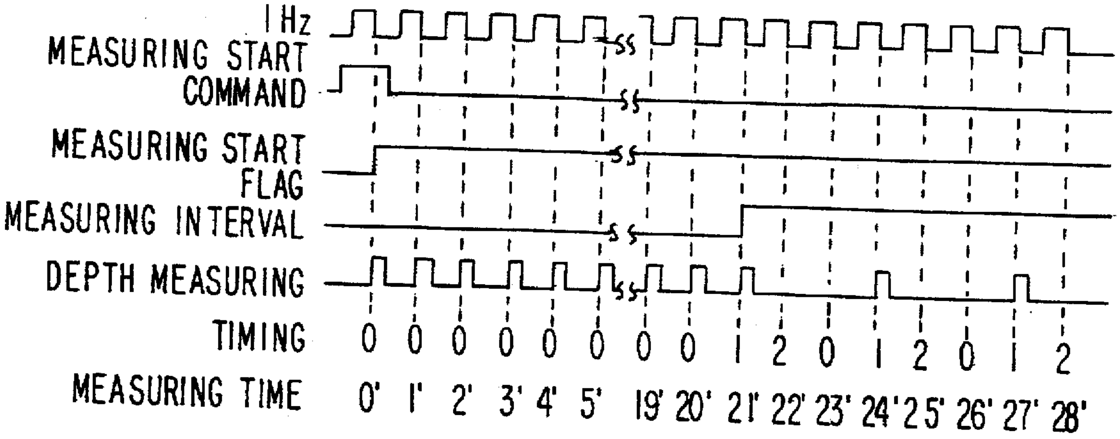
FIG. 32 is a timing diagram showing the operation of the tenth embodiment of the invention.

The operation of the above arrangement is now discussed referring to the flow diagram in FIG. 31 and the timing diagram in FIG. 32. The flow diagram in FIG. 31 is executed when a 1 Hz interrupt takes place as in the flow diagram in FIG. 28.

First, a determination is made of whether depth measuring has started or is about to start. This determination is based on the depth measuring start flag. When the measuring start flag is at L and depth measuring has just started as determined in a step 311, measuring timing pulse count K and measuring time count N are reset to 0, and the measuring start flag is raised to H in step 312. When the measuring start flag has already been at H, step 312 is skipped. The measuring time count N is up-counted in step 313. When the measuring time count N is smaller than 21 seconds as determined in step 314, depth measuring is unconditionally done in step 315. When the measuring time count N is equal to or greater than 21 seconds, timing pulse count K is up counted at step 316 and depth measuring is performed at step 315 only when the count K is 1 as determined in a step 317, and the program ends. When the count K has reached 3 as determined in step 318 if K does not equal 1, the count K is reset to 0 in step 319. If K has not reached 0 then the program ends.

In the above operation, depth measuring is performed every second for the duration from the start of depth measuring to the elapsed time of 20 seconds as shown in FIG. 32 and the counting by the measuring timing pulse counter 243 is disabled for that duration. Thereafter, depth measuring is performed every 3 seconds, and the measuring timing pulse counter 243 is allowed to count. Through the elapsed time of 21 seconds, the measuring timing is always 1 Hz.

As described above, the measuring interval is determined by the count provided by the measuring time counter, and, in response to the measuring time, the measuring timing pulse counter is disabled. Power consumption is thus even more reduced.

Figure 33:
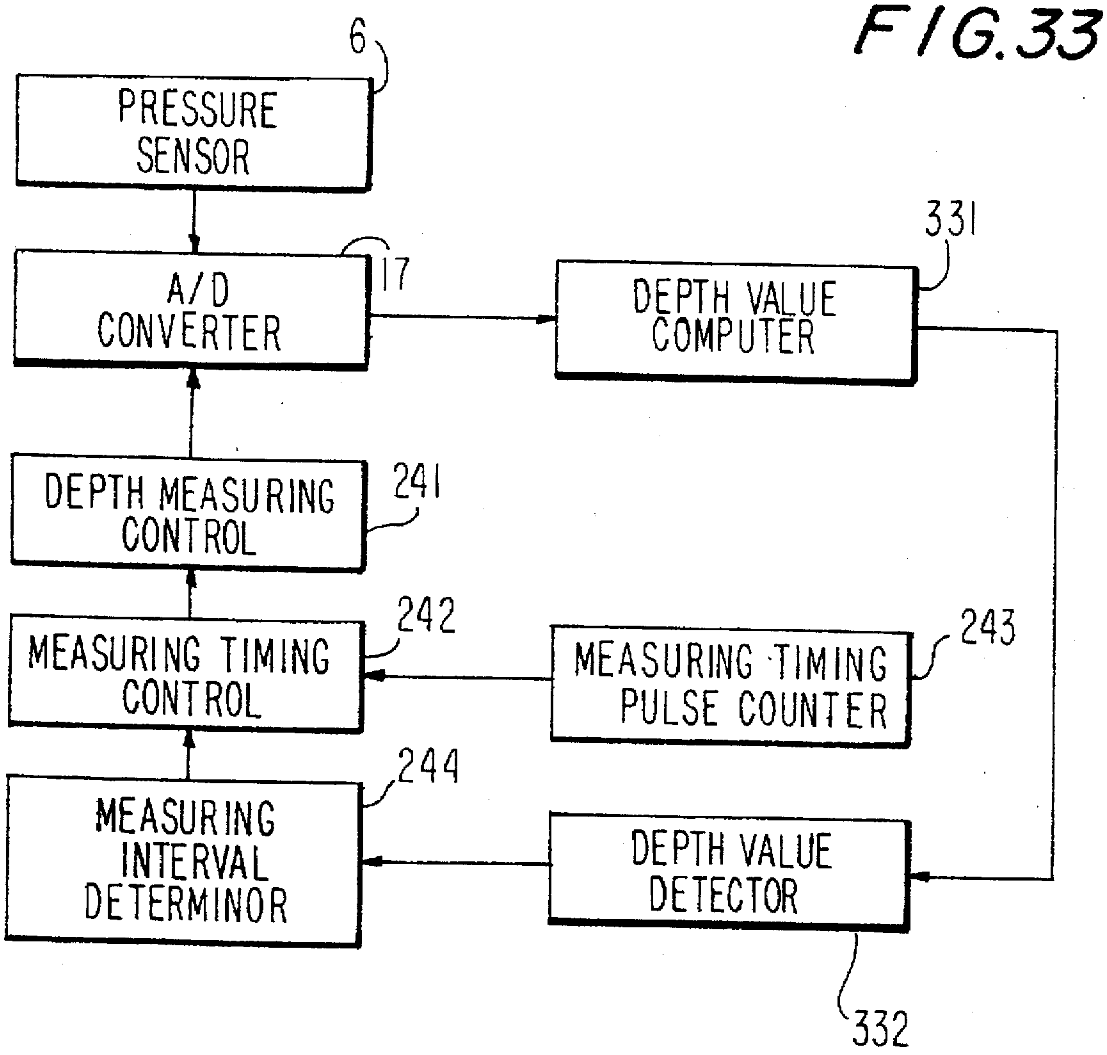
FIG. 33 is a block diagram of a water depth measuring device constructed in accordance with an eleventh embodiment of the invention.

Reference is made to FIG. 33 which is the block diagram showing the eleventh embodiment of the invention. Like numerals from the previous embodiments are utilized to identify like structures. This embodiment is characterized in that the measuring interval determinor is operative in response to the measured water depth in a manner that the measuring interval is changed depending on whether the measured water depth is equal to or greater than a predetermined threshold depth value.

The arrangement in this modified embodiment remains essentially unchanged from that in the previous embodiment, and no detailed discussion is made. The primary difference being that in this embodiment, the output of the A/D converter circuit 17 is coupled to depth value computer 331. The depth value computer 331 computes a depth value based on a measured digital value. Depth value detector 332 is connected to the depth value computer 331. The depth value detector 332 determines whether the computed depth value is equal to or greater than a threshold depth value. Depending on the determination result, the measuring interval determinor 244 determines the measuring interval. Namely, the measuring interval varies with the measured water depth.

Figure 34:
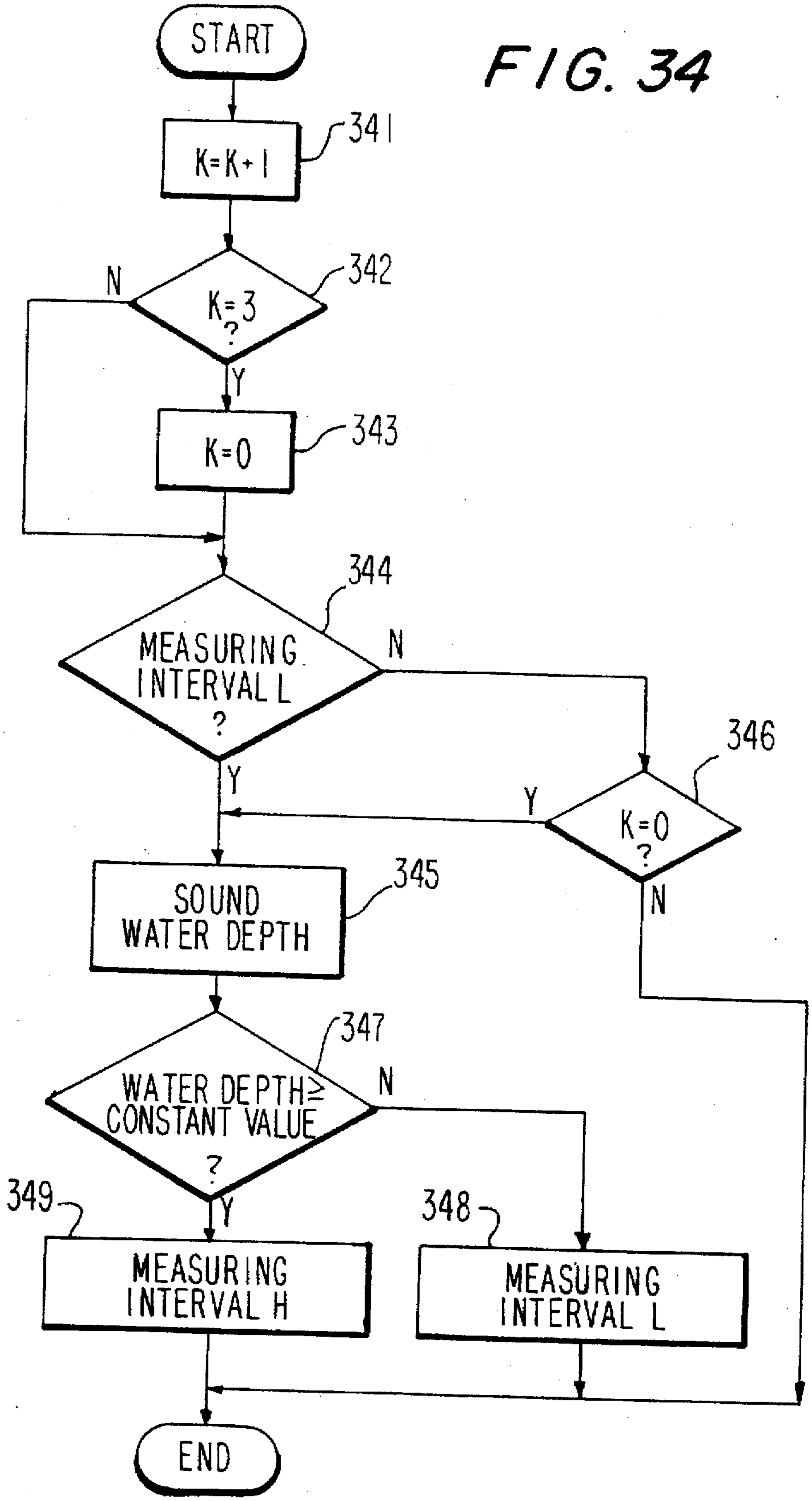
FIG. 34 is a flow diagram showing the operation of the embodiment of FIG. 33.

The operation of the above arrangement is now discussed referring to the flow diagram in FIG. 34. An assumption is made that the measuring interval L is set when the measured depth value is smaller than a threshold depth value and that the measuring interval H is set when the measured depth value is equal to or greater than the threshold depth value. The flow diagram in FIG. 34 is executed when a 1 Hz interrupt takes place as in the first embodiment.

The measuring timing pulse is up-counted in step 341 by measuring timing pulse counter 243. When the count K has reached 3 as determined in step 342, the count K is reset to 0 in step 343. When the measuring interval L is set as determined in step 344 by measuring interval determinor 244, depth measuring is performed unconditionally at step 345. When the measuring interval H is set, depth measuring is performed in step 345 only when the count K is 0. A determination is made of whether the measured dept value has reached the threshold depth value by depth value detector 332 in step 347. When the measured depth value is smaller than the threshold depth value, the measuring interval L is set in step 348 by measuring interval determinor 244. When the measured depth value is equal to or greater than the threshold depth value, the measuring interval H is set in step 349.

Figure 35:
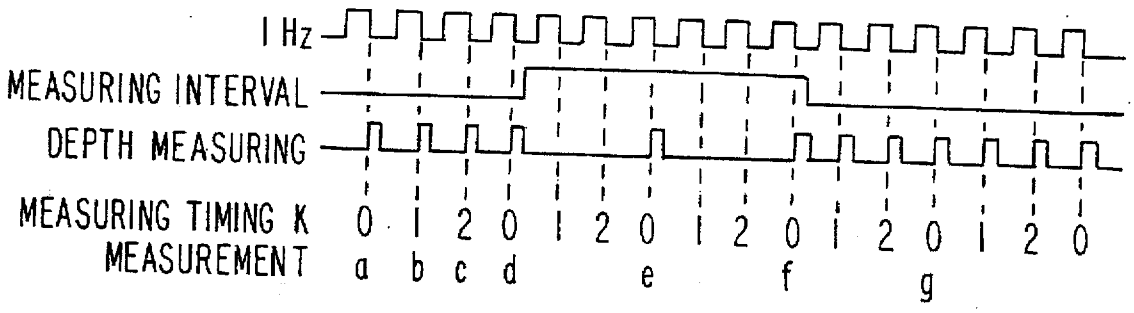
FIG. 35 is a timing diagram showing the operation of the eleventh embodiment of the invention.

The above operation is discussed further referring the timing diagram in FIG. 35. An assumption is made that the measuring interval L is set when the measured depth value is smaller than the threshold depth value and the measuring interval H is set when the measured depth value is equal to or greater than the threshold depth value. Measurements a, b, c, and g represent the case where the measured depth value is smaller than the threshold depth value, and measurements d and e represent the case where the measured depth value is equal to or greater than the threshold depth value.

Depth measuring is performed with the measuring interval L set at each of measurements a, b and c. At measurement d, a measured depth is equal to or greater than the threshold depth value, causing the measuring interval to be set to H. While the measuring interval remains at H, no depth measuring is performed with the measuring timing count K being 1 or 2; and depth measuring is performed with the count K being 0 (measurements e and f). When a measured depth value smaller than the threshold depth value results again at measurement f, the measuring interval L is set, and depth measuring is performed regardless of the count K.

The threshold depth value that switches the measuring interval is limited to no particular depth. In diving applications, it may be determined in view of the characteristics of the A/D converter circuit, diving depth and diving patterns. The threshold depth value is typically set somewhere between 5 and 100 m, and preferably between 10 and 30 m.

When in deep water, the magnitude of the pressure sensor becomes large and the A/D conversion time is prolonged. By switching to a longer measuring interval, erratic data output is prevented. Thus, regardless of water depth, reliable data result, and proper depth measuring is performed.

Figure 36:
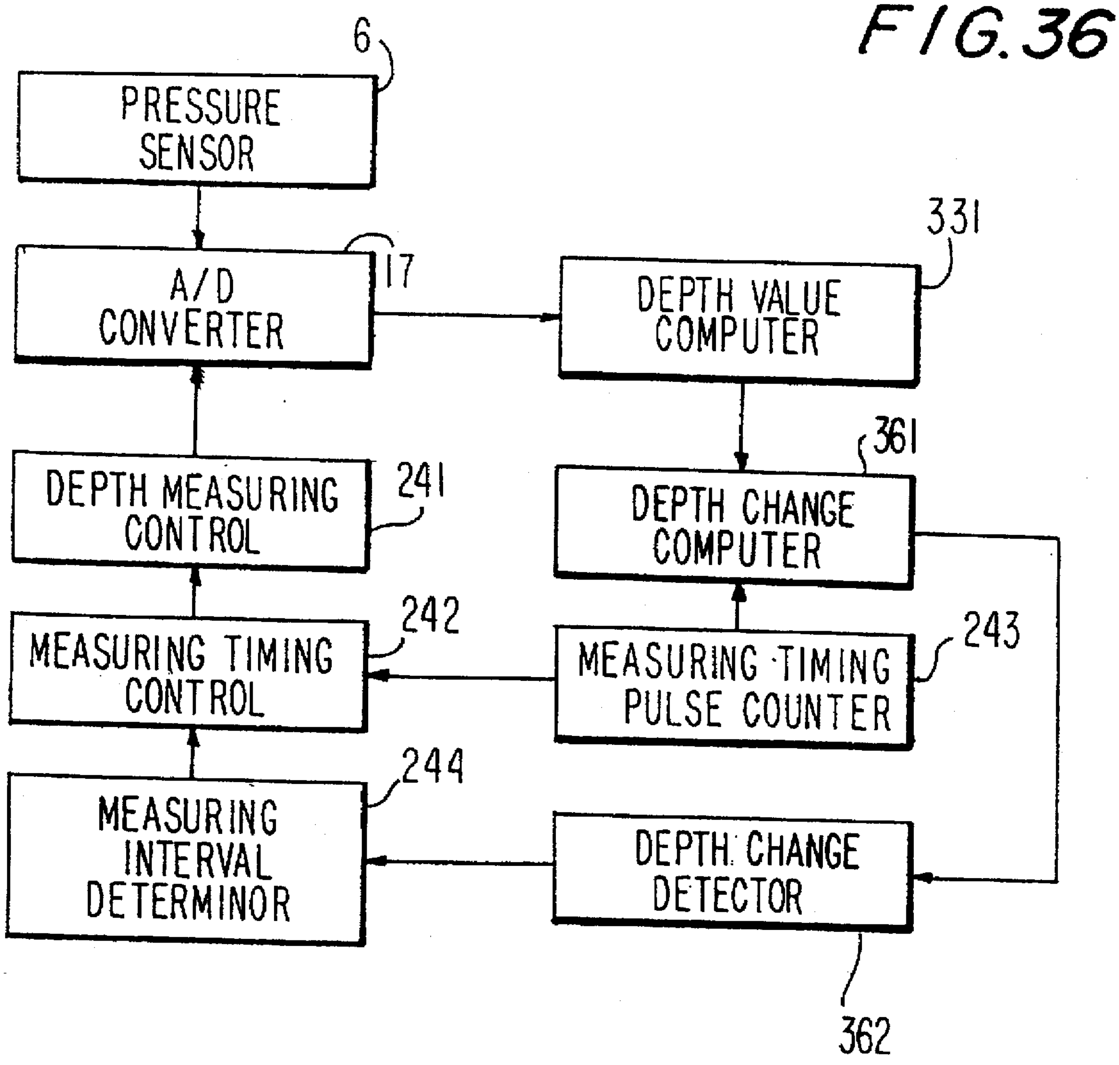
FIG. 36 is a block diagram of a water depth measuring device constructed in accordance with a twelfth embodiment of the invention.

Reference is now made to FIG. 36 which is the block diagram of the twelfth embodiment of the invention. Like numerals from the previous embodiment are used to identify like structures. This embodiment is characterized in that the measuring interval determinor is driven in response to a variation of the measured depth per unit time in a manner that the measuring interval is changed depending on whether the measured depth variation is equal to or greater than a threshold value. This modified embodiment is also characterized in that the time interval used to calculate the depth variation remains the same even if the measuring interval is changed.

The arrangement in this embodiment remains essentially unchanged from that in the previous embodiment, and no detailed discussion is provided herein. In FIG. 36, the output of the depth value computer 331 is fed to a depth change computer 361. The depth change computer 361 receives the water depth value calculated by the depth value computer 331, at a timing provided by the measuring timing pulse counter 243. Thus, depth variation or change per unit time results. Depth change detector 362 determines whether the result calculated by the depth change computer 361 is equal to or greater than the threshold. In response to the determination result given by the depth change detector 362, the measuring interval determinor 244 determines the measuring interval. In summary, the measuring interval is switched by the depth change rate.

Figure 37:
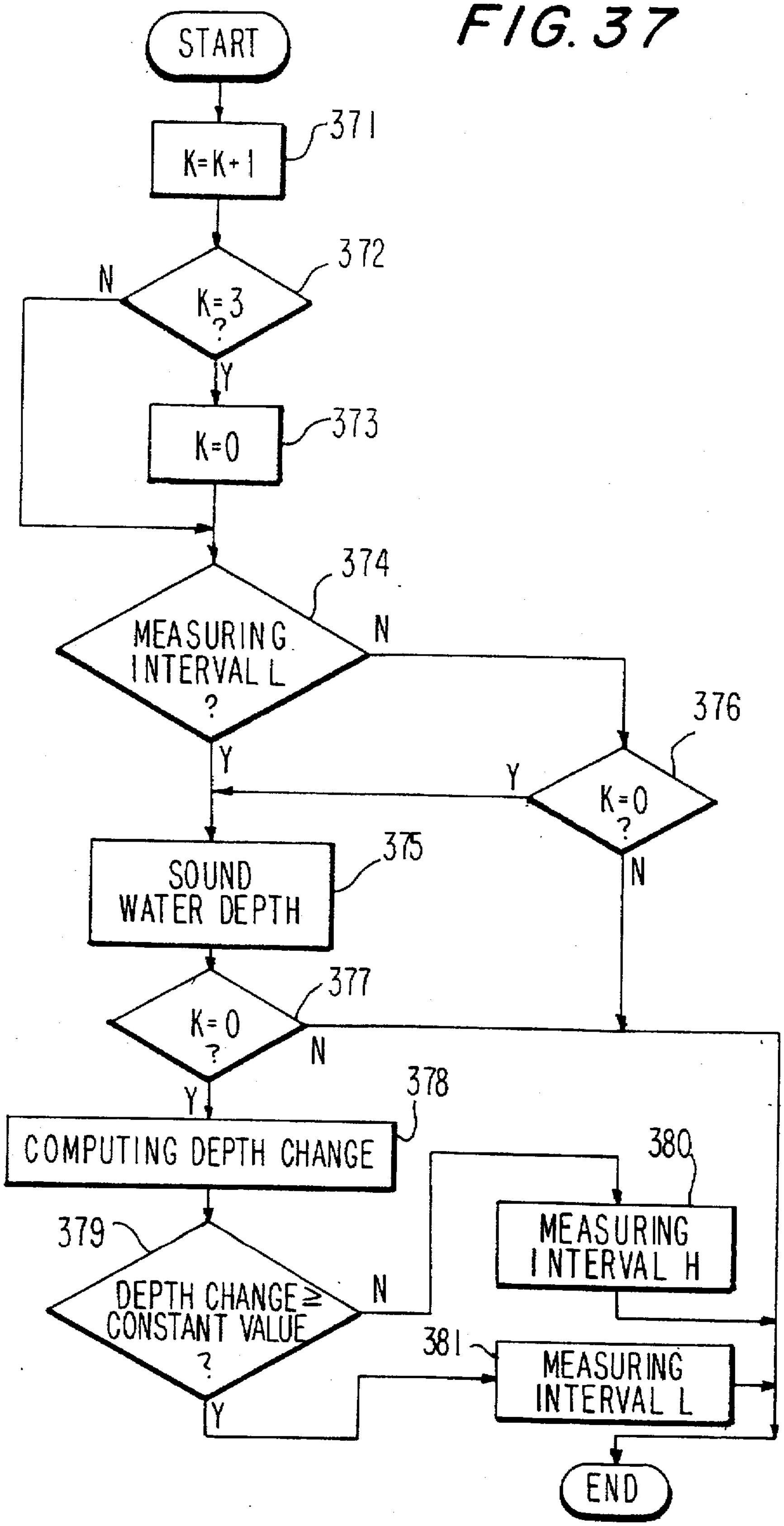
FIG. 37 is a flow diagram showing the operation of the embodiment of FIG. 36.

The operation of the above arrangement is discussed referring to the flow diagram in FIG. 37. An assumption is made that the measuring interval H is set when the measured depth change is smaller than the threshold value and the measuring interval L is set when the measured depth change is equal to or greater than the threshold value. The flow diagram in FIG. 37 is executed when a 1 Hz interrupt takes place as in the first embodiment.

The measuring timing pulse is up-counted in a step 371 by measuring timing pulse counter 243. When the count K has reached 3 as determined in step 372, the count K is reset to 0 in step 373. If K does not equal 3, the measuring interval is determined in step 374. When the measuring interval L is set as determined in step 374 by depth measuring control 241, depth measuring is performed unconditionally in step 375. When the measuring interval H is set, depth measuring is performed in step 375 only when the count K is 0. Only when the count K is 0, as determined in step 377 a depth change is determined in steps 378, 379. If K does not equal 0, as determined in step 376 and 377 the program ends. When the measured depth change is smaller than the threshold value, the measuring interval H is set in step 380. When the measured depth change is equal to or greater than the threshold value, the measuring interval L is set in step 381.

As seen from the flow diagram, regardless of the measuring interval, the calculation of depth change is performed only when the count K is 0. Namely, the calculation of depth change is performed over fixed time intervals.

The depth change per unit time for switching the measuring interval is not limited to a particular value. In diving applications, the depth change per unit time may be determined in view of the conditions such as accuracy level of measured data, diver's personal preference in ease of use, and current requirement. The depth change rate is typically 0.5 to 10 m/T, preferably 1 to 3 m/T, where T is 3 seconds in the measuring interval H.

As described above, when a large depth change rate takes place, depth measuring is performed in short time intervals. When a small depth change rate takes place, depth measuring is performed in long time intervals. Depth measuring is thus optimized. The response to depth change rate is also improved.

Since depth change rate is calculated at fixed time intervals regardless of the measuring interval, accurate depth change rate data are provided.

Figure 38:
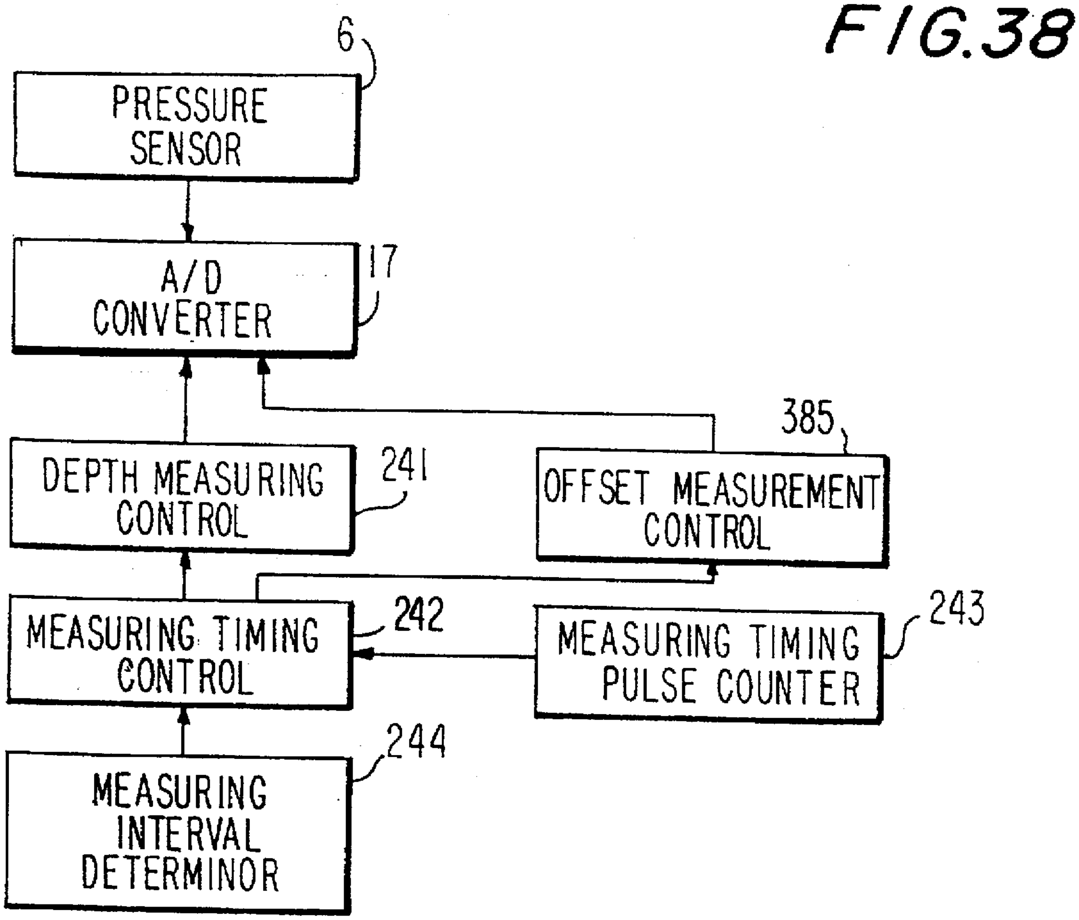
FIG. 38 is a block diagram of a water depth measuring device constructed in accordance with a thirteenth embodiment of the invention.

Reference is now made to FIG. 38 which is the block diagram showing the thirteenth embodiment of the invention. This embodiment is related to the operation timing control when offset measuring control is available. Even when a different measuring interval is used, the offset measuring control is operated at fixed time intervals.

The arrangement in this embodiment remains essentially unchanged from that in the embodiment of FIG. 24, and no detailed discussion is provided. Like numerals are used to indicate like structures, the primary difference being the use of an offset measurement control. In FIG. 38, the A/D converter circuit 17 is connected to both the depth measuring control 241 and offset measuring control 385. The depth measuring control 241 controls the A/D converter circuit 17 to allow the pressure sensor 6 to measure water depth, and the offset measuring control 385 controls the A/D converter circuit 17 to measure an offset value. Both the depth measuring control 241 and the offset measuring control 385 are connected to the measuring timing control 242. Namely, the measuring timing control 242 controls both depth measuring timing and offset measuring timing.

Figure 39:
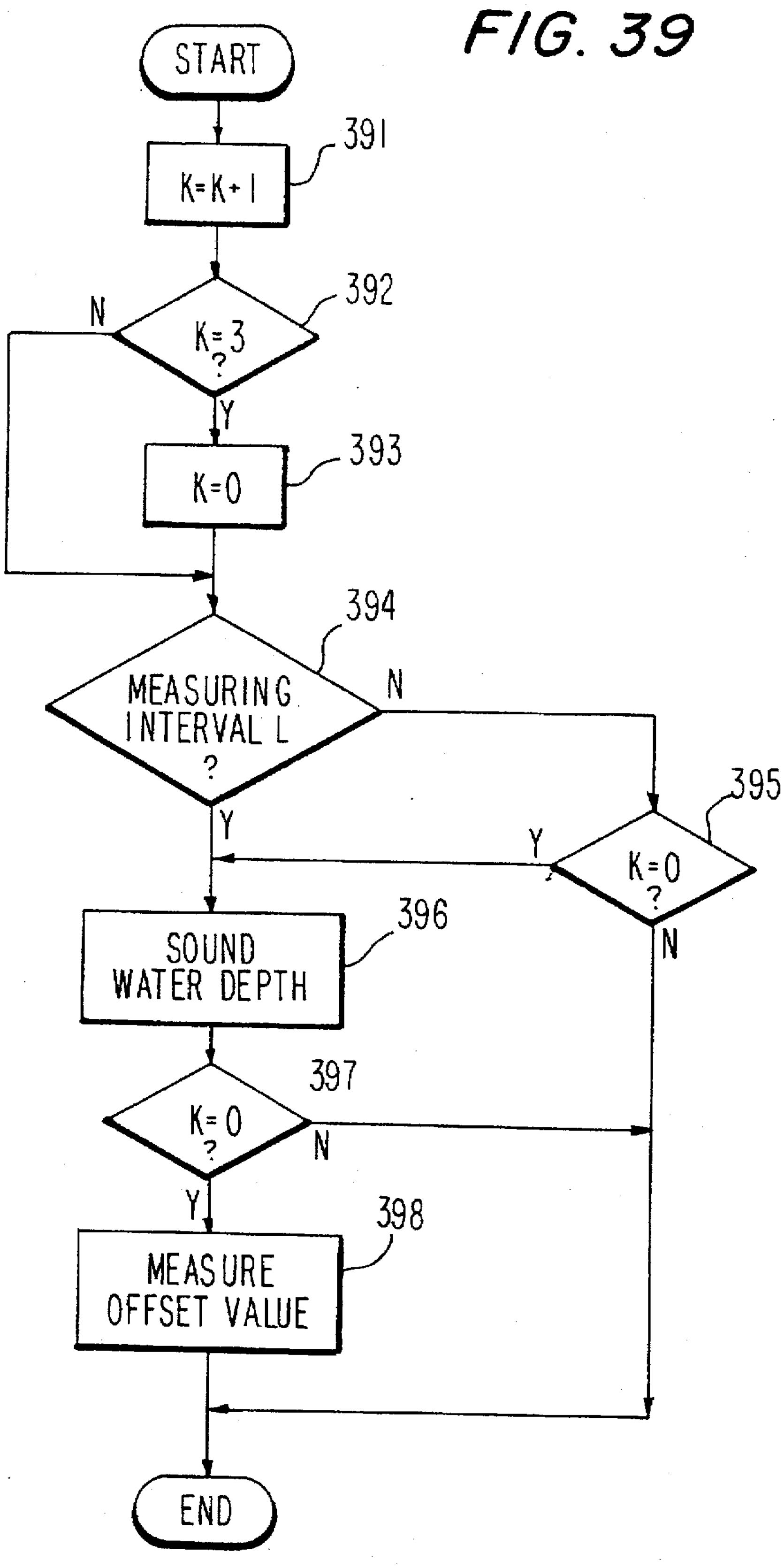
FIG. 39 is a flow diagram showing the operation of the embodiment of FIG. 38.
Figure 40:
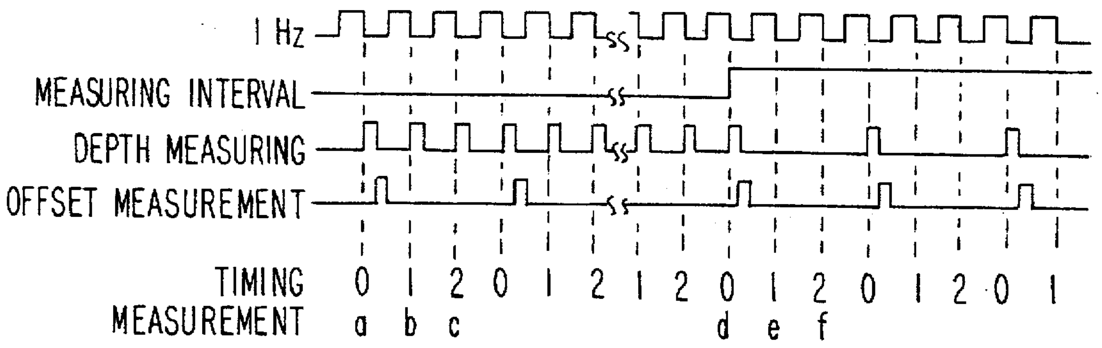
FIG. 40 is a timing diagram showing the operation of the thirteenth embodiment of the invention.

The operation of the above arrangement is discussed referring to the flow diagram in FIG. 39 and the timing diagram in FIG. 40. An assumption is made that offset measuring is performed every 3 seconds. The flow diagram in FIG. 39 is executed when a 1 Hz interrupt takes place as in the first embodiment of the invention.

The measuring timing pulse is up-counted in step 391. When the count K has reached 3 as determined in step 392, the count K is reset to 0 in step 393. If K has not reached 3, then the measuring interval is determined in step 394. When the measuring interval is determined to be L in step 394, depth measuring is performed unconditionally in step 396 and measuring timing control 242 provides an output to depth measuring control 241. When the measuring interval H is determined to be set in step 394, depth measuring is performed in step 396 only when the count K is determined to be 0 in step 395. When K is not equal to 0 in step 395, the program ends. When it is determined that the count K is 0 after taking a depth measurement in step 397, an offset value is measured by offset measurement control 385 in step 398, and the program ends.

The timing diagram in FIG. 40 shows both the depth and offset measuring timings. At measurement a, depth measuring is performed unconditionally because the measuring interval is at L (steps 394, 396), and offset measuring is performed because the count K is 0 (steps 397, 398). At measurement b, depth measuring is also performed unconditionally because the measuring interval is at L (steps 394, 396), but the program ends (in the flow diagram in FIG. 39) because the count K is 1 (step 397). At measurement c, depth measuring is also performed unconditionally because the measuring interval is at L (steps 394, 396), but the program ends because the count K is 2 (step 397).

At measurement d, the measuring interval is at H, the count K is 0, and thus depth measuring is performed (steps 394, 395, 396). Since the count K is 0, offset measuring is also performed (steps 397, 398). At measurement e, the program ends because the count K is not 0 and the measuring interval is at H. The operation at measurement f remains unchanged from measurement e. Regardless of the measuring interval, offset measuring is thus performed, when measuring timing is 0 (count K is 0), namely every 3 seconds.

In the above arrangement, even when the measuring interval is changed, offset measuring is performed at the fixed timing. Thus, processing is simplified. Since unnecessary offset measuring is not required, power consumption is reduced. When offset measuring is software controlled, other processing may be concurrently performed and multi-function design is easy to implement. By "multi-function" is meant a diversity of measurements besides pressure sensing.

The offset measuring interval is not limited to 3 seconds. It may be set depending on the characteristics of the A/D converter circuit 17. In view of accuracy level and current requirement, the offset measuring interval is typically from 2 to 30 seconds, preferably 3 to 10 seconds. From the standpoint of program simplicity and reliability, its frequency is preferably synchronized with the measuring timing pulse (1 Hz herein). The offset measuring control method described above will offer the same advantage if the offset measuring control means is added to the embodiments of FIGS. 27 and 30.

Figure 41:
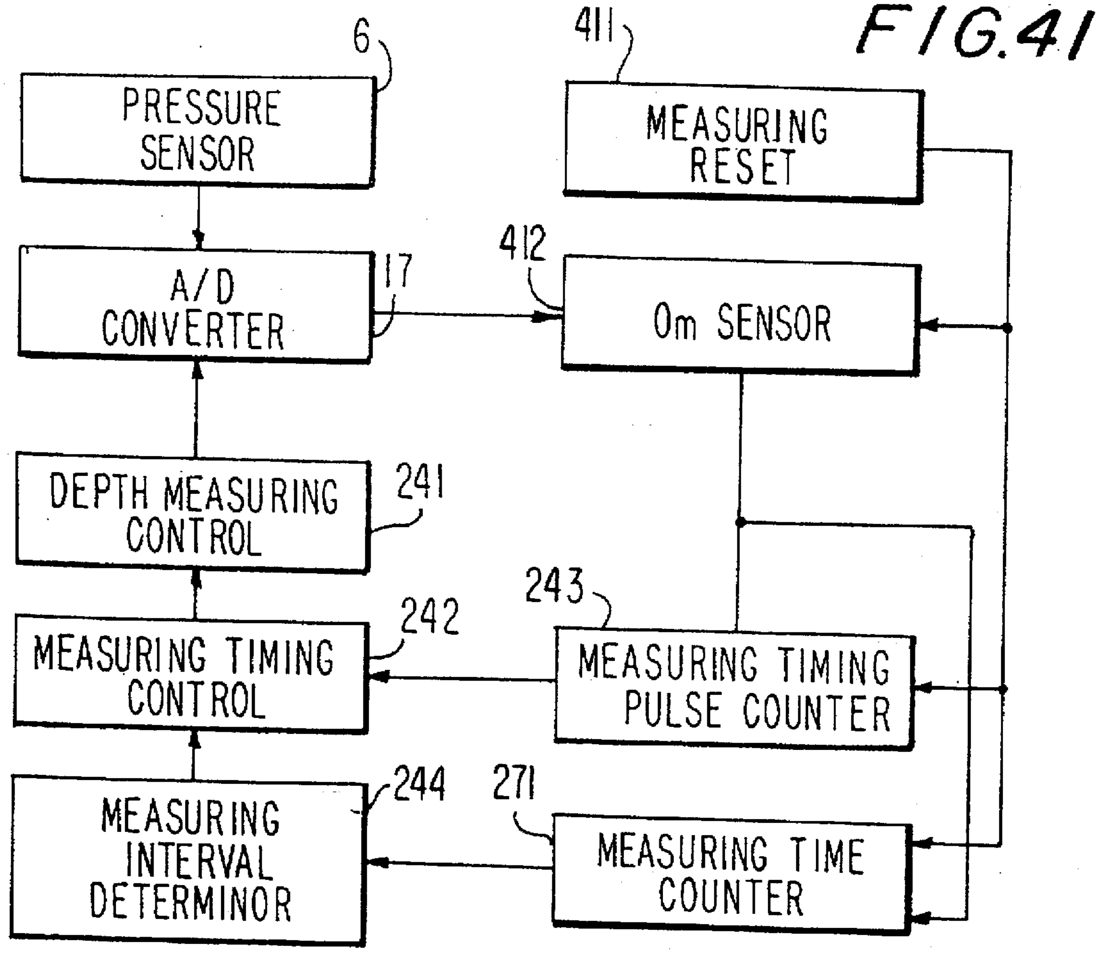
FIG. 41 is a block diagram showing a water depth measuring device constructed in accordance with a fourteenth embodiment of the invention.

Reference is now made to FIG. 41 which is the block diagram showing the fourth embodiment of the invention. This modified embodiment is related to the operation timing control of a zero meter sensor in which a determination is made of whether a depth value is correct or not when the depth value measured at the start of depth measuring is received as zero meter depth. When zero meter sensor fails to detect correct zero meter depth, the measuring timing pulse counter and the measuring time counter are disabled.

The arrangement in this modified embodiment remains essentially unchanged from that in FIG. 27, and no detailed discussion about it will be provided herein. Like numerals are utilized to identify like structures. In FIG. 41, configuration and functions of the pressure sensor, the depth measuring control the measuring timing control and the measuring interval determinor remain unchanged from those in the embodiment of FIG. 27, the primary difference being the use of a zero meter sensor and measuring reset.

In this modified version, connected to both the measuring timing pulse counter 243 and the measuring time counter 271 is measuring reset 411 which resets and starts depth measuring in response to a measuring start command signal (not shown) fed from outside. In response to the measuring start command signal, the measuring reset 411 resets both the measuring timing pulse counter 243 and the measuring time counter 271.

Zero meter sensor 412 is connected to the measuring reset 411. The zero meter sensor 412 receives the depth value measured at the start of depth measuring as zero meter value, and determines whether it is acceptable or not. For example, if the A/D converter circuit 17 outputs an error code (a value obviously different from the pressure value at zero meter level), the zero meter sensor 412 judges the corresponding value as inappropriate. While the zero meter sensor 412 receives no appropriate zero meter value, both the measuring timing pulse counter 243 and the measuring time counter 271 are prevented from counting.

Figure 42:
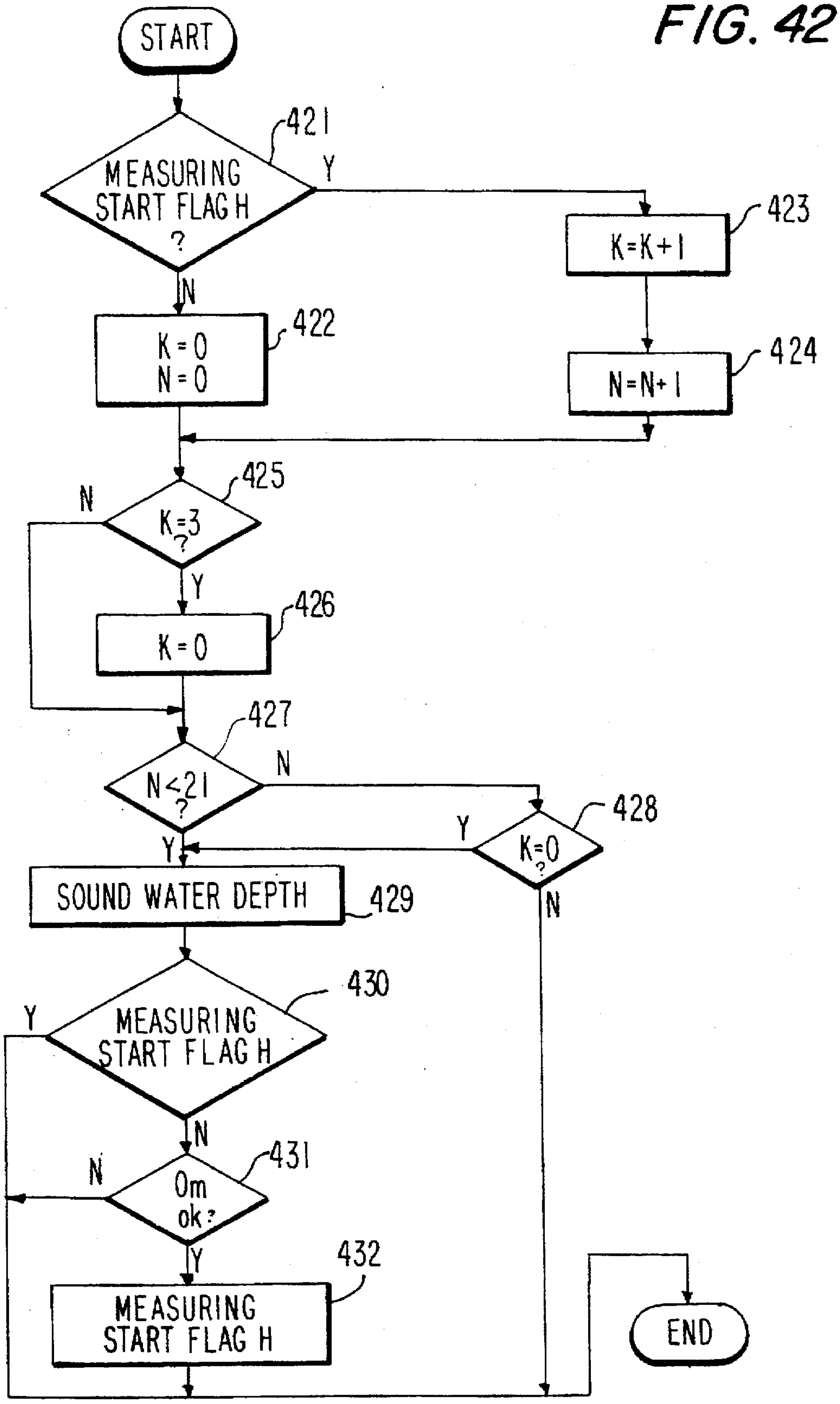
FIG. 42 is a flow diagram showing the operation of the embodiment of FIG. 41.
Figure 43A:
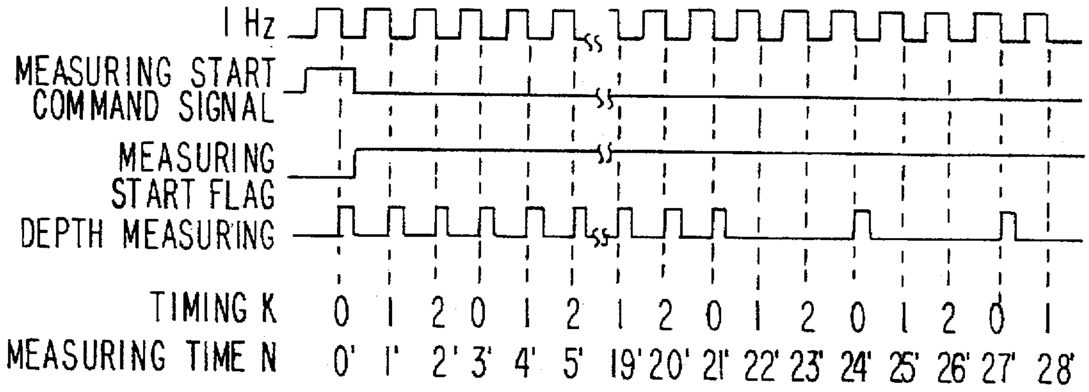
FIGS. 43(*a*) and 43(*b*) are timing diagrams showing the operation of the fourteenth embodiment of the invention.
Figure 43B:
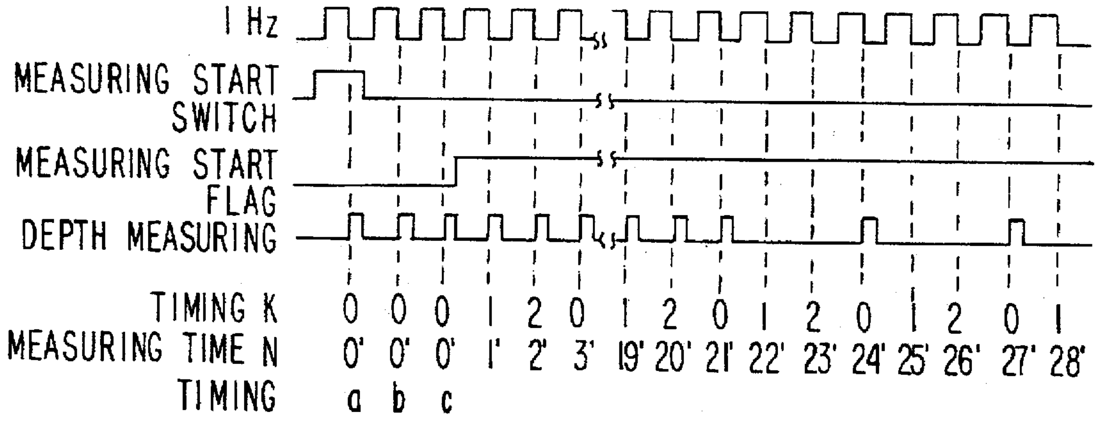

The operation of the above arrangement is discussed referring to the flow diagram in FIG. 42 and the timing diagrams in FIGS. 43(*a*), 43(*b*). An assumption is made that depth measuring is performed every second for first 20 seconds from the start and every 3 seconds from 21 seconds onward. The flow diagram in FIG. 42 is executed when a 1 Hz interrupt takes place as in Embodiment 1.

First, a determination is made of whether depth measuring has started or is about to start. This determination is based on a depth measuring start flag. When the measuring start flag is at L and depth measuring is about to start as determined in step 421, measuring timing pulse count K and measuring time count N are reset to 0 by measuring reset 411 in step 422. When the measuring start flag has already been at H as determined in step 421, the measuring time pulse counter 243 starts counting up in step 423, and the measuring time counter 27 starts counting up in step 424. When the count K has reached 3 as determined in step 425, it is reset to 0 in step 426. When K does not equal 3, it is determined whether the measuring time count is less than 21.

When the measuring time count N is smaller than 21 seconds as determined in step 427 by the measuring interval determinor 244, depth measuring is unconditionally done in step 429. When the measuring time count N is equal to or greater than 21 seconds as determined in step 427, depth measuring is performed in step 429 only when the count K is determined to be 0 in step 428 by measuring timing control 242. When K does not equal zero the program ends. When the measuring start flag is at L as determined in a step 430 by measuring interval determinor 244 the program ends. When the flag is not at L, zero meter sensing remains to be completed. A determination is made of whether or not the depth value data are acceptable as zero meter by zero meter sensor 412 in a step 431. When acceptable, the measuring start flag is set to H in step 432, and the program ends. When not acceptable the program ends without measuring start flag H.

The timing diagram in FIG. 43(*a*) shows the zero meter in sensing operation which has been successfully performed at the first trial after the start of depth measuring. In succession to the entry of the measuring start command signal, depth measuring is initiated at a falling edge of the 1 Hz signal. At this moment, however, the measuring start flag remains at L, and the measuring timing pulse count K is reset to 0, the measuring time count N is reset to 0, and then the measuring start flag is set to H (step 422). Since the measuring time count N is smaller than 21 seconds (step 427), depth measuring is performed (step 429). The measuring start flag is at L (430), and a determination is made of whether the measured depth value is acceptable as zero meter depth (step 431). Since it is acceptable, the measuring start flag is set H (step 432). When the program runs in synchronism with the 1 Hz signal, the measuring start flag is at H. The count K is incremented by 1 (step 423), and the count N is incremented by 1 (step 424). Since the count K is smaller than 21 seconds (step 427), depth measuring is performed (step 429). The measuring start flag is at H (step 430), and the program ends.

Next, when the program runs in synchronism with the 1 Hz signal, the measuring start flag is also at H. The count K is incremented to 2 by 1 (step 423), and the count N is incremented to 2 by 1 (step 424). Since the count N is smaller than 21 seconds (step 427), depth measuring is performed (step 429). Then, depth measuring is repeated every second from the start of depth measuring till the measuring time reaches 20 seconds and thereafter repeated every 3 seconds; in other words, when the measuring timing K is 0 with the measuring interval H set, water depth measuring is performed.

The timing diagram in FIG. 43(*b*) shows the zero meter sensing operation which has failed at several attempts after the start of depth measuring. In succession to the entry of the measuring start command signal, depth measuring is initiated at a falling edge of the 1 Hz signal, at timing a. At this moment, however, the measuring start flag remains at L, and the measuring timing pulse count K is reset to 0, the measuring time count N is reset to 0, and then the measuring start flag is set to H (step 422). Since the measuring time count N is smaller than 21 seconds (step 427), depth measuring is performed (step 429). The measuring start flag is at L (step 430), and a determination is made of whether the measured depth value is acceptable as zero meter depth (step 431). Since it is unacceptable, the program ends.

At timing b, namely, at the next falling edge of the 1 Hz signal, the measuring start flag remains at L, and the measuring timing pulse count K is reset to 0, the measuring time count N is reset to 0, and then the measuring start flag is set to H (step 422). Since the measuring time count N is smaller than 21 seconds (step 427), depth measuring is performed (step 429). The measuring start flag is at L (430), and a determination is made of whether the measured depth value is acceptable as zero meter depth (step 431). Since it is unacceptable, the program ends.

At timing c, namely, at the yet next falling edge of the 1 Hz signal, the measuring start flag remains at L, and the measuring timing pulse count K is reset to 0, the measuring time count N is reset to 0, and then the measuring start flag is set to H (step 422). Since the measuring time count N is smaller than 21 seconds (step 427), depth measuring is performed (step 429). The measuring start flag is at L (step 430), and a determination is made of whether the measured depth value is acceptable as zero meter depth (step 431). Since it is acceptable, the measuring start flag is set to H (step 432).

Then, depth measuring is repeated every second from the start of depth measuring till the measuring time reaches 20 seconds and thereafter repeated every 3 seconds. The measuring timing count K is 0.

The above arrangement prevents a loss of synchronization between measuring timings. The measuring interval (repetition rate) is switched at an intended time. For example, depth measuring is frequently performed for some time immediately after the start of diving, because a rapidly changing depth is expected. During a mildly changing depth diving that follows the initial phase of diving, the measuring interval is set to be longer to reduce power consumption.

In the above embodiment, the measuring interval is determined by the measuring time counter 271. Other methods may be employed to determine the measuring interval. For example, the measuring interval is determined with no measuring time counter 271 used (FIG. 30), determined according to the measured water depth (FIG. 33), or determined according to the depth change rate (FIG. 36). In such cases, however, both the measuring reset means 411 and the zero meter sensor means 412 resets only the count K of the measuring timing pulse counter means 243.

Figure 44:
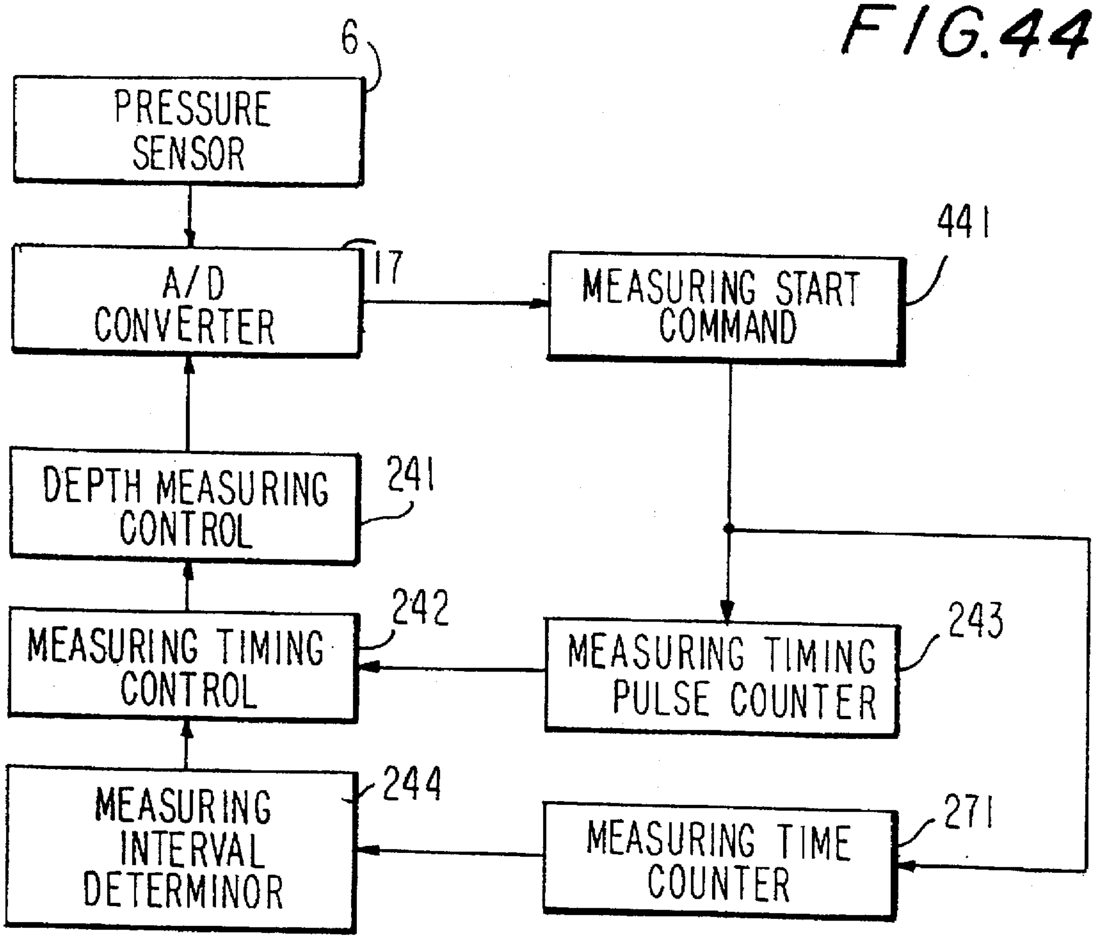
FIG. 44 is a block diagram showing a water depth measuring device constructed in accordance with a fifteenth embodiment of the invention.

Reference is now made to FIG. 44 which is the block diagram showing the fifteenth embodiment of the invention. This modified embodiment is related to the operation timing control for the measuring start command which determines whether the water depth value provided by the A/D converter circuit is equal to or greater than a threshold. When the measuring start command determines that the measured depth value is smaller than the threshold, the counting operations of the measuring timing pulse counter and the measuring time counter are disabled.

The arrangement in this modified embodiment remains essentially unchanged from that in FIG. 25, and no detailed discussion about it will not be provided herein. In FIG. 44, configuration and functions of the pressure sensor, the depth measuring control means, the measuring timing control means, and the measuring interval determining means remain unchanged from those in the fourteenth embodiment of the invention, like numerals being used to indicate like structures, the primary difference being use of a measuring start command.

The measuring start command 441 connected to the A/D converter circuit 17 determines whether the output depth value of the A/D converter circuit 17 is equal to or greater than a threshold value. When it is equal to or greater than the threshold value, the measuring start commanding 441 allows both the measuring timing pulse counter 243 and the measuring time counter 271. When the depth value of the A/D converter circuit 17 is smaller than the threshold value, the measuring timing pulse counter 243 and the measuring time counter 271 are disabled.

Figure 45:
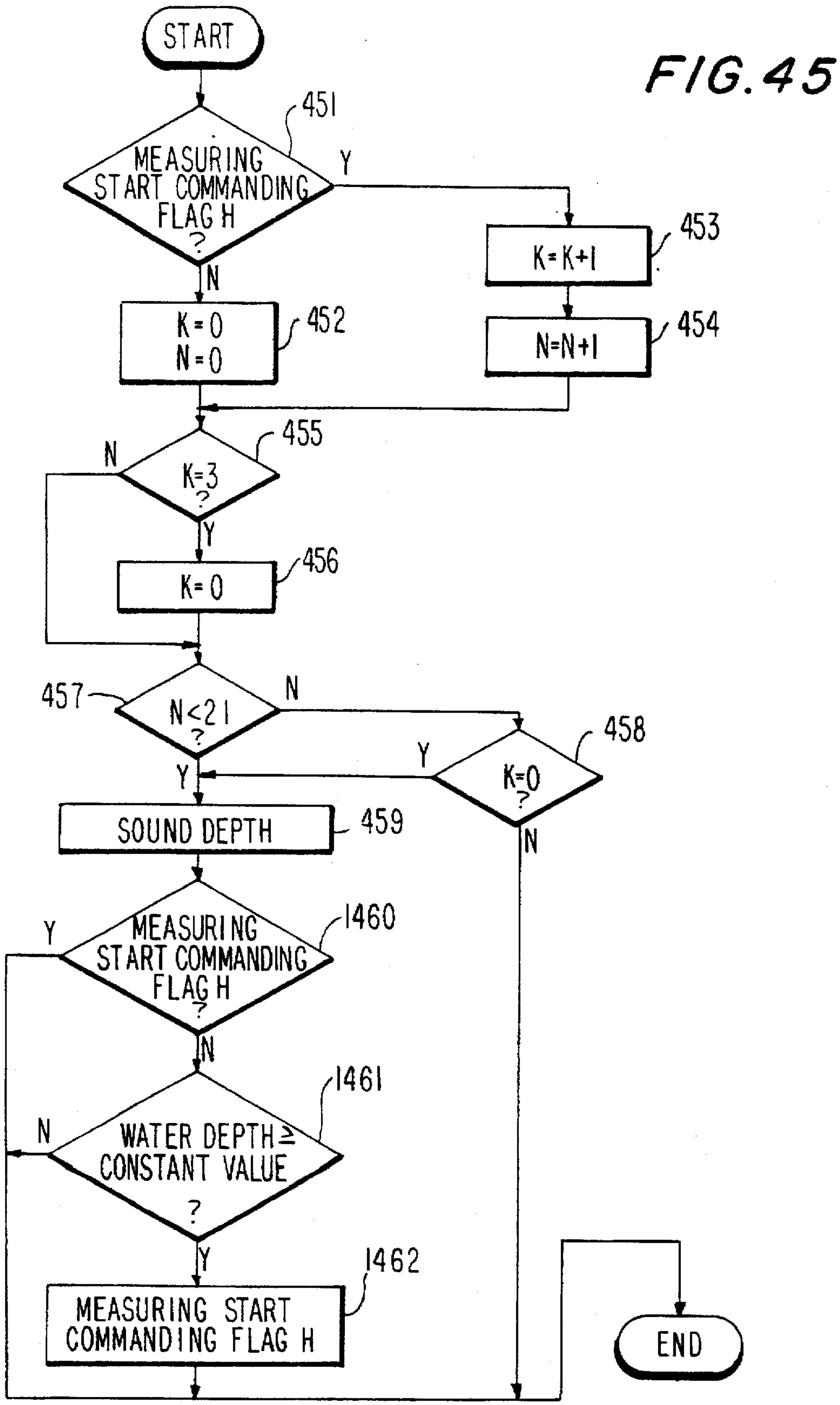
FIG. 45 is a flow diagram showing the operation of the embodiment of FIG. 44.

The operation of the above arrangement is discussed referring to the flow diagram in FIG. 45. An assumption is made that depth measuring is performed every second for the first 20 seconds from the start and every 3 seconds from 21 seconds onward. The flow diagram in FIG. 45 is executed when a 1 Hz interrupt takes place as in Embodiment 1.

When a measuring start commanding flag is at L as determined in step 451, the measuring timing pulse count K of the measuring timing pulse counter 243 and the measuring time count N of the measuring time counter 271 are reset to 0 in step 452. When the measuring start flag has already been at H as determined in step 451, the measuring timing pulse count K is up-counted in step 454. When the count K reaches 3 as determined in step 455, the count K is reset to 0 in step 456. If K does not equal 3, then it is determined whether the measuring time count N is smaller than 21 seconds. When the measuring time count N is smaller than 21 seconds as determined by measuring interval determinor 244 in step 457, depth measuring is performed unconditionally in step 459. When the count K is equal to or greater than 21 seconds as determined in step 257, depth measuring is performed in step 459 only when the count K is 0 as determined in step 458. The program ends when K does not equal zero or when the measuring start commanding flag has already been at H as determined in step 1460. When the measuring start commanding flag is at L as determined in step 1460, the measured value is smaller than the threshold value. A determination is made of whether the measured depth value this time has reached the threshold value by the measuring start command in step 1461. When it is reached, the measuring start command flag is set to H in step 1462, and the program ends. When the measured depth value has not reached the threshold value the program ends.

In the arrangement as above, data up to a predetermined pressure are neglected, and depth measuring takes place in a range of real interest. For example, in diving activity (like scuba diving), diving in a depth range up to 1.5 m deep or so is considered as being adrift on the sea water surface, and depth data in this range is of no interest. When a diver descends deeper than 1.5 m, depth measuring is designed to be initiated. Such arrangement assures ease and convenience of use to the diver.

The threshold value is not limited to a depth of 1.5 m. In diving activity, the threshold value is typically 0.3 to 5 m, preferably 0.5 to 3 m.

The sixteenth embodiment of the invention allows the measuring interval to vary in a stepwise manner. This embodiment is discussed referring to the flow diagram in FIG. 46. In this embodiment, the measuring interval is designed to vary in three steps, with its length becoming gradually longer or shorter in a stepwise manner.

Figure 46:
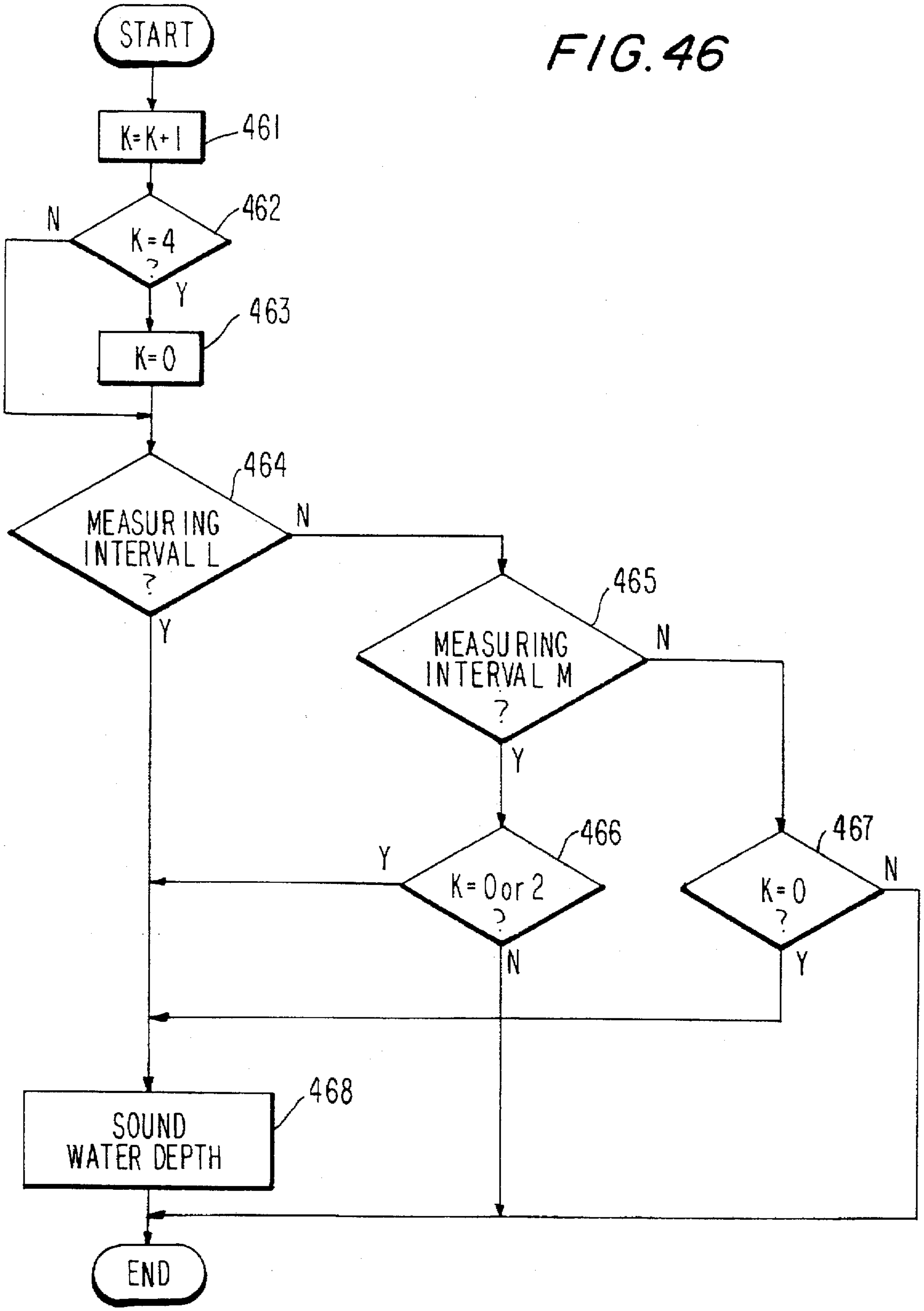
FIG. 46 is a flow diagram showing the operation of a water depth measurement device in accordance with a sixteenth embodiment of the invention.

In FIG. 46, the measuring timing pulse count K is up-counted in a step 461, and is reset when it reaches 4 steps 462, 463. When the measuring interval is L set as determined in step 464, depth measuring is performed unconditionally in step 468. When it is determined that the measuring interval is M in step 465, depth measuring is performed when the count K is 0 or 2 steps 466, 468. When the measuring interval is neither L nor M, depth measuring is performed only when K is 0. Therefore, depth measuring is performed every second with the measuring interval at L, every 2 seconds with the measuring interval at M, and every 4 seconds with the measuring interval at H.

In the above arrangement, a more efficient depth measuring is performed with maximum operation usefulness achieved. In this embodiment, the measuring interval is switched in three steps. Alternatively, more steps may be used to achieve finer pressure sensing. Too many steps, however, lead to a complicated software processing, and are thus not preferred.

The measuring interval is determined by the measuring interval determinor as already described. Any method already described in connection with FIGS. 25–46 will work utilizing 3 or more intervals as described above. For example, the measuring interval may be determined by the count provided by the measuring time counter the determination result of the measured depth value provided by the depth value detector and the determination result of the depth change rate provided by the depth change detector. The stepwise change of the measuring interval according to this embodiment is applied to the embodiment to be described below.

Figure 47:
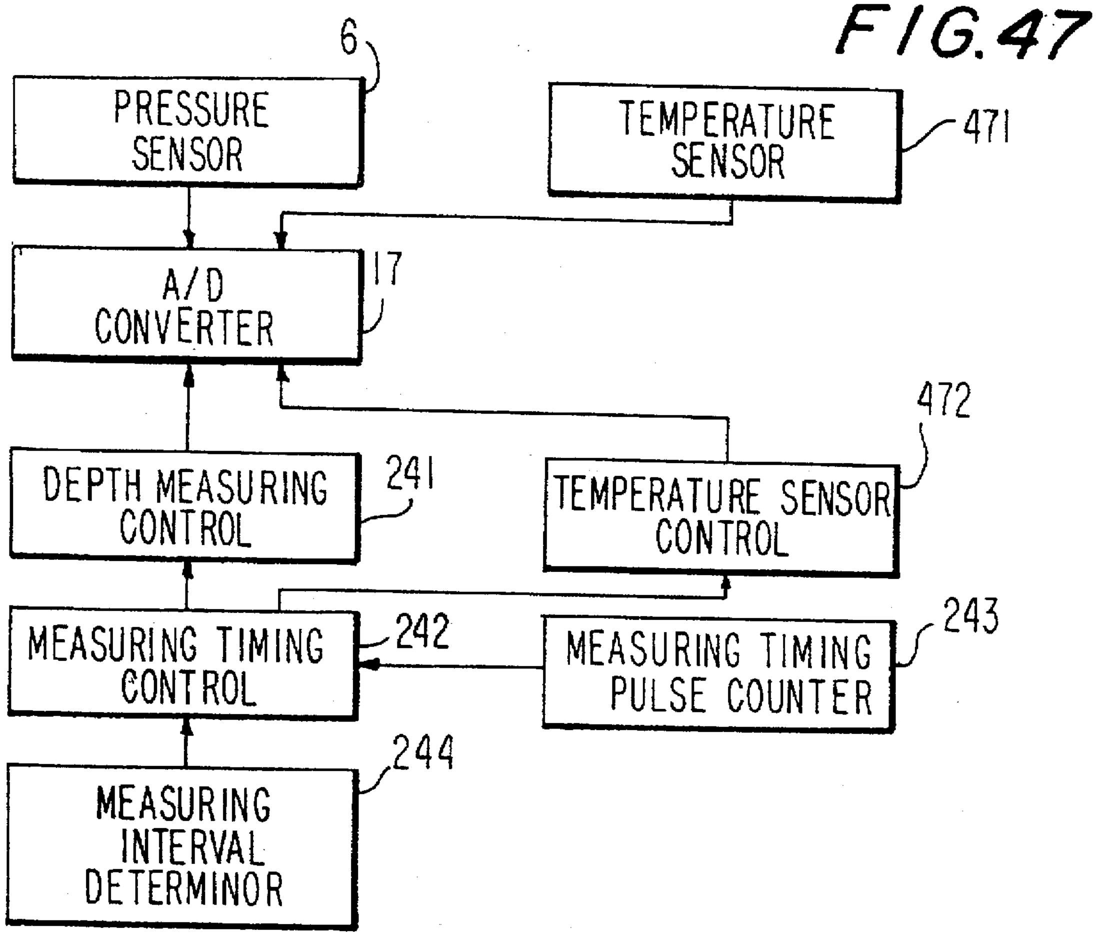
FIG. 47 is a block diagram of a water depth measurement device constructed in accordance with a seventeenth embodiment of the invention.

In the embodiments described above, a physical quantity to be measured is pressure (namely, depth). Measuring other physical quantities is now discussed. Reference is now made to FIG. 47 which is the block diagram of the seventeenth of the invention.

This embodiment is related to the operation timing control for sensors and measuring control for physical quantities other than water depth. Regardless of a switching of the measuring interval for water depth measuring, the measuring interval of second measuring sensor remains fixed.

Like numerals are utilized to indicate like parts, the primary difference in this embodiment being a second measuring sensor which is a temperature sensor built in a diver's watch and the second measuring control which is a temperature sensor control.

In FIG. 47, both the pressure sensor 6 and a temperature sensor 471 are connected to the A/D converter circuit 17, which, in turn, is connected to the depth measuring control 241 and the temperature sensor control 472. The depth measuring control 241 controls the A/D converter circuit 17 to allow the pressure sensor 6 to measure water depth, and the temperature sensor control 472 controls the A/D converter circuit 17 to allow the temperature sensor 471 to sense a temperature. Both the measuring timing control 243 and the measuring interval determinor 244 are connected to the measuring timing control 242. In response to the measuring intervals provided by the measuring timing pulse counter 243 and the measuring interval determinor 244, the measuring timing control 242 issues respective driving signals to the depth measuring control 241 and the temperature sensor control 472.

Figure 48:
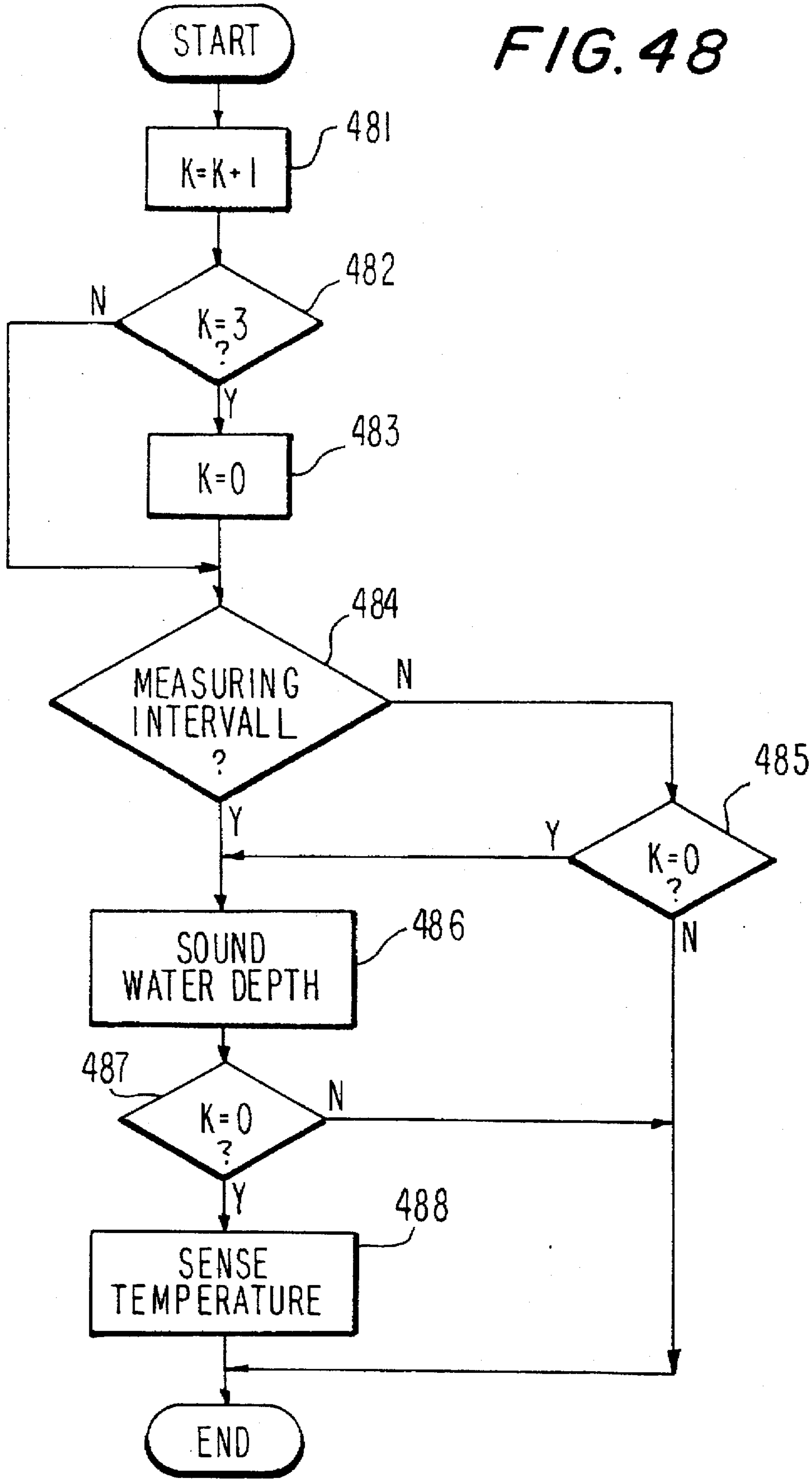
FIG. 48 is a flow diagram showing the operation of the embodiment of FIG. 47.
Figure 49:
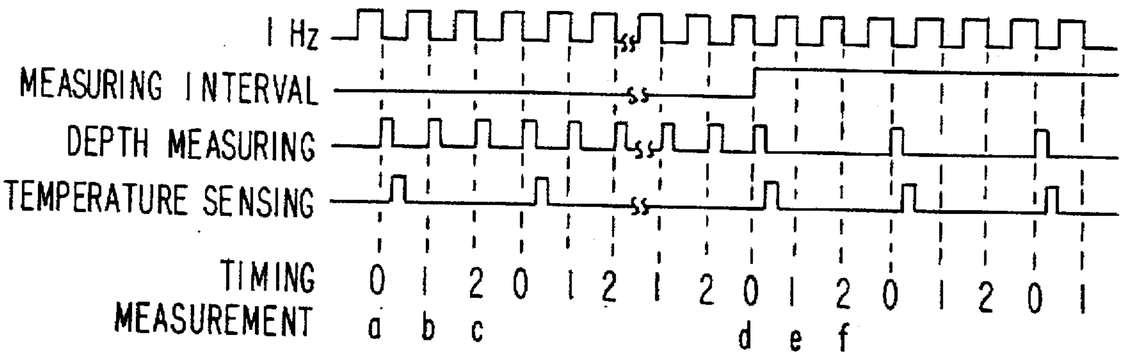
FIG. 49 is a timing diagram showing the operation of the seventeenth embodiment of the invention.

The operation of the above arrangement is discussed referring to the flow diagram in FIG. 48 and the timing diagram in FIG. 49. An assumption is made that temperature sensing is performed every 3 seconds. The flow diagram in FIG. 48 is executed when a 1 Hz interrupt takes place as in the embodiment of FIG. 25.

The measuring timing pulse is up-counted in step 481. When the count K of the measuring timing pulse counter 243 has reached 3 as determined by the measuring timing control 242 in step 482, the count K is reset to 0 in step 483. When is determined that the measuring interval L is set in step 484, depth measuring is performed unconditionally in step 486. When it is determined that the measuring interval H is set in step 484, depth measuring is performed in step 486 only when the count K is determined to be 0 in step 485. When the count K is determined to be 0 in step 487, a temperature value is measured by temperature sensor 471 in step 488, and the program ends.

The timing diagram in FIG. 49 shows both the depth and temperature measuring timings. At measurement a, depth measuring is performed unconditionally because the measuring interval is at L (steps 484, 486), and temperature measuring is performed because the count K is 0 (steps 487, 488). At measurement b, depth measuring is also performed unconditionally because the measuring interval is at L (steps 484, 486), but the program ends because the count K is 1 (step 487). At measurement c, depth measuring is also performed unconditionally because the measuring interval is at L (steps 484, 486), but the program ends because the count K is 2 (step 487).

At measurement d, the measuring interval is at H, the count K is 0, and thus depth measuring is performed (steps 484, 485, 486). Since the count K is 0, temperature measuring is also performed (steps 487, 488). At measurement e, the program ends because the count K is not 0 and the measuring interval is at H. The operation at measurement f remains unchanged from measurement e.

Regardless of the depth measuring interval, temperature measuring is thus performed every 3 seconds.

In the above arrangement, even when the measuring interval is changed, temperature measuring is performed at the fixed timing. Thus, processing is simplified, and power consumption is reduced.

The temperature measuring interval is not limited to 3 seconds. In diving applications, temperature measuring interval is typically set to be longer than depth measuring interval, because water depth is more important than temperature information. In view of design convenience for temperature sensing and system's current requirement, the temperature measuring interval is typically set to be somewhere between 1 and 60 seconds, preferably between 3 and 30 seconds.

Figure 50:
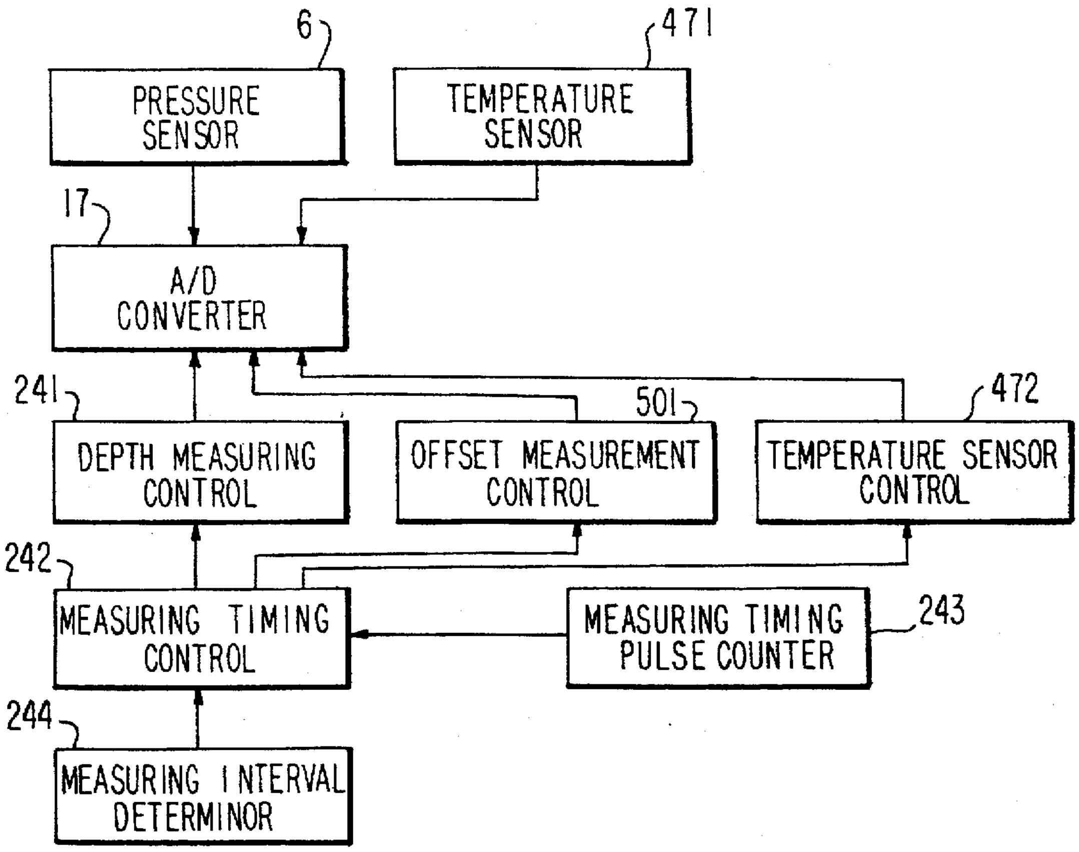
FIG. 50 is a block diagram of a water depth measurement device constructed in accordance with an eighteenth embodiment of the invention.

Reference is now made to FIG. 50, which is the block diagram showing the eighteenth embodiment of the invention.

This embodiment is related to the operation timing control for the seventeenth embodiment of the inventory but with offset control added. Regardless of a switching of the depth measuring interval, the measuring intervals of second measuring control and the offset measuring control remain fixed. Offset measuring and temperature measuring are performed with different timings.

The arrangement in this modified embodiment remains essentially unchanged from that in the seventeenth embodiment, and thus no detailed discussion is provided. Like numerals are utilized to indicate like structures, the primary difference being the inclusion of offset measurement control. In FIG. 50, configuration and functions of the pressure sensor, the temperature sensor, the depth measuring control, the measuring timing pulse counter, and the measuring interval determinor remain unchanged from those in the seventeenth embodiment.

Connected to the A/D converter circuit 17 are the depth measuring control 241, offset measuring control 501 and temperature sensor control 472. The depth measuring control 241 controls the A/D converter circuit 17 to allow the pressure sensor 6 to measure water depth, temperature sensor control 472 controls the A/D converter circuit 17 to allow the temperature 471 to sense a temperature, and the offset measuring control 501 controls the A/D converter circuit 17 to measure an offset value. The measuring timing control 242 issues respective driving signals to the depth measuring control 241, the temperature sensor control 472 and the offset measuring control 501. Namely, the measuring timing control 242 gives three different operation timings to control three different controls.

Figure 51:
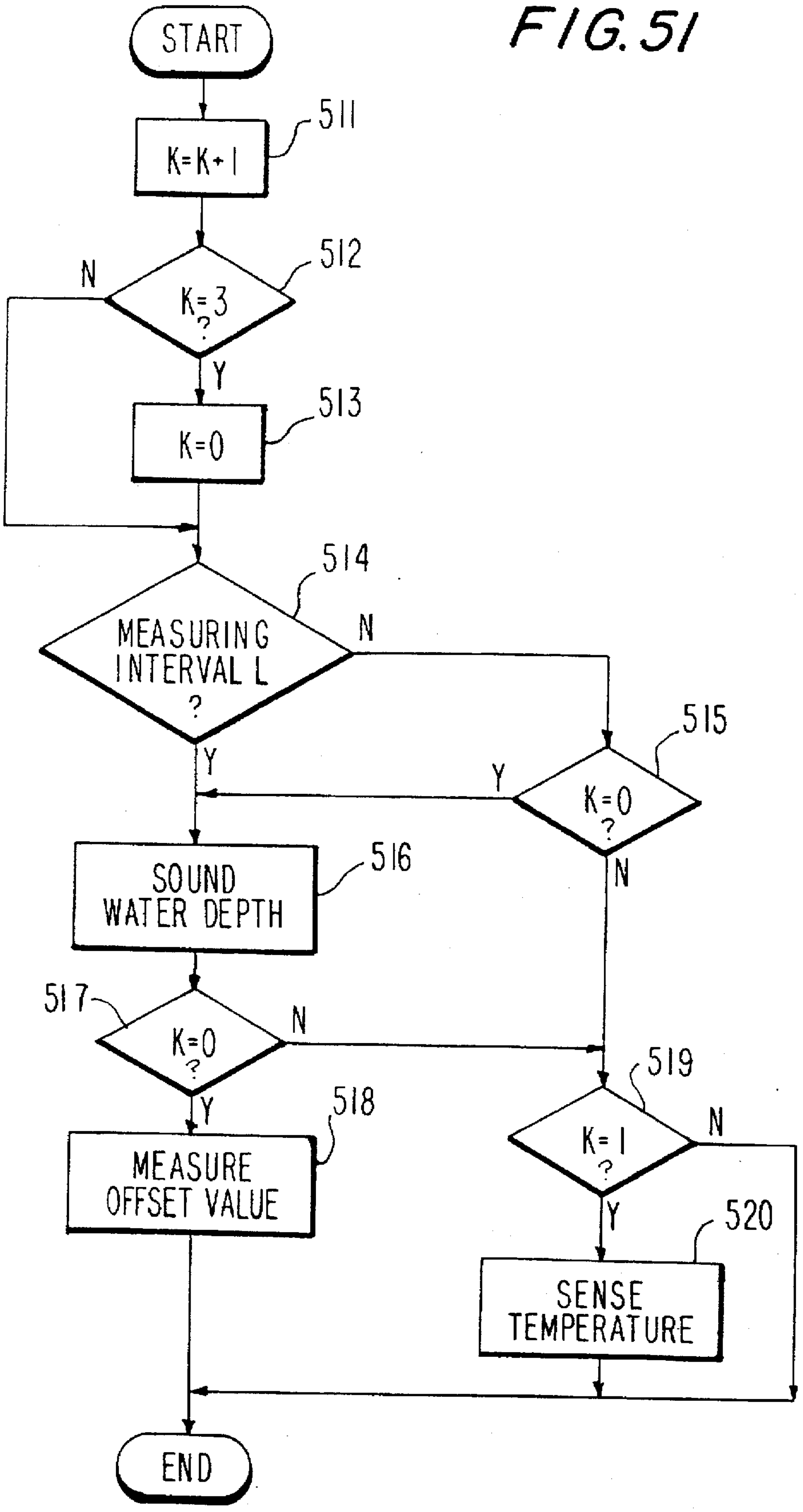
FIG. 51 is a flow diagram showing the operation of the embodiment of FIG. 50.
Figure 52:
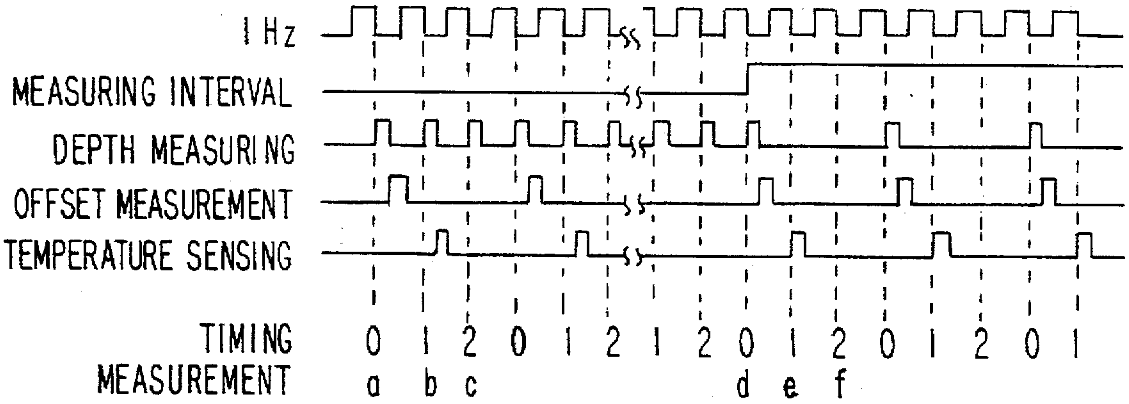
FIG. 52 is a timing diagram showing the operation of the eighteenth embodiment of the invention.

The operation of the above arrangement is discussed referring to the flow diagram in FIG. 51 and the timing diagram in FIG. 52. The flow diagram in FIG. 51 is executed when a 1 Hz interrupt takes place as in the embodiment of FIG. 25.

The measuring timing pulse is up-counted in step 511. When the count K has reached 3 as determined by the measuring timing control 242 in step 512, the count K is reset to 0 in step 513. When K does not equal 3, then it is determined whether measuring interval L is set up in step 514. When it is determined by measuring interval determinor 244 that the measuring interval L is set in step 514, depth measuring is performed unconditionally in step 516. When the measuring interval H is set, depth measuring is performed in step 516 only when it is determined that the count K is 0 in step 515. When the count K is determined to be a 0 after depth measuring in step 517, offset measuring is performed by offset measurement control 501 in step 518, and the program ends. If the count K is determined not to be zero in step 515 or step 517 and is determined to to be 1 in step 519, a temperature value is measured by temperature sensor step 520. If K is not determined to be 1 in step 519, the program ends.

The timing diagram in FIG. 52 shows the depth, temperature and offset measuring timings. At measurement a, depth measuring is performed unconditionally because the measuring interval is at L (steps 514, 516), and offset measuring is performed because the count K is 0 (steps 517,518). At measurement b, depth measuring is also performed unconditionally because the measuring interval is at L (steps 514, 516). Temperature sensing is performed, because the count K is 1 (steps 516,520). At measurement c, depth measuring is also performed unconditionally because the measuring interval is at L (steps 514,516), but the program ends because the count K is 2 (step 517).

At measurement d, the measuring interval is at H, the count K is 0, and thus depth measuring is performed (steps 514, 515, 516). Since the count K is 0, offset measuring is also performed (steps 517, 518). At measurement e, temperature measuring is performed, because the count K is 1 not 0 and the measuring interval is at H (steps 515, 519 and 520). At measurement f, the program ends because the measuring interval is at H and the count K is neither 0 nor 1 (steps 515, 519).

Regardless of the depth measuring interval, offset measuring is performed at timing 0, every 3 seconds, temperature measuring is performed at timing 1, every 3 seconds.

In the above arrangement, even when the measuring interval is changed, offset measuring is performed at the fixed timing. Thus, processing is simplified. Pressure, offset and temperature measurings are performed at different timings rather than simultaneously, and thus any inconvenience such as one measuring interfering with the other measuring is prevented. Software controlling allows these processings for these measurements to run in parallel, and multi-function design is easy to implement. Furthermore, power consumption is reduced.

Figure 53:
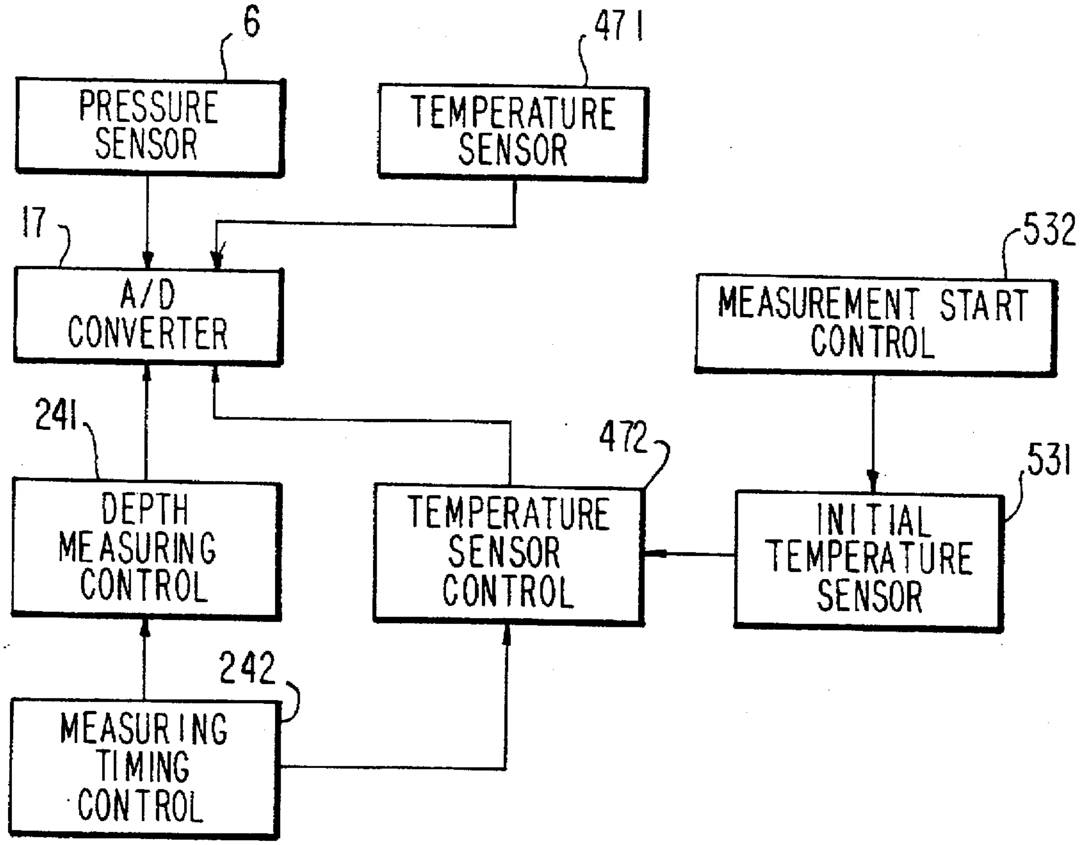
FIG. 53 is a block diagram of a water depth measurement device constructed in accordance with a nineteenth embodiment of the invention.

Reference is now made to FIG. 53 which is the block diagram showing the nineteenth embodiment of the invention, this embodiment is related to the operation control for temperature sensor control at the start of depth measuring. The temperature sensor control is controlled so that one temperature measuring trial is performed unconditionally at the start of depth measuring.

The arrangement in this modified embodiment remains essentially unchanged from that in the seventeenth embodiment, and thus no detailed discussion is provided. In FIG. 53, configuration and functions of the pressure sensor, the temperature sensor, the A/D converter circuit, the depth measuring control, the measuring timing control and the measuring interval determinor remain unchanged from those in the seventeenth embodiment. Like numerals are utilized to indicate like structures, the primary difference being the use of measurement start control and an initial temperature sensor.

Initial temperature 531 is connected to the temperature sensor control 472. When notified of the start of depth measuring by measurement start control 532, the initial temperature 531 triggers the temperature sensor control 472 only once.

Figure 54:
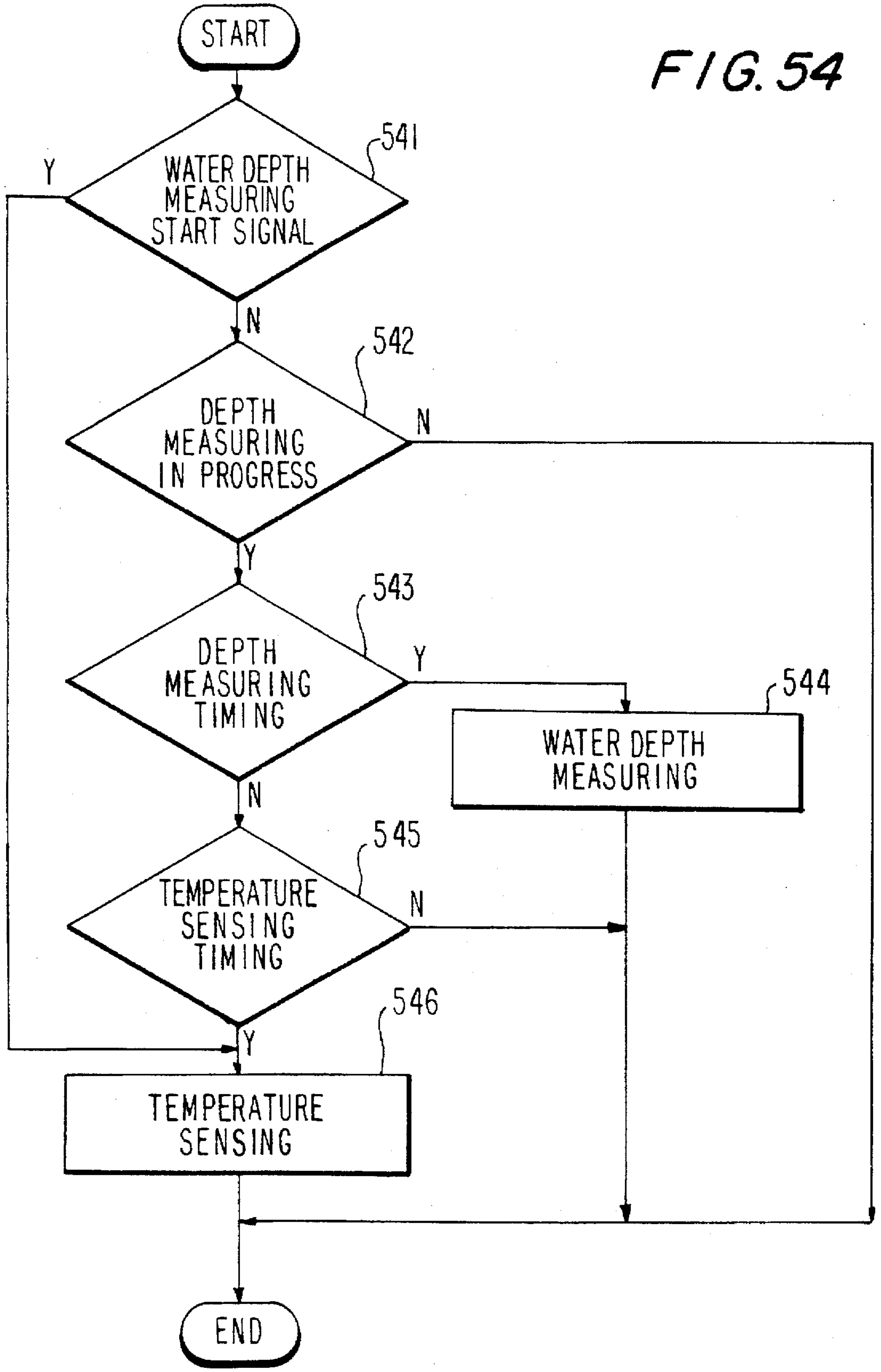
FIG. 54 is a flow diagram showing the operation of the embodiment of the nineteenth embodiment.

The operation of the above arrangement is discussed referring to the flow diagram in FIG. 54. When the measurement start control 532 is activated in response to a water depth measuring start signal as determined in step 541, temperature measuring is performed unconditionally in step 546. An erratic output value given by the A/D converter circuit 17 in temperature measuring suggests that either the temperature sensor 471 or the A/D converter 17 is faulty.

When no water depth measuring start signal is fed, depth measuring is already in progress as determined in step 542. If depth measuring is not in progress the program ends. If it is at a depth measuring timing as determined in step 543, depth measuring is performed in step 544. If it is not at a depth measuring timing it is determined whether it is at a temperature measuring timing at step 545. If it is at a temperature measuring timing as determined in step 545, temperature measuring is performed in step 546. If it is not at a temperature sensing timing the program ends.

By measuring temperature once prior to pressure sensing, temperature data are correctly recognized even when pressure sensing is interrupted. A single measurement is sufficient enough, and involves a simple software processing. This one-time measurement also serves diagnostic test purpose for temperature sensor and A/D converter circuit.

In the discussion of the above embodiments processing for pressure, offset and temperature measurements has been explained. In addition to this, a diversity of processing may be needed in portable electronic apparatuses such as dive watches. Typically featured in a watch are time display, stopwatch operation, alarm function, graphic display presentation and data transfer and processing for these functions. Since in these embodiments, software processing for measuring physical quantities is very much simplified, no additional load is imposed on processing for these watch functions. As a result, multi-function design is enhanced. By "multi-function" is meant a diversity of measurements besides pressure sensing.

In the discussion of the above embodiments, a pressure sensor is applied to depth measuring. Alternatively, the pressure may be applied to other pressure sensing applications such as air pressure or contact pressure measuring.

The portable information apparatus according to the present invention may be implemented into a diversity of gadgets normally worn by individuals, such as watches, belts, glasses, gloves, clothes, or apparatuses such as pocket notebooks, pocket calculators, pocket pagers, portable telephones. The present invention is desirably applied to watches. In view of underwater environment where divers are subject to restriction in motion, easy-to-use and easy-to-look features are important. In this viewpoint, the present invention is advantageously applied to a diver's watch.

Embodiments eight through nineteen of the invention have the following advantages.

The timing of switching of pressure sensing interval is correctly picked up and accurate measuring is performed.

Depth measuring is frequently performed for some time immediately after the start of diving, because a rapidly changing depth is expected. During a mildly changing depth diving that follows the initial phase of diving, the measuring interval is set to be longer to avoid unnecessary measuring. As a result, current requirement is reduced.

When in deep water, the magnitude of the pressure sensor becomes large and the A/D conversion time is prolonged. By switching to a longer measuring interval, optimum measuring adapted to individual system configuration is performed.

The measuring interval is changed in response to measured pressure change rate. The measuring interval is set to be long (short) when a pressure change is small (large), and thus depth measuring is optimized. Current requirement is reduced and an excellent response to pressure change rate is achieved in depth measuring.

To measure water depth change rate, frequency or repetition rate for calculating water depth change remains unchanged when the measuring interval is switched. Unit time used to calculate depth change rate also remains unchanged. Thus, water depth change rate is correctly recognized. The system offers measurement data in a fashion that agrees with ease of use.

Current requirement is even further reduced, because the measuring time counter means is disabled for some time in operation.

Even when the measuring interval is changed, offset measuring is performed at the fixed timing. Thus, processing is simplified. Since unnecessary offset measuring is not required, power consumption is reduced. When offset measuring is software controlled, other processing may be concurrently performed and multi-function design is easy to implement.

A loss of synchronization between measuring timings is prevented and accurate pressure sensing is performed.

The measuring interval is switched at an intended time. Thus, unnecessary measuring is avoided. Current requirement of the system is reduced. Data up to a predetermined pressure are neglected, and depth measuring takes place in a range of real interest. Ease of use of the system is thus enhanced.

The measuring interval is switched in three steps, gradually in a stepwise manner. A more efficient depth measuring is performed with maximum operation usefulness achieved.

In any measuring interval setting, other physical quantities (temperature, in particular) are measured in synchronism with the count provided by the measuring timing pulse counter means. Thus, software processing is greatly simplified. There is no need for the constant measurement of physical quantities of secondary importance (temperature, in particular), current requirement is reduced, prolonging the life of a battery. The use of software allows other processing to run in parallel.

In any measuring interval setting, other physical quantities (temperature, in particular) are measured in synchronism with the count provided by the measuring timing pulse counter means. Thus, software processing is greatly simplified. Pressure, offset and temperature measurings are performed at different timings rather than at a time, and thus any inconvenience such as one measuring interfering with the other measuring is prevented. Offset measuring and temperature measuring, when unnecessary, are not performed, and current requirement is reduced.

Temperature data is correctly recognized even when pressure sensing is interrupted. A single measurement of temperature is sufficient enough, and involves a simple software processing. This one-time measurement also serves diagnostic test purpose for temperature sensor and A/D converter circuit.

Physical quantity data such as pressure and temperature is timely presented in a fashion that agrees with human sense. When the depth measuring interval is changed, offset and temperature measurings are performed at fixed intervals and correct data are presented in an easy-to-see fashion. Thus, a portable information apparatus with excellent operational usefulness is obtained.

As described above, the depth measuring device according to the present invention comprises a pressure sensor, an A/D converter circuit that converts the sensed signal of the pressure sensor into a digital value, a comparator circuit that compares the initial digital value given by the A/D converter circuit at the start of water depth measuring, with the range defined by predetermined first and second comparative values, in order to determine whether the initial digital value falls within the range or not, an initial value setting circuit that, in response to the comparison result of the comparator circuit, adopts the first digital value as an initial value corresponding to zero meter depth when the initial digital value falls within the range defined by the first and second comparative values, and a water depth computing circuit that computes a water depth value in response to the initial value and the digital value derived from the A/D converter circuit.

The measured value first read which could be greatly different from the real atmospheric pressure will not be automatically used as indicative of an initial zero meter value. This arrangement assures that the error the depth measuring device suffers is substantially reduced.

When the second comparative value is greater than the first comparative value, the initial value setting circuit, preferably, adopts a first predetermined value as its initial value when the initial digital value given at the start of water depth measuring is equal to or smaller than the first comparative value, or adopts a second predetermined value as its initial value when the initial digital value is equal to or greater than the second comparative value. In this arrangement, even if a switching operation is performed in a high altitude area or under water, corrected water depth with substantially small error is presented.

When the first predetermined value is set as the initial value, the water depth computing circuit, preferably, outputs its depth value as zero while the digital value from the A/D converter circuit is smaller than the initial value. In the arrangement, if the measured water depth is smaller than the initial value indicative of zero meter, the measured value is forced to zero. The abnormal display such as a negative depth reading is thus avoided.

When the comparator circuit has determined that the digital value provided by the A/D converter circuit at the start of water depth measuring does not fall within the range defined by the first and second comparative values, the digital value is read again to determine the initial value, and based on the read digital value, the initial value is determined. In this arrangement, measurement at the start of depth measuring is repeated if the measured value is not normal. Thus, the determination of the initial value is performed in a reliable manner.

The water depth measuring device preferably comprises a counter circuit which counts the frequency of occurrence of error signals indicative of abnormal conditions provided by the A/D converter circuit and which disables water depth measuring when the error count by the counter exceeds a predetermined value. In this arrangement, the frequency of occurrence of error signals provided by the A/D converter circuit is counted. When the count exceeds a predetermined value, measuring operation is suspended. This arrangement allows any one-time transient fault and permanent fault of the A/D converter circuit to be detected. A rarely happening fault may be neglected, but abnormal measuring due to a permanent fault such as a circuit hardware fault should properly detected for a corrective action.

The water depth measuring device preferably further comprises a display unit for displaying the water depth value computed by the water depth computing circuit and a display control circuit for controlling display of the display unit, whereby the display control circuit controls the display unit in a manner that allows the display unit to indicate that corrected value rather than the measured depth value is adopted as the initial value by flashing and the like if an arrangement is provided such that depth value is presented along with information indicating that the first predetermined value or second predetermined value is set as the initial value when the first predetermined value or second predetermined value is set as the initial value. The diver is thus visibly notified that the correct value has been used at the initial value.

It will thus be seen that the objects set forth above, among those made apparent from the preceding description, are efficiently attained and, since certain changes may be made in the above construction without departing from the spirit and scope of the invention, it is intended that all matters contained in the above description and shown in the accompanying drawings shall be interpreted as illustrative and not in a limiting sense.

It is also to be understood that the following claims are intended to cover all the generic and specific features of the invention herein described and all statements of the scope of the invention in which, as a matter of language, might be said to fall therebetween.

What is claimed is:

1. A water depth measuring device comprising:

a pressure sensor;

an A/D converter operatively coupled to the pressure sensor that converts the sensed signal of the pressure sensor into a digital value, the digital value corresponding to the start of water depth measuring being the initial digital value;

a comparator operatively coupled to the A/D converter that compares the initial digital value output by the A/D converter with a range of values defined by a first predetermined comparative value and a second predetermined comparative value, and determines whether the initial digital value falls within the range and produces a comparison result based thereon;

an initial value setting circuit operatively coupled to the comparator that, in response to the comparison result of the comparator, adopts the first digital value as an initial value corresponding to a zero meter depth when the initial digital value falls within the range defined by the first and second comparative values; and a water depth computer operatively coupled to the A/D converter and the initial value setting circuit that computes a water depth value based on the initial value and the digital value derived from the A/D converter.

2. The water depth measuring device according to claim 1, wherein a second digital value is input to the comparator to determine the initial value when the comparator determines that the digital value output by the A/D converter circuit at the start of water depth measuring does not fall within the range defined by the first and second predetermined comparative values, and the initial value is determined based on the second digital value.

3. The water depth measuring device according to claim 1, wherein the A/D converter outputs error signals indicative of abnormal conditions and further comprising an error counter which counts the frequency of occurrence of error signals output by the A/D converter, said error counter disabling water depth measuring when the error count by the error counter exceeds a predetermined value.

4. The water depth measuring device of claim 1, wherein said water depth measuring device is a dive watch.

5. The water depth measuring device according to claim 1 further comprising:

a water depth value memory storing the water depth value computed by the water depth computer at predetermined intervals;

a CPU computing a difference between the water depth value computed by the water depth computing circuit and the water depth value of a previous predetermined time interval stored in the water depth value memory circuit;

a display unit having a plurality of independently driven display segments; and a display control circuit selectively driving the display segments in response to the difference computed by the CPU to indicate rate of ascension and dissension.

6. The water depth measuring device of claim 1, further comprising offset measurement control producing an offset measurement control signal to said A/D converter causing said A/D converter to output a digital offset value, said measuring timing control output a signal to said offset measurement control allowing offset measurement to be performed.

7. The water depth measuring device according to claim 1 further comprising:

a coordinates display unit two dimensionally displaying measured depth over time in a display area, the display unit exhibiting one axis representing time and the other axis representing depth;

a time-axis scaler modifying the display area along the time axis;

a depth-axis scaler modifying the display area along the depth axis; and a scale control for allowing the time-axis scaler and the depth-axis scaler to independently change the scale of a respective axis.

8. The water depth measuring device of claim 7, wherein the time axis scaler modifies the time axis when the elapsed time for measuring exceeds a predetermined time value.

9. The water depth measuring device of claim 7, wherein the depth axis scaler modifies the depth axis when the measured water depth exceeds a depth threshold value.

10. The water depth measuring device according to claim 1, wherein the second predetermined comparative value is greater than the first predetermined comparative value, and the initial value setting circuit adopts a first predetermined value as the initial value when the initial digital value is equal to or less than the first predetermined comparative value, or adopts a second predetermined value as its initial value when the initial digital value is equal to or greater than the second predetermined comparative value.

11. The water depth measuring device according to claim 10, wherein, when the first predetermined comparative value is set as the initial when the water depth computer outputs a depth value of zero units while the digital value from the A/D converter is smaller than the initial value.

12. The water depth measuring device according to claim 10 further comprising a display displaying the water depth value computed by the water depth computer and a display control controlling display of the display unit, the display control controlling the display unit so that, when either the first predetermined comparative value or the second predetermined comparative value is selected as the initial value, the display unit presents the resulting water depth value along with information that indicates the initial value is either the first predetermined comparative value or the second predetermined comparative value.

13. The water depth measuring device of claim 10, wherein said water depth measuring device is a dive watch.

14. The water depth measuring device according to claim 1 further comprising:

a first water depth determinor determining whether the water depth value computed by the water depth computer circuit is greater than a first predetermined water depth value and producing an output in response thereto;

a second water depth determinor determining whether the water depth value computed by the water depth computer circuit is less than a second predetermined water depth value, the second predetermined water depth value being less than the first predetermined water depth value and producing an output in response thereto;

an alarm complete memory circuit which is set to indicate an alarm-complete condition in response to an output by the first water depth determinor indicating a water depth greater than the first predetermined value, the set state being released and put into a reset state by an output by the second water depth determinor indicating that the water depth is less than the second predetermined water depth value; and an alarm generator generating an alarm when the alarm complete memory circuit is in the reset state and when the output of the first water depth determinor indicates a water depth greater than the first predetermined water depth value.

15. The water depth measuring device according to claim 14, further comprising first water depth value instruction circuit modifying said first predetermined water depth value, and second water depth value instruction circuit modifying a second water depth value that is shallower by a fixed depth than the first modified predetermined water depth value.

16. The water depth measuring device of claim 14, wherein said water depth measuring device is a dive watch.

17. The water depth measuring device according to claim 14, further comprising a third water depth determinor determining whether the water depth value computed by the water depth computer is greater than a third water depth value and producing an output in response thereto, said third predetermined water depth value being greater than said first predetermined water depth value, the alarm complete memory circuit being further switched from the set state to the reset state in response to an output by the third water depth determinor that the water depth is greater than the third predetermined water depth value.

18. The water depth measuring device of claim 17, further comprising a display unit displaying the water depth value computed by the water depth computer and a display control controlling display of the display unit so that the display unit indicate the alarm is on when the alarm is activated by the alarm memory reset circuit.

19. The water depth measuring device of claim 14, further comprising a display unit displaying the water depth value computed by the water depth computer and a display control controlling display of the display unit so that the display unit indicates the alarm is on when the alarm is activated by the alarm memory reset circuit.

20. The water depth measuring device of claim 19, wherein said water depth measuring device is a dive watch.

21. The water depth measuring device according to claim 1 further comprising:

a measuring timing pulse generator generating measuring timing pulses that serve as a reference in determining a measuring interval;

a measuring timing pulse counter counting the measuring timing pulses generated by the measuring timing pulse generator and outputting a count;

a measuring interval determinor receiving the count and in response thereto determining a measuring interval; and a measuring timing control allowing depth measuring to be performed for a duration of time determined by the measuring interval output by the measuring interval determinor.

22. The water depth measuring device of claim 21, further comprising a measuring start command receiving said digital value and determining whether the digital value is greater than or equal to a threshold value and providing an output to said measuring timing pulse counter and measuring time counter to disable said measuring time pulse counter and measuring time counter when said digital value is less than the threshold value.

23. The water depth measuring device according to claim 21, wherein the measuring interval determinor changes the measuring interval in response to the computed water depth.

24. The water depth measuring device of claim 23, further comprising a depth value detector detecting when the computed depth value exceeds a predetermined depth value and outputting a value signal in response thereto, the measuring interval determinor selecting a measuring interval in response to the value signal.

25. The water depth measuring device according to claim 21, further comprising a water depth change computer computing a variation in the computed water depth and providing variation output in response thereto, the measuring interval determinor changing the measuring interval in response to the variation output.

26. The water depth measuring device according to claim 25, wherein the water depth change computer computes the water depth variation in synchronism with a predetermined count provided by the measuring timing pulse counter.

27. The water depth measuring device according to claim 21, further comprising second measuring means that measures at least one physical quantity, other than water depth and second measuring control for controlling the second measuring sensor, the measuring timing control outputting a control signal to the second measuring control allowing the second measuring control to operate in synchronism with the count provided by the measuring timing pulse counter.

28. The water depth measuring device of claim 27, wherein the second measuring sensor measures temperature.

29. The water depth measuring device according to claim 21, further comprising a measuring time counter measuring an elapsed time from the start of water depth measuring and producing a second count, the measuring interval determinor changing the measuring interval in response to the second count output by the measuring time counter means.

30. The water depth measuring device of claim 29, wherein the measuring interval determinor provides an output to the measuring time pulse counter to disable the measuring time pulse counter for a duration of time after the start of depth measurement.

31. The water depth measuring device of claim 29, further comprising a zero meter sensor determining whether a computed depth value is a correct initial value, the zero meter sensor receiving a digital value and providing an output to the measuring timing pulse counter and measuring time counter to disable said measuring timing pulse counter and measuring time counter when said zero meter sensor fails to detect a digital value corresponding to a correct zero meter depth.

* * * * *